US012359493B2

(12) United States Patent
Beggs et al.

(10) Patent No.: US 12,359,493 B2
(45) Date of Patent: Jul. 15, 2025

(54) METHODS AND APPARATUS TO MONITOR AND/OR ADJUST OPERATIONS OF DOORS

(71) Applicant: RITE-HITE HOLDING CORPORATION, Milwaukee, WI (US)

(72) Inventors: Ryan Beggs, Dubuque, IA (US); Derek Lewan, Hazel Green, WI (US); Quinn Mast, Burlington, WI (US); James Pelegrin, III, Dubuque, IA (US); Michael Sivill, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 18/616,947

(22) Filed: Mar. 26, 2024

(65) Prior Publication Data

US 2024/0309694 A1 Sep. 19, 2024

Related U.S. Application Data

(63) Continuation of application No. 17/738,814, filed on May 6, 2022, now Pat. No. 11,952,825.

(Continued)

(51) Int. Cl.

*E05F 15/43* (2015.01)
*E05F 15/73* (2015.01)

(Continued)

(52) U.S. Cl.

CPC .............. *E05F 15/79* (2015.01); *E05F 15/74* (2015.01); *G07C 3/00* (2013.01);

(Continued)

(58) Field of Classification Search

CPC ........... E05F 15/70; E05F 15/73; E05F 15/74; E05F 15/79; E05F 2015/765; E05F 2015/767; E05Y 2400/35; E05Y 2400/354; E05Y 2400/502; E05Y 2400/52; E05Y 2400/56; E05Y 2400/58; E05Y 2900/13;

(Continued)

(56) References Cited

U.S. PATENT DOCUMENTS

| | | | | |
|---|---|---|---|---|
| 5,141,044 A * | 8/1992 | Hying | ..................... | E06B 9/581 160/310 |
| 5,299,617 A * | 4/1994 | Hying | ..................... | E06B 9/581 160/310 |

(Continued)

OTHER PUBLICATIONS

Bea, "LZR-Widescan Motion, Presence & Safety Sensor for Industrial Doors." 2 pages.

(Continued)

*Primary Examiner* — John R Lee

(74) *Attorney, Agent, or Firm* — Hanley, Flight & Zimmerman, LLC

(57) ABSTRACT

Methods and apparatus to monitor and/or adjust operations of doors are disclosed. An apparatus includes processor circuitry to execute instructions to: monitor a position of a door panel associated with a door system; detect when a beam from a photo-eye sensor associated with the door system is in an unexpected non-triggered state based on the position of the door panel; and generate an alert or notification indicating a significance of the beam in the unexpected non-triggered state.

47 Claims, 25 Drawing Sheets

Related U.S. Application Data

(60) Provisional application No. 63/185,838, filed on May 7, 2021.

(51) Int. Cl.
*E05F 15/74* (2015.01)
*E05F 15/79* (2015.01)
*G07C 3/00* (2006.01)

(52) U.S. Cl.
CPC .................. *E05F 2015/765* (2015.01); *E05Y 2400/354* (2013.01); *E05Y 2400/502* (2013.01); *E05Y 2900/132* (2013.01)

(58) Field of Classification Search
CPC ..... E05Y 2900/132; E06B 9/58; E06B 9/581; G07C 3/00
See application file for complete search history.

(56) References Cited

U.S. PATENT DOCUMENTS 5,353,859 A * 10/1994 Oltahfer .................... E06B 9/82 160/310
5,368,084 A * 11/1994 Hying ..................... E06B 9/581 160/310
5,540,269 A * 7/1996 Plumer ..................... E06B 9/84 160/3
5,601,133 A * 2/1997 Krupke ................... E06B 9/581 160/265
6,089,305 A * 7/2000 Gruben ..................... E06B 9/13 160/264
6,243,006 B1 * 6/2001 Rejc .......................... E06B 9/82 160/133
6,598,648 B1 * 7/2003 Schulte ..................... E06B 9/13 160/310
6,964,289 B2 * 11/2005 Schulte ................... E06B 9/581 160/310
7,034,682 B2 * 4/2006 Beggs ..................... E05F 15/42 49/27
7,036,549 B2 * 5/2006 Coenraets ................. E06B 9/13 160/271
7,151,450 B2 * 12/2006 Beggs ....................... E06B 9/88 340/545.7
7,665,506 B2 * 2/2010 Coenraets ............... E06B 9/581 160/266
7,762,304 B2 * 7/2010 La Marca ................. E06B 9/88 160/267.1
8,037,921 B2 * 10/2011 Dondlinger ............. E06B 9/581 160/264
8,360,132 B2 * 1/2013 Drifka ....................... E06B 9/13 160/195
8,857,498 B2 * 10/2014 Dondlinger ............... E06B 9/56 160/264
9,140,063 B2 * 9/2015 Eggert .................... E05F 15/48
9,222,304 B2 * 12/2015 Casey ..................... E06B 9/581
9,493,984 B2 * 11/2016 Casey ..................... E06B 9/581
9,671,523 B2 * 6/2017 Gelineau .................. G01V 8/20
9,970,230 B2 * 5/2018 Scholten ................. E05F 15/74
10,087,049 B2 * 10/2018 Collins ................... B66B 13/26
10,619,397 B2 * 4/2020 Gregoriou ................. E06B 9/68
10,809,680 B2 * 10/2020 Abraham ................ E06B 9/322
11,059,176 B2 * 7/2021 Arora ................. G05B 23/0272
11,068,991 B2 * 7/2021 Przechocki ............ G06N 20/00
11,236,540 B2 * 2/2022 Gregoriou ................. E06B 9/68
11,518,051 B2 * 12/2022 Vu .......................... F16P 3/142
11,708,722 B2 * 7/2023 Beggs ....................... E06B 9/13 160/270
11,952,825 B2 * 4/2024 Beggs ..................... E06B 9/581
2007/0277943 A1 * 12/2007 Boerger .................. E06B 9/581 160/273.1
2008/0022596 A1 * 1/2008 Boerger .................... E06B 9/82 49/31
2009/0313898 A1 * 12/2009 Manaras .................. E06B 9/15 49/31
2010/0032105 A1 * 2/2010 Drifka .................. E05D 15/165 160/310
2010/0325959 A1 * 12/2010 De Coi ................... E05F 15/74 49/28
2012/0325588 A1 * 12/2012 Loeb ...................... B66B 13/26 187/247
2013/0062511 A1 * 3/2013 De Coi ................... E05F 15/74 250/222.1
2014/0110064 A1 * 4/2014 Eggert .................... E05F 15/48 324/207.13
2014/0305600 A1 * 10/2014 Casey .................... E06B 9/581 160/405
2014/0345812 A1 * 11/2014 Casey ....................... E06B 9/13 160/405
2016/0348429 A1 * 12/2016 Frede ........................ E06B 9/15
2016/0348430 A1 * 12/2016 Lorenzani ................. E06B 9/13
2016/0369557 A1 * 12/2016 Vandermillen ........... E06B 9/68
2017/0074039 A1 * 3/2017 Gregoriou ................. E06B 9/68
2017/0218683 A1 * 8/2017 Shanahan ............. E05D 15/264
2017/0254141 A1 * 9/2017 Iglesias Ballester ... E05F 15/43
2019/0231105 A1 * 8/2019 Pointeau ............ G07C 9/00896
2020/0173231 A1 * 6/2020 Drifka ........................ E06B 9/13
2020/0355014 A1 * 11/2020 Gregoriou ................. E06B 9/68
2021/0071476 A1 * 3/2021 Beggs ....................... E06B 9/68
2021/0071746 A1 3/2021 Kim
2021/0363806 A1 * 11/2021 Pincher ................... E05F 15/40
2022/0356743 A1 * 11/2022 Beggs ..................... E05F 15/79
2022/0356758 A1 * 11/2022 Lewan ...................... E06B 9/13
2023/0203876 A1 * 6/2023 Gregoriou ............... E05F 15/74 160/7
2024/0127354 A1 * 4/2024 Przechocki ........... H04L 67/125

OTHER PUBLICATIONS

Bea, "LZR-i30 Laser Scanner for Industrial Doors User's Guide," 12 pages.
Bea, "LZR-Microscan Standalone, Door-Mounted, Swing Door Safety System," 2 pages.
Bea, "Falcon/XL Opening Sensor for Automatic Industrial Doors," 2 pages.
Wikipedia, "Infrared thermometer," Aug. 16, 2020, retrieved from Internet at https://en.wikipedia.org/w/index.php?title=Infrared thermometer&oldid=973300779 on Aug. 21, 2020, 5 pages.
International Searching Authority, "Invitation to Pay Additional Fees," issued in connection with International Patent Application No. PCT/US2022/027810, mailed on Aug. 19, 2022, 15 pages.
United States Patent and Trademark Office, "Notice of Allowance," issued Dec. 5, 2023 in connection with U.S. Appl. No. 17/738,814, 8 pages.
International Searching Authority, "International Search Report," issued in connection with International Patent Application No. PCT/US2022/027810, mailed on Oct. 13, 2022, 5 pages.
International Searching Authority, "Written Opinion of the International Searching Authority," issued in connection with International Patent Application No. PCT/US2022/027810, mailed on Oct. 13, 2022, 10 pages.
United States Patent and Trademark Office, "Non-Final Office Action," issued in connection with U.S. Appl. No. 17/738,814, mailed on Aug. 3, 2023, 8 pages.
United States Patent and Trademark Office, "Notice of Allowance," issued in connection with U.S. Appl. No. 17/738,814, dated Feb. 20, 2024, 3 pages.
International Searching Authority, "International Preliminary Report on Patentability," issued in connection with International Application No. PCT/US2022/027810, mailed on Nov. 16, 2023, 12 pages.
European Patent Office, "Communication pursuant to Article 94(3) EPC," issued in connection with European Patent Application No. 22725121.2, dated Dec. 20, 2024, 5 pages.

* cited by examiner

METHODS AND APPARATUS TO MONITOR AND/OR ADJUST OPERATIONS OF DOORS

RELATED APPLICATION

This patent arises from a continuation of U.S. patent application Ser. No. 17/738,814 (now U.S. Pat. No. 11,952,825), which was filed on May 6, 2022, and which claims the benefit of U.S. Provisional Patent Application No. 63/185,838, which was filed on May 7, 2021. U.S. patent application Ser. No. 17/738,814 and U.S. Provisional Application No. 63/185,838 are incorporated herein by reference in their entireties. Priority to U.S. patent application Ser. No. 17/738,814 and U.S. Provisional Patent Application No. 63/185,838 is claimed.

FIELD OF THE DISCLOSURE

This disclosure relates generally to doors, and, more particularly, to methods and apparatus to monitor and/or adjust operations of doors.

BACKGROUND

A variety of power-operated doors have movable door panels for selectively blocking and unblocking a passageway through a doorway. Door panels come in various designs and operate in different ways. Examples of some door panels include a rollup panel (e.g., pliable or flexible sheet), a rigid panel, a flexible panel, a pliable panel, a vertically translating panel, a horizontally translating panel, a panel that translates and tilts, a swinging panel, a segmented articulated panel, a panel with multiple folding segments, a multilayer thermally insulated panel, and various combinations thereof including doors formed of more than one panel.

Figure 1:
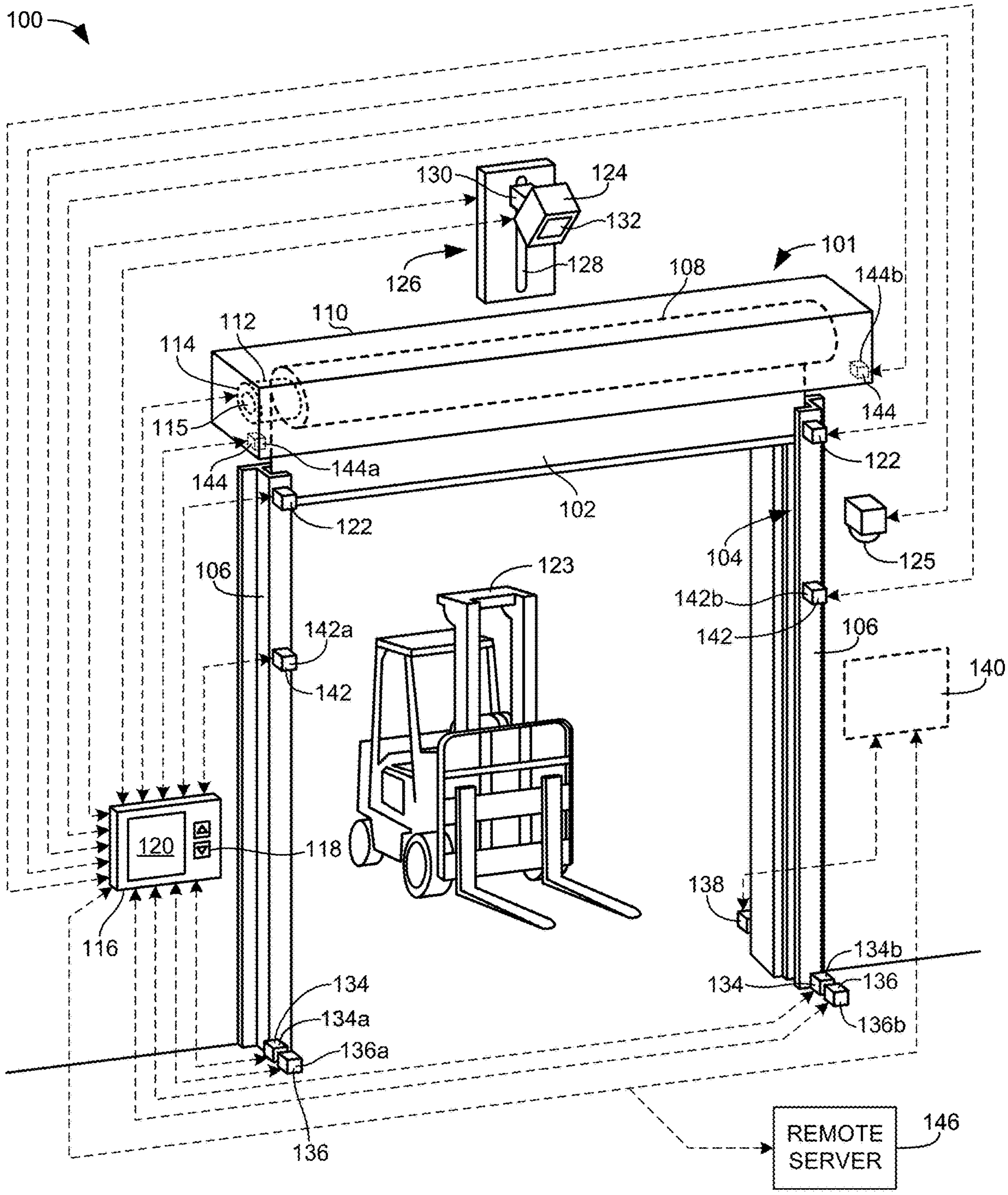
FIG. 1 is an example door system constructed in accordance with teachings disclosed herein.

The figures are not necessarily to scale. In general, the same reference numbers will be used throughout the drawing(s) and accompanying written description to refer to the same or like parts. As used herein, connection references (e.g., attached, coupled, connected, and joined) can include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" can be used to refer to an element in the detailed description, while the same element can be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Industrial power-operated door systems are frequently used in warehouses, material handling facilities, and other industrial settings. Often, such door systems include a controller that can activate (e.g., open or close) a door in response to user input and/or feedback from one or more sensors of a door system. In addition to providing feedback to trigger the activation of a door, sensors in a door system can be implemented to monitor and/or affect the operations of the door system in other ways. For example, sensor feedback indicative of traffic on one side of the door can trigger a warning signal (e.g., a light, a sound, etc.) on the opposite side of the door. As another example, sensors can monitor the space in an open doorway and prevent the door from closing if someone or something is detected within the doorway.

Examples disclosed herein take advantage of existing sensors associated with door systems and/or new/additional sensors to gather data that can be analyzed (e.g., in combination, in isolation, etc.) to gain insights about the operational state of the door system, to gain insights about the conditions of the surrounding environment, and/or to facilitate adjustments to the operations of the door system in a manner that can improve efficiency, increase safety, and/or reduce wear and/or damage to the components of the door system.

Figure 2:
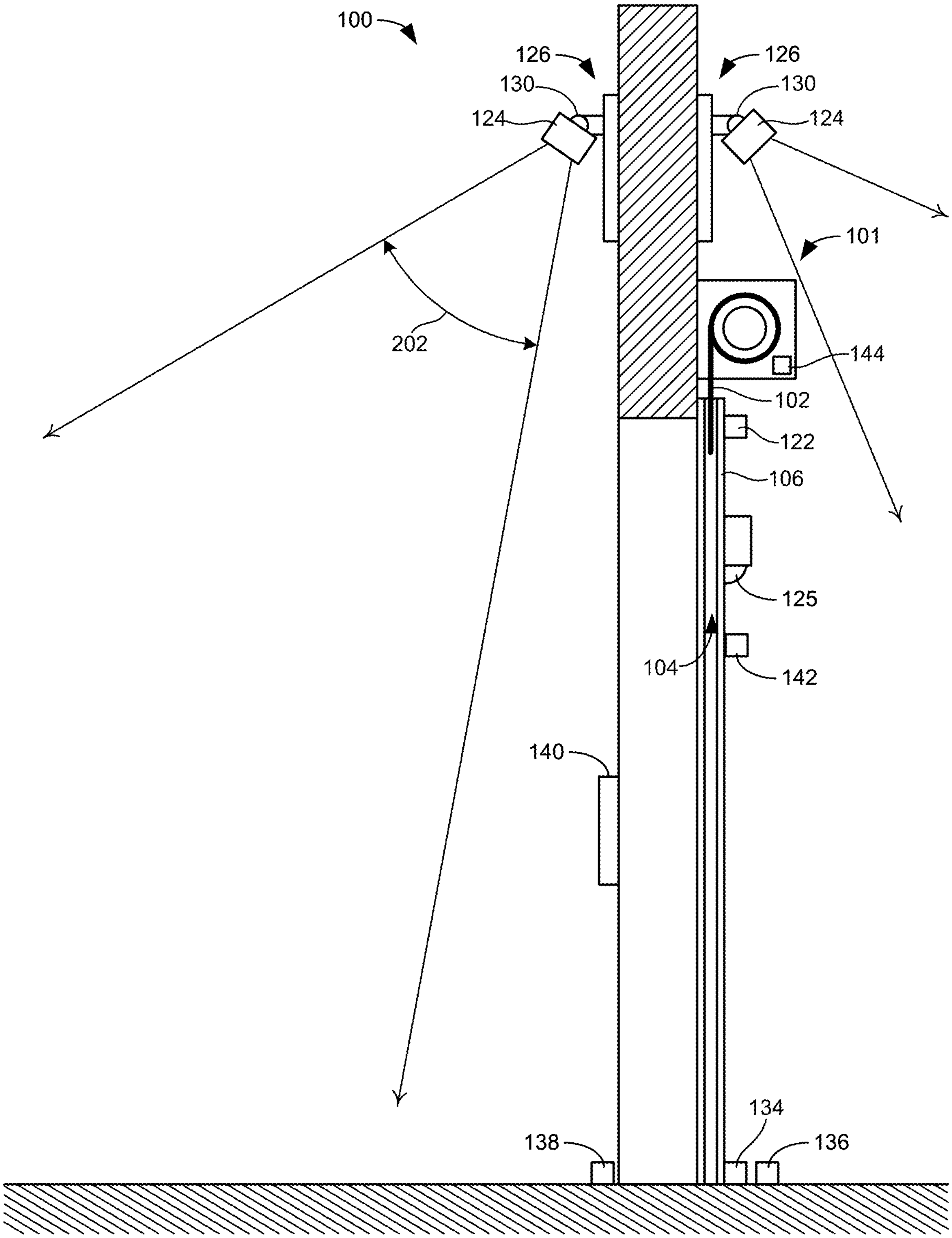
FIG. 2 is a cross-sectional view of the example door system of FIG. 1.
Figure 3:
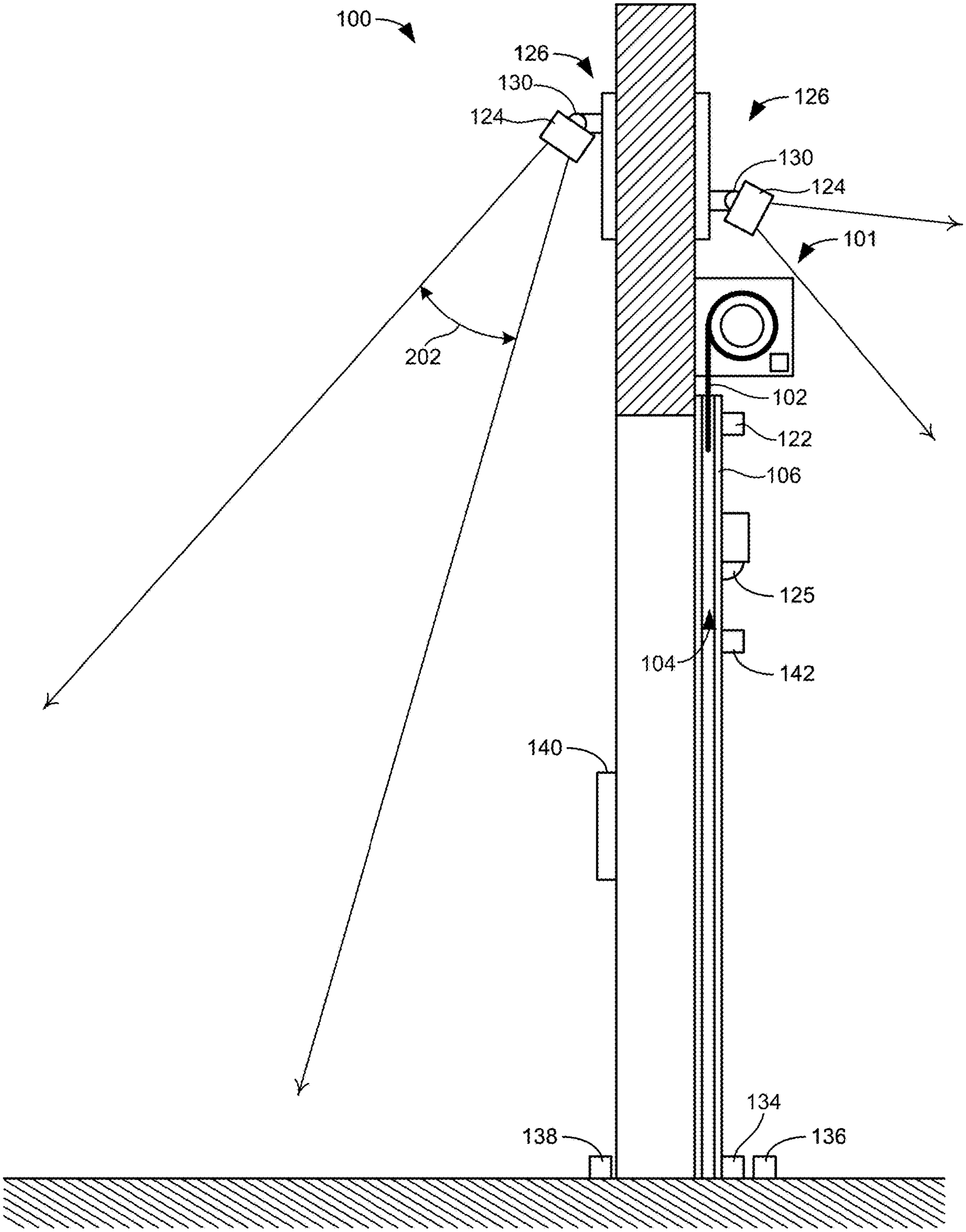
FIG. 3 is a similar view to FIG. 2 but showing example position, orientation, and/or field of view of example sensors in example adjusted positions.

FIGS. 1-3 illustrate an example door system 100 for a door 101 that includes a door panel 102 in a fully open position to permit traffic (e.g., pedestrians, fork trucks, etc.) to pass through a doorway. In this example, the door panel 102 is a flexible sheet or curtain that includes lateral edges that are retained within channels 104 of respective left and right guides or tracks 106. The door panel 102 of the illustrated example moves upward and downward within the track between a fully open position (e.g., as shown in FIG. 1) and a fully closed position (e.g., when the door panel 102 blocks passage through the doorway). In the illustrated example, movement of the door panel 102 relative to the doorway is accomplished by wrapping or unwrapping the door panel 102 around a roller, drum, or mandrel 108 contained within a housing 110 proximate (e.g., above) the doorway. More particularly, in this example, the roller 108 is driven by a motor control unit 112 with a motor 114 that rotates the roller 108 in a first rotational direction to draw and roll up the door panel 102 toward a fully open position (e.g., as illustrated) or in a second rotational direction opposite the first rotational direction to unroll and payout the door panel 102 to a fully closed position (e.g., in which passage through the doorway is blocked by the door panel 102). In some examples, rather than being wrapped around the roller 108, the lateral edges of the door panel 102 can be driven by the motor 114 along a storage track positioned proximate (e.g., above) the doorway to store the door panel 102 when the door panel 102 is in the fully open position. In such examples, the storage track proximate (e.g., above) the doorway can follow any suitable path (e.g., straight, bent, coiled, etc.).

In some examples, the activation, speed, and/or direction of rotation of the motor 114 can be controlled by a controller 116 communicatively coupled with the motor 114. In some examples, control signals from the controller 116 are provided directly to the motor 114. Additionally or alternatively, in some examples, input signals to the motor 114 are provided from the motor control unit 112, which functions as a separate controller to the controller 116 shown in FIG. 1. The input signals from the motor control unit 112 can be based on or independent of control signals provided from the controller 116. In some examples, the motor control unit 112 (and/or the motor 114) provides feedback to the controller 116 to indicate the status of the motor 114 and/or associated components (e.g., rotational speed, current draw, rotational position (e.g., indicated by an encoder 115), etc.)

In this example, the controller 116 includes one or more buttons or switches 118 to receive user inputs that can activate and/or direct the operation of the door system 100. Further, the example controller 116 of the illustrated example includes a display screen 120 to provide a visual output to a user indicative of the status of the door system 100, particular components of the door system 100, and/or any other relevant information. In some examples, the display screen 120 can be a touchscreen to enable a user to provide inputs to the controller 116. In some such examples, the physical buttons or switches 118 can be omitted.

As shown in the illustrated example, the controller 116 is communicatively coupled with various sensors associated with the door system 100 to receive additional inputs (e.g., sensor feedback) that the controller 116 can process to monitor and/or adjust the operation of components of the door system 100. For instance, in the illustrated example, the door system 100 includes one or more breakaway sensors 122. The example breakaway sensors 122 are constructed to detect when one or both lateral edges of the door panel 102 are displaced or pulled out of (e.g., breakaway from) the channels 104 of the tracks 106 due to an impact with the door panel 102. In some examples, the breakaway sensors

122 can detect the extent to which (e.g., how much of) the door panel 102 was pulled out of the channels 104. Further, in some examples, the breakaway sensors 122 can detect a height of a partially open position of the door panel 102 at the time that the breakaway event occurred (e.g., a height of a lower edge of the door panel 102 relative to the ground at the time of impact). In the illustrated example, the breakaway sensors 122 are located near the upper ends of the tracks 106. However, in other examples, the breakaway sensors 122 can be positioned at different points (e.g., a midpoint) along the tracks 106. In some examples, the breakaway sensors 122 (e.g., multiple breakaway sensors) can be distributed at different points along the tracks 106. Further, in some examples, the breakaway sensors 122 can be positioned inside the channels 104 of the tracks 106 and/or incorporated into the lateral edges of the door panel 102. Example breakaway sensors 122 and associated breakaway detection systems are described in U.S. patent application Ser. No. 17/016,019, which is incorporated herein by reference in its entirety.

Typically, breakaway events are the result of an impact with the door panel 102 by a fork truck 123 or other vehicle that passes through the doorway while the door panel 102 is in a position that blocks at least a portion of the doorway (e.g., a partially open position). There can be instances where an impact occurs but the door panel 102 does not actually separate from the tracks 106. In some examples, such door impact events can still be detected by the breakaway sensors 122 and/or other sensors (e.g., a reversing edge sensor that detects when the leading edge of the door panel 102 comes into contact with an object other than the ground). Multiple factors can contribute to causing a breakaway event including, for example, the door panel 102 opening too slowly, opening too late, and/or closing too early. In response to detecting breakaway events using the breakaway sensors 122, the controller 116 of the illustrated example generates an alert or notification to relevant personnel so that they can adjust the operation of the door system 100 (e.g., to open sooner in response to an approaching fork truck 123, open faster, and/or stay open longer). In some examples, the controller 116 automatically (e.g., without direct human input) adjusts the operation of the door system 100 in response to detecting breakaway events.

In some examples, determining what to adjust and/or how to adjust the door system operations can be based on feedback from other sensors. For instance, in the illustrated example, the door system 100 includes a ranging sensor 124 (e.g., a radio detection and ranging (RADAR) sensor, a light detection and ranging (LiDAR) sensor, etc.) on either side of the doorway that scans the area adjacent the doorway to detect oncoming traffic. Additionally or alternatively, the door system 100 of the illustrated example includes an infrared-based motion and/or presence sensor 125 to detect motion and/or the presence of oncoming traffic in a vicinity of the doorway. When traffic is detected, the ranging sensor 124 and/or the motion sensor 125 transmits a signal to the controller 116 that, in turn, transmits a signal to the motor control unit 112 to activate the motor 114 to move the door panel 102. The ranging sensor 124, the motion sensor 125, the buttons or switches 118 and/or any other mechanism that can trigger the activation of the door panel 102 is generally referred to herein as a door activation sensor. The door panel 102 being impacted on a relatively frequent basis, thereby causing relatively frequent breakaway events, can indicate that the ranging sensor 124 and/or the motion sensor 125 is detecting traffic too late such that there is insufficient time for the door panel 102 to fully open and provide a clear passage for traffic through the doorway. In such examples, there can be a need to adjust a position, orientation, and/or field of view of one or more of the sensors 124, 125 so that traffic is detected sooner and impacts with the door panel 102 are reduced.

In other scenarios, the ranging sensor 124 and/or the motion sensor 125 can activate the door 101 based on traffic that was not intending to pass through the doorway but was merely passing by and/or approaching the door 101 and then turning to proceed in a different direction (e.g., away from the doorway) without passing through the doorway. Opening the door panel 102 in response to the detection of traffic when no traffic ends up passing through the doorway is referred to herein as a false activation. In the illustrated example, false activations are detected by monitoring feedback from one or more photo-eye sensors 134, 136 positioned near a lower portion (e.g., a bottom) of the doorway (e.g., following activation of the door system 100). More particularly, the photo-eye sensors 134, 136 of the illustrated example are set up to be tripped or triggered when an object is detected passing through (e.g., interrupting or breaking) beams extending between corresponding emitters **134*a*, 136*a* and receivers 134*b*, 136*b* of the sensors 134, 136. Thus, if the door system 100 is an open position but the photo-eye sensors 134, 136 are not tripped within a threshold period of time after movement of the door system 100 to the open position (and/or until the door 101 is moved to the closed position), that is an indication that an object did not pass through the doorway and a false activation can be inferred. False activations can contribute to energy losses because opening the door 101 when not actually needed can result in the release of conditioned air, thereby requiring cooling and/or heating systems to work harder to maintain desired temperatures. Accordingly, to save energy, there may be a need to adjust a position, orientation, and/or field of view of one or more of the sensors 124, 125 so that traffic that is not intending to go through the doorway is not inadvertently detected, thereby triggering the opening of the door panel 102** (e.g., a false activation).

Accordingly, there can be multiple different reasons why the controller 116 would determine that the ranging sensor 124 and/or the motion sensor 125 (or some other sensor) may need to be adjusted. In some examples, the controller 116 can identify the need for such adjustments based on feedback from the sensors (e.g., the breakaway sensors 122, the ranging sensors 124, the motion sensor 125, and/or the photo-eye sensors 134, 136) and generate an alert or notification that is provided to relevant personnel to respond by making suitable adjustments.

In other examples, the controller 116 can automatically make adjustments by operating a sensor adjustment system 126 capable of changing a position, orientation, and/or field of view (e.g., a sensing region and/or associated sensing range) of a sensor. For purposes of illustration, the example sensor adjustment system 126 is shown and described in connection with the ranging sensor 124 of FIG. 1. However, any of the aspects of the sensor adjustment system 126 described herein can be suitably adapted for implementation in connection with the motion sensor 125 and/or any other sensors described herein. The sensor adjustment system 126 of the illustrated example includes an actuator to move or translate the ranging sensor 124 along a rail or track 128 of the sensor adjustment system 126, thereby enabling the position of the ranging sensor 124 to be changed relative to the rest of the door system 100. In the illustrated example, the track 128 extends vertically so that the ranging sensor 124 can be moved up and/or down (e.g., as demonstrated by the different positions of the ranging sensor 124 on the right-hand side (as depicted in the drawings) of the doorway in FIGS. 2 and 3). However, in other examples, the track 128 can be positioned horizontally or in any other suitable direction (e.g., diagonally). Further, in some examples, the sensor adjustment system 126 can include multiple tracks and/or other mechanisms to enable the ranging sensor 124 to move in two dimensions (e.g., both vertically and horizontally) or even three dimensions (e.g., in a plane parallel to the door panel 102 in the closed position or in a direction normal to the plane of the door panel 102 in the closed position). The sensor adjustment system 126 of the illustrated example includes an orientation actuator 130 capable of causing the ranging sensor 124 to pan and/or tilt so that the ranging sensor 124 can be oriented in different directions (e.g., as demonstrated by the different tilt of the ranging sensor 124 on the right-hand side (as depicted in the drawings) of the doorway in FIGS. 2 and 3). Additionally or alternatively, the sensor adjustment system 126 can include an adjustable aperture or window 132 that can change size to adjust the field of view of the ranging sensor 124 (e.g., as demonstrated by the different angle of view 202 of the ranging sensor 124 on the left-hand side of the doorway in FIGS. 2 and 3). Additionally or alternatively, the sensor adjustment system 126 can include one or more optical elements (e.g., a lens) to adjust the field of view by zooming in or out.

In some examples, sensors can be used to detect and monitor the speed of traffic passing through the doorway. A fork truck 123 that is moving too fast may impact the door panel 102 to cause a breakaway even if the door 101 was activated within a suitable time based on properly positioned sensors. Even if impacts do not occur, monitoring the speed of traffic can be useful for other safety purposes and/or to gain a greater understanding of how traffic moves through the doorway associated with the door system 100. Additionally or alternatively, the sensors can be used to determine the direction of traffic, which can also be useful to understand traffic patterns and flow through the doorway.

In some examples, the ranging sensor 124 implementing LiDAR sensing is capable of determining the speed and/or direction of detected objects by monitoring multiple different sensing zones (e.g., a safety zone, an activation zone, a presence zone, etc.) defined by multiple different laser planes emanating from the sensor at different angles. In some examples, LiDAR measurements are made with respect to each of the laser planes. Due to the different angles of the laser planes, traffic passes through the planes at different times. Thus, by tracking the time at which each laser plane is crossed, the speed of traffic can be calculated. More particularly, the speed can be calculated by dividing the distance between the laser planes (e.g., as determined by the angle between the planes) by the time difference between the traffic crossing separate (e.g., adjacent) ones of the laser planes. Likewise, the direction of traffic can be determined based on an order in which each of the laser planes are crossed. For example, assume that the laser planes define three different zones including: (1) a safety zone nearest the doorway, (2) an activation zone farthest from the doorway, and (3) a presence zone between the other two zones). In such an example, if an object is detected in the activation zone before being detected in the safety zone, it can be inferred that the object is moving towards the doorway. By contrast, if the safety zone is the first zone to be tripped followed by the other zones, it can be inferred that the detected object is moving away from the doorway.

Additionally or alternatively, the motion sensor 125 can be set to a unidirectional detection mode so as to detect the detection of traffic in the configured direction. If detection of traffic both approaching and moving away from the doorway is desired, two separate motion and/or presence sensors 125 can be configured for unidirectional detection with the direction of motion sensing being the opposite to the other sensor.

In some examples, the photo-eye sensors 134, 136 can be used to determine the speed and/or direction of traffic. In this example, the photo-eye sensors 134, 136 include an emitter 134*a*, 136*a* and a corresponding receiver 134*b*, 136*b*, which are in communication with controller 116. In other examples, one or both of the photo-eye sensors 134, 136 can be a retro-reflective sensor with the emitter and receiver contained in the same housing. Door systems frequently include one photo-eye to detect when someone or something is passing through the doorway to prevent the door from closing. However, in examples disclosed herein, there are a series of at least two photo-eye sensors 134, 136 arranged side-by-side in the direction of travel through the doorway at a fixed distance apart that is stored in the memory of the controller 116. Similar to the separate laser planes or associates sensing zones of the ranging sensor 124, each photo-eye sensors 134, 136 will be tripped or triggered at a slightly different time as traffic passes through the doorway due to the spacing of or distance between the sensors 134, 136. By tracking the time when each sensor 134, 136 is tripped and dividing the distance between the sensors by the time difference, the controller 116 can determine the speed of traffic. Similarly, by tracking the order in which the series of sensors 134, 136 are tripped, the direction of traffic can also be determined.

In the illustrated example, the photo-eye sensors 134, 136 are positioned on the same side of the doorway. However, in other examples, the speed and/or direction of traffic can be determined based on the time difference between traffic detected between either one of the photo-eye sensors 134, 136 on a first side of the doorway and a separate photo-eye sensor 138 on the opposite side of the doorway. In such examples, one of the photo-eye sensors 134, 136 can be omitted. In other examples, all three sensor can be used for redundancy. As represented in the illustrated example, the photo-eye sensor 138 on the opposite side of the doorway is in communication with a second controller 140 that is also on the opposite side of the doorway from the controller 116. In some such examples, the first controller 116 is in communication with the second controller 140 so that sensor feedback data collected by the two controllers 116, 140 can be used together. In other examples, the photo-eye sensor 138 (and/or any other sensors) on the opposite side of the doorway can be in direct communication with the first controller 116 (e.g., and the second controller 140 can be omitted).

In some examples, different sensors can be arranged to independently detect the direction of traffic on both sides of the doorway at the same time. For instance, as shown in FIGS. 2 and 3, a separate ranging sensor 124 is positioned on either side of the door to monitor traffic on either side of the door. Similarly, in some examples, separate motion or presence sensors 125 can be positioned on either side of the door. In some examples, the ranging sensors 124 are used to detect motion and/or presence such that separate motion or presence sensors 125 are unnecessary. Monitoring traffic on either side of the door in this manner can provide information about how frequently traffic approaches the door from both sides at the same time, thus, giving rise to the potential for a collision (e.g., a near miss). By tracking near misses over time, adjustments to traffic flows and/or other safety measures can be taken.

The photo-eye sensors 134, 136, 138 can be used to determine other information about the operation of the door system 100 and/or the traffic passing therethrough. As mentioned above, any one of the photo-eye sensors 134, 136, 138 can be used to detect a false activation (in conjunction with data indicating that the door 101 has been activated (e.g., triggered by the ranging sensor 124, the motion sensor 125, a person pressing a suitable button or switch 118 on the controller 116, etc.)). False activations indicate that no traffic passed through the doorway while the door panel 102 was opened. In some examples, the photo-eye sensors 134, 136, 138 can detect that traffic did pass through but that the doorway was cleared of traffic well before the door panel 102 is closed. That is, the photo-eye sensors 134, 136, 138 can initially detect traffic passing through the doorway soon after the door 101 is opened, but then no longer detect traffic shortly thereafter while the door panel 102 remains open until it eventually closes. A relatively long period of time during which no traffic is detected after traffic has initially been detected can indicate that the door panel 102 is opened longer than required to allow traffic to pass through. Accordingly, in some examples, the controller 116 can adjust the reclose timer for the door 101, thereby reducing the duration that the door 101 is opened to save on energy costs.

In some examples, rather than tracking the duration over which the door panel 102 is opened but nothing is detected as crossing the beam of the photo-eye sensors 134, 136, the controller 116 can additionally or alternatively track the duration over which something is detected as crossing the beam of the photo-eye sensors 134, 136. In some examples, the door panel 102 remains open for as long as something is detected by the photo-eye sensors 134, 136 to ensure that the door panel 102 does not close on something or someone that trips the photo-eye sensors 134, 136. However, if something is detected for a relatively long period of time (e.g., above a threshold), the controller 116 can generate an alert or notification and/or otherwise log an excessively long open time and/or that there is an object in the doorway that has not moved for at least the length of the threshold.

In some examples, one or more of the sensors can be used to distinguish between pedestrian traffic and fork trucks. More particularly, in some examples, the ranging sensor 124 can determine a size of an object within range of the laser planes generated by the ranging sensor 124 to infer or determine a type of traffic (e.g., pedestrian or fork truck). Additionally or alternatively, while the photo-eye sensors 134, 136 at the base of the tracks 106 cannot directly determine the type of traffic, in some examples, another photo-eye sensor 142 (including a transmitter 142*a* and a receiver 142*b*) is positioned at a height above the typical height for most humans (e.g., above 6 feet) but below a typical height of fork trucks 123. Positioned at such a height, pedestrians pass under the beam of the photo-eye sensor 142 when passing through the doorway without triggering the sensor. By contrast, when a fork truck 123 passes through the doorway, the fork truck 123 triggers the photo-eye sensor 142, which sends a corresponding signal to the controller 116. As a result, depending on whether the controller 116 receives a signal from the elevated photo-eye sensor 142, the controller 116 can determine whether the traffic corresponds to pedestrian traffic or vehicular traffic. Notably, to distinguish the pedestrian from a false activation (in which no traffic passes through the doorway), a separate sensor (e.g., one of the photo-eye sensors 134, 136 at the base of the tracks 106) can be used in combination with the elevated photo-eye sensor 142 to confirm that something or someone did, in fact, pass through the doorway.

In some examples, feedback from the sensors can indicate other types of information about the operation of the example door system 100. For instance, various sensors associated with the motor control unit 112 (e.g., a current sensor, a torque sensor, rotational speed sensor, and/or an encoder position sensor (e.g., the encoder 115)) can indicate a speed of movement of the door panel 102 when moving to the open position or the closed position. In some examples, this sensor feedback data can be compared to the command speed provided by the controller to the motor control unit 112. Differences between the command speed and the actual speed of movement of the door panel 102 can indicate the presence of high friction between the door panel 102 and tracks 106 due to wind load or pressure on the door panel, maintenance and/or other issues. Also, feedback from a current sensor can be used to detect a rise in current used to drive the motor indicative of the motor 114 working harder due to the presence of high friction based on wind load or pressure and/or other issues. Further, high friction due and/or other issues due to wind load or pressure can additionally or alternatively be detected by a wind sensor and/or a pressure sensor. Thus, in some examples, when such issues are detected, the controller 116 can trigger the generation of an alert and/or notification to maintenance personnel to look into the issue. In some examples, the above sensor feedback data can be combined with data from other sensors such as the breakaway sensors 122 and/or bag-up sensors 144 to gain further insights into the state of the door system 100. In some examples, the bag-up sensors 144 correspond to a photo-eye sensor transmitter 144*a* and a corresponding photo-eye sensor receiver 144*b* that produces a beam that extends in front or behind the door panel 102. In normal operations, the beam remains unbroken and spaced apart from the door panel 102. However, in situations where the door panel 102 is prevented from moving down the tracks 106 while unrolling toward the closed position (e.g., during high friction scenarios and/or when there is some other blockage), the door panel 102 will bag up and cross the beam of the bag-up sensor 144. When the controller 116 receives a signal from the bag-up sensor 144 indicating the door panel 102 is bagging up, the controller 116 determines that something is inhibiting the free movement of the door panel 102 such as wind load, pressure load, maintenance issues, etc.

In some examples, the controller 116 can monitor the stop position of the door panel 102 over time to detect potential wear of a drop brake of the door system 100. More particularly, as a drop brake begins to wear, the door panel 100 can take more time to stop and, therefore, travel a farther distance than intended before coming to a complete stop. In other words, brake wear can result in an actual stop position of the door panel 102 to overshoot an intended, commanded or desired stop position. In some examples, the stop position is determined based on feedback from an encoder position of the motor control unit 112. In some examples, as wear is detected (based on a change in the stop position of the door panel 102 relative to a commanded stop position), the stop position for the door panel 102 can be adjusted to account for the longer time needed for the drop brake to bring the door panel to a complete stop so that the actual stop position corresponds to the intended or desired stop position in spite of the fact that the brake is exhibiting wear so as to operate less efficiently. Further, in some examples, if the amount of wear exceeds a threshold (e.g., as determined based on the stop position being adjusted by more than a threshold), the controller 116 can generate an alert and/or notification to a maintenance personnel to mechanically adjust and/or replace the braking system.

In some examples, a brake failure can result in the door panel 102 moving (e.g., falling under its own weight form) when there is no expectation of movement (e.g., the door panel 102 is intended to be at rest in an open position). Such a brake failure presents a potential hazard to traffic passing through an associated doorway and presents a risk of damage to the door panel 110 and/or other components associated with the door 101. In some examples, the controller 116 can determine such a brake failure has occurred by monitoring the movement of the door panel 102 when the door panel 102 is expected to be at rest (e.g., not moving). More particularly, in some examples, when the door panel 102 is in the open position, the controller 116 monitors feedback from the encoder 113 of the motor control unit 112. If movement is detected, the controller 116 activates the motor 114 to engage an associated drive system with the door panel to prevent the door panel 102 from free falling. Further, in some examples, the controller 116 drives the door panel 102 to the fully closed position and, once in the fully closed position, switches the door 101 to a fault state in which the door panel 102 is in a locked position to prevent the door 101 until the brake failure can be resolved. Further detail regarding the implementation of brake failure monitoring is provided below in connection with FIG. 22.

In some examples, rather than respond to detected maintenance failures, the controller 116 can monitor feedback from the various sensors to identify possibilities for preventative maintenance (e.g., potential failures anticipated in advance of their occurrence so that corrective action can be taken). In some examples, the controller 116 can implement the corrective action automatically. In other examples, the controller 116 can generate an alert and/or notification to a maintenance personnel to implement any suitable corrective action.

As a specific example, in some instances, a torque sensor and/or rotational speed sensor associated with the motor 114 is used to determine the amount of torque and/or rotational speed (or frequency used to determine speed in an AC motor) needed to cause the door panel 102 to move while the brake is being applied to prevent movement. If the torque and/or speed needed to overcome the brake satisfies (e.g., exceeds) a threshold, the controller 116 can infer that the brake is functioning properly. However, if the torque and/or speed needed to overcome the brake and cause movement does not satisfy (e.g., is less than) the threshold, the controller 116 can infer that the brake is beginning to wear or fail. In some such examples, the amount of torque and/or speed applied to overcome the brake can be recorded over time with a shift (e.g., reduction) in the torque and/or speed over time indicative of wear to the brakes. In other examples, rather than applying torque and/or speed until the door panel 102 moves, the controller 116 may drive the motor with a torque and/or speed that is a threshold amount less than the threshold amount noted above (such that the door panel will not move if the brake is in good working order) but sufficient to move the door panel 102 when a failing (e.g., worn) brake is being applied. In such examples, brake wearing and/or failure is determined when movement of the panel 102 is detected and the brake is confirmed to be in good working order when no movement is detected. In the foregoing examples, the threshold for the torque and/or speed can be determined when a new brake is initially installed and/or calibrated by applying the brake and then monitoring the torque and/or speed needed to overcome the new brake to move the door panel 102. In such example, the torque and/or speed needed to overcome the brake is defined as the baseline or threshold for subsequent preventative maintenance tests. In some examples, the maintenance tests are performed as part of every open cycle of the door 101. In other examples, such maintenance tests are performed on some schedule (e.g., after threshold amount of time and/or after a threshold number of cycles) and/or at any other time (e.g., when initiated by maintenance personnel). Further detail regarding the implementation of preventative maintenance testing for brake wear and/or failure is provided below in connection with FIG. 23.

In some examples, feedback from one or more of the sensors associated with the door system 100 can be used to improve security of the facility where the door system 100 is implemented. For instance, in some examples, the ranging sensor 124, the motion sensor 125, the photo-eye sensors 134, 136, 138, 142, 144, and/or a reversing edge sensor at a time when the door system 100 is not to be used (e.g., during after-hours) can be used to infer someone may be attempting to tamper with and/or gain access to the door. More particularly, the controller 116 monitors feedback from one or more of these sensors during times when the door system 100 is not in use and not expected to be in use. If the feedback from the sensors indicates movement in the vicinity of the door and/or otherwise indicates someone is trying to use the door system 100 during such time periods, the controller 116 can generate an alert and/or notification indicating there is an unexpected and/or potentially unauthorized use of the door system. In some such examples, the controller 116 can generate and/or maintain schedules for activation of the door system 100 to identify when to analyze the sensor feedback for such circumstances. In some examples, such schedules can be input by a user via the buttons or switches 118 and/or display screen 120. In some examples, a person may attempt to tamper with the door by trying to log in to the controller 116 to change door settings (whether during or outside of normal usage hours). In some examples, the controller 116 can lockout a user for a set amount of time after a threshold number of failed attempts to enter a correct password. Additionally or alternatively, the controller 116 can generate an alert and/or notification that a person has failed to enter a correct password the threshold number of times.

In the illustrated example, the first and second controllers 116, 140 are in communication with a remote server 146. In some examples, one of the two controllers 116, 140 only communicates with the remote server 146 indirectly via the other controller. Further, in some examples, one of the two controllers 116, 140 can be omitted entirely. For purposes of explanation, only communications directly between the first controller 116 and the remote server 146 will be described. More particularly, in some examples, the first controller 116 transmits values corresponding to the operational and/or state parameters associated with the door system 100. In some examples, such information includes internal state(s) of the controller 116 itself. In some examples, the information provided to the remote server 146 includes sensor feedback data obtained from one or more of the motor control unit 112, the breakaway sensors 122, the ranging sensor 124, the motion and/or presence sensor 125, the photo-eye sensors 134, 136, 138, 142, the bag-up sensor 144 and/or any other sensor(s) associated with the door system 100. Further, in some examples, the information provided to the remote server 146 includes user input data received via the buttons or switches 118 and/or the display screen 120 (if the screen is touch sensitive).

In some examples, the controller 116 can analyze the sensor feedback data and provide the results of the analysis to the remote server 146 for further analysis and/or to take additional actions. For example, the controller 116 can determine that an alert and/or notification needs to be provided to relevant personnel based on an analysis of the feedback from different ones of the sensors as disclosed herein. In some examples, the controller 116 can transmit the alert and/or notification to the remote server 146 (along with any relevant information) and the remote server 146 then distributes the alert and/or notification to the relevant recipients of the alert and/or notification. In other examples, the controller 116 transmits the alert and/or notification directly to relevant recipients independent of the remote server 146. Additionally or alternatively, in some examples, the remote server 146 can perform the analysis on the sensor feedback data independent of any analysis and then take any suitable actions based on the results of the analysis. For instance, rather than the controller monitoring the sensor feedback data over time to detect issues that can trigger an alert, the remote server 146 can perform this function directly. In some examples, some functionality of the controller 116 and the remote server 146 can be duplicative and/or redundant. In other examples, the processing and/or handling of the sensor feedback data and what is done based on an analysis of such data can be divided between the controller 116 and the remote server 146. In some examples, the remote server 146 obtains sensor feedback data and/or the results of analyzing such data from multiple different controllers 116 associated with different door systems 100 and/or other systems in a facility. In this manner, the remote server 146 is able to aggregate data from disparate sources and perform a higher level analysis on the data to identify trends and/or other relationships that would not otherwise be possible.

Figure 4:
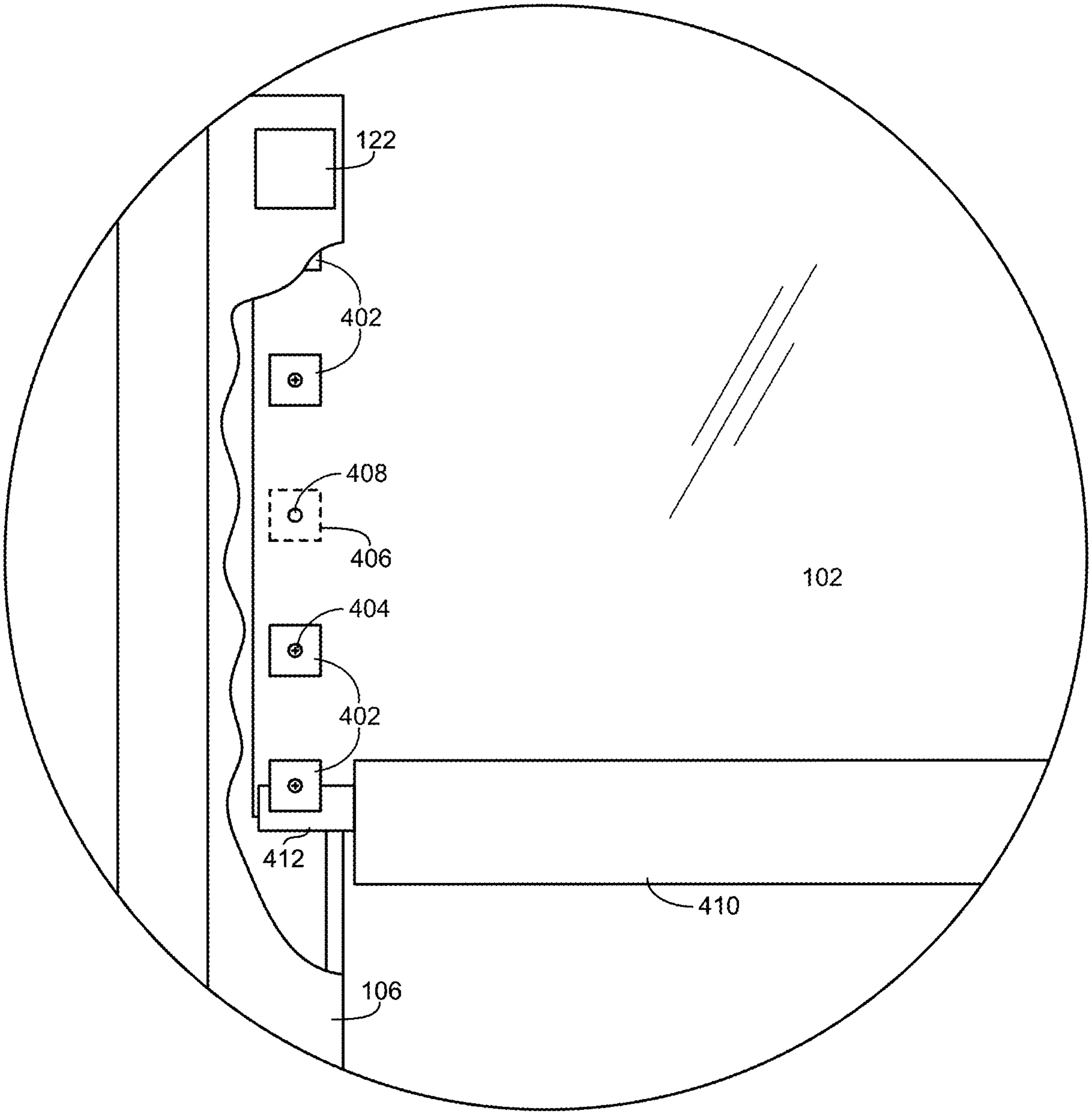
FIG. 4 is close up view of a portion of the example door system of FIG. 1.

FIG. 4 is close up view of a portion of the example door system 100 of FIG. 1. More particularly, FIG. 4 shows a partially cut-away view of the track 106 on the right side (as depicted in the drawing) of the doorway in FIG. 1 with the door panel 102 extending part way down the track 106. In some examples, a similar arrangement can be implemented in the other track 106 on the opposite side of the doorway. The front of the track 106 is cut away to show individual tabs or protrusions 402 distributed along the lateral edge of the door panel 102. The tabs 402 are positioned along the lateral edge of the door panel 102 to retain the door panel 102 within the tracks as the door panel 102 is moved between the open and closed positions. In this example, the tabs 402 are disposed entirely within the tracks 106. In other examples, at least a portion of the tabs 402 extend out of the track 106.

In some examples, the tabs 402 are attached to the door panel 102 by any suitable attachment mechanism 404 (e.g., a screw, a bolt, a pin, a rivet, etc.) that extends through a hole in the door panel 102. In some examples, the tabs 402 on the front side of the door panel 102 are attached to corresponding tabs on the backside of the door panel 102 through a corresponding hole.

In the illustrated example of FIG. 4, one of the tabs 402 is missing or removed from the door panel 102 (as represented by the dashed lines 406), thereby exposing the corresponding hole 408. Inasmuch as the tabs 402 are positioned at least partially within the track 106 (or completely in the track 106 in the illustrated example), it can be difficult to identify when a tab 402 has fallen off or is otherwise missing. In some examples, the breakaway sensors 122 used to detect breakaways, as mentioned above, can additionally or alternatively be used to detect the absence of one or more of the tabs 402. More particularly, in this example the breakaway sensor 122 is implemented with a photo-eye that emits a beam in a direction transverse to the door panel 102. As a result, when the door panel 102 is closed (or partially closed as shown in the illustrated example) the beam is crossed or blocked (e.g., a triggered state). A breakaway event can be detected when the door panel 102 is forced out of the track 106 so as to no longer cross the beam of the breakaway sensors 122 when such is expected (e.g., because the door panel 102 has not moved to the fully opened positioned with the leading edge of the door panel 102 being above the breakaway sensor 122). In the illustrated example of FIG. 4, the breakaway sensor 122 is aligned with the tabs 402 and, more particularly, aligned with the holes 408 used to attach the tabs 402 to the door panel 102. As a result, when a tab 402 is missing, thereby exposing the corresponding hole 408, the beam emitted by the breakaway sensors 122 passes through the hole 408 for a relatively brief period as the hole 408 moves past the breakaway sensor 122. Thus, a signal from the breakaway sensor 122 indicating the beam was momentarily unbroken (e.g., an unexpected, non-triggered state) can be used to detect the absence of one of the tabs 402. Furthermore, in some examples, the position of the door panel 102 (e.g., based on an encoder) at the time the signal was received can be used to determine the vertical location on the door panel 102 where the missing tab 402 is detected as missing. In some examples, detection of a missing tab 402 is distinguished from detection of a breakaway event (both of which involve the beam of the breakaway sensor 122 becoming unbroken or unblocked while the door panel 102 is in a closed or partially closed position) based on the duration during which the beam of the breakaway sensor 122 is unbroken or unblocked. In particular, the hole 408 is relatively small and passes by the breakaway sensor 122 relatively quickly as the door panel 102 moves. As a result, a missing tab 402 can be inferred when the beam is unbroken or unblocked for only a limited period of time (e.g., less than 500 milliseconds, less than 200 milliseconds, etc.) and/or for a limited change in position of the door panel 102 (e.g., less than or equal to the width of the hole 408). If the beam remains unbroken or unblocked for a longer period of time and/or while the door panel 102 is moved a larger distance, the signal reporting the unbroken or unblocked beam can be inferred to represent a breakaway event. As used herein, a condition in which the beam becomes unbroken or unblocked at an unexpected time (e.g., when the leading edge of the door panel 102 is below the beam such that it is expected that the door panel 102 would block, break, or interrupt the beam) is referred to herein as unexpected non-triggered condition or state.

In the illustrated example of FIG. 4, the leading edge of the door panel 102 includes a loop seal 410. The loop seal 410 is formed of a sheet of material that is attached to the front of the door panel 102, is looped under the door panel 102, and is attached to the backside of the door panel 102. In some examples, the loop seal 410 includes any suitable fill material disposed inside a cavity formed by the loop seal 410. In some examples, the loop seal 410 is empty on the inside. The loop seal 410 is resiliently deformable such that as the door panel 102 is moved to a closed position the loop seal 410 deforms as it sealingly engages with the floor to provide a seal between opposite sides of the door panel 102. In some examples, to provide adequate sealing along the leading edge of the door panel 102, the loop seal 410 is relatively large. As a result, as shown in the illustrated example, the loop seal 410 extends substantially up to but not into the tracks 106. This can result in potential leakage of air at the corners of the door panel 102. In some examples, to reduce such leakage, the leading edge of the door panel 102 includes secondary corner seals 412 that (e.g., are small enough to) extend into the track 106 towards the lateral edge of the door panel 102. In some examples, the corner seal 412 is also a loop seal formed of a sheet of material that loops under the bottom edge of the main body of the door panel 102 to deformably seal against the floor when the door panel 102 is in the closed position.

Just as the tabs 402 can fall off or otherwise go missing, the corner seal 412 can fall off, go missing, or simply wear away. Further, a missing or worn corner seal 412 may not be immediately noticed because of its relatively small size and/or location at the lateral edge of the door panel 102, which extends into the track 106. Accordingly, in some examples, the breakaway sensors 122 can additionally or alternatively be used to automatically detect when the corner seal 412 is missing or worn. In particular, if the corner seal 412 is missing, the beam emitted by the breakaway sensor 122 would become unbroken (e.g., a non-triggered condition) sooner than expected as the door panel 102 moves to the fully open position. In some examples, a missing corner seal 412 can be distinguished from a breakaway event based on the position of the door panel 102 (being nearly fully open) when the beam becomes unbroken (e.g., a non-triggered condition) making a breakaway event unlikely. Additionally or alternatively, a missing corner seal 412 would result in the beam of the breakaway sensor 122 becoming unbroken (e.g., a non-triggered condition) at the same position every time the door panel 102 cycles between the open and closed positions. Thus, in some examples, a missing corner seal 412 is identified when a breakaway event is detected near the fully open position over a threshold number of successive door cycles (e.g., an unexpected non-triggered condition).

Figure 5:
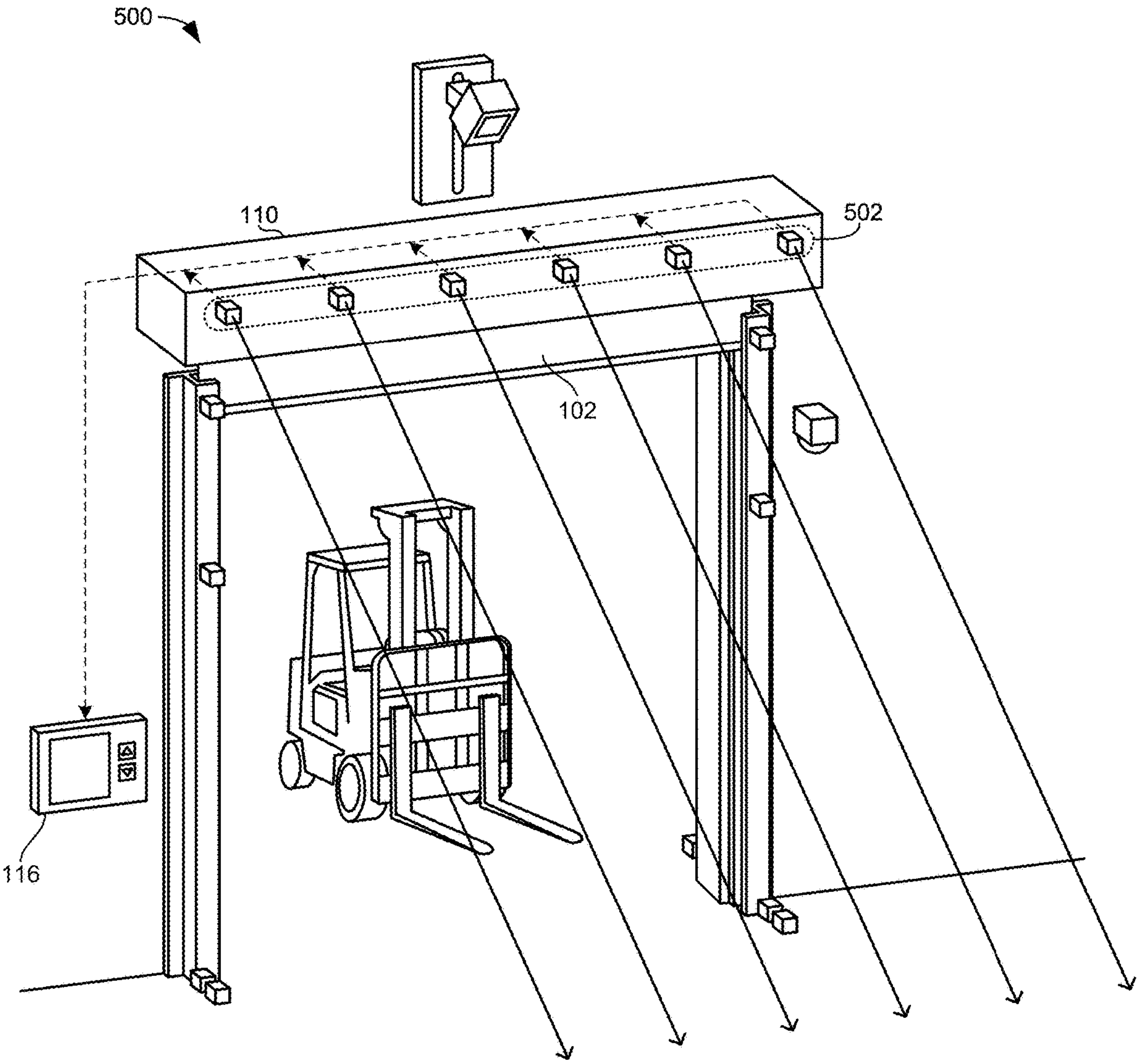
FIG. 5 is another example door system constructed in accordance with teachings disclosed herein.
Figure 6:
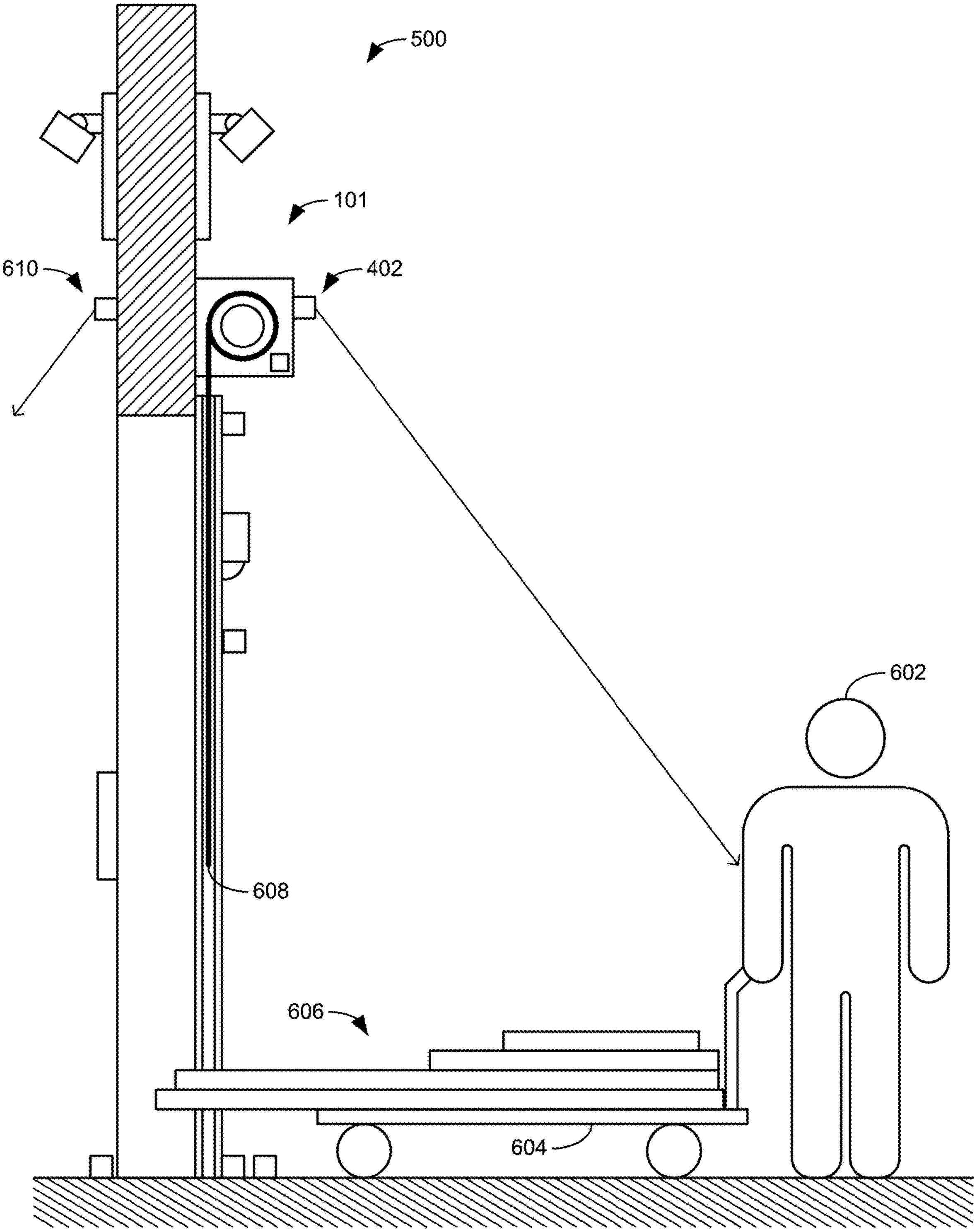
FIG. 6 is a cross-sectional view of the example door system of FIG. 5.

FIG. 5 is another example door system 500 constructed in accordance with teachings disclosed herein. A cross-sectional view of the example door system 500 is shown in FIG. 6. The example door system 500 of FIGS. 5 and 6 is substantially similar to the door system 100 of FIG. 1. Accordingly, the same components will be identified using the same reference numerals. However, the example door systems 100, 500 differ in that the door system 500 of FIG. 5 includes an array of height sensors 502 to detect the height of objects approaching the door 101. In some examples, the array of height sensors 502 correspond to an array of photo-eyes that generate a beam at an angle relative to the doorway. In the illustrated example of FIGS. 5 and 6, the beams are also angled relative to the floor. As a result, the height at which an object (e.g., a pedestrian, a fork truck, etc.) crosses the beam varies as the object approaches or moves away from the door. For instance, in the illustrated example of FIG. 6, a person 602 is represented pushing a cart 604 towards the door 101 with the cart 604 having items 606 that extend off of the cart 604 an appreciable distance in front of the person 602. As the person 602 approaches the door 101 (e.g., moves to the left as depicted in the illustrated example of FIG. 6), the items 606 on the cart 604 positioned at a height that is relatively low (e.g., near the midpoint of the leg of the person 602) cross the beams of the array of height sensors 502 before the person reaches the beams. As a result, the detected height of the approaching object would be determined to be relatively low (e.g., near the midpoint of the leg of the person 602). As the person 602 continues to approach the door 101, the height at which the items 606 are crossed would begin to rise as the higher stacked items 606 on the cart 604 come within the path of the beams. As the person 602 enters the path of the beams, the height at which the beams are crossed continue to rise until the height reaches the top of a head of the person 602. At the particular point in time represented in the illustrated example of FIG. 6, the height at which the beam is crossed is near the middle of the arm of the person 602.

In the illustrated example, the array of height sensors 502 determine the distance from the sensors at which the beams are crossed by an object (e.g., based on time of flight of the beams and corresponding reflections off of the object). In some examples, the distance from the sensors to the point at which the object crosses the beams is measured in the direction of the beams (e.g., angled relative to the doorway). Based on this distance information, a known height of the sensors 502, and a known angle of the beams, the height at which the beams are crossed can be calculated. In some examples, the height sensors 502 perform this calculation, which is then transmitted to the controller 116. In other examples, the height sensors 502 transmit the detected distance of the object crossing the beams and the controller 116 calculates the corresponding height. In either case, the controller 116 uses the height information to adjust the height to which the door panel 102 is to open (e.g., based on the detected or calculated height value). That is, rather than opening the door panel 102 to a preset height that is assumed to be taller than objects (e.g., pedestrians, fork trucks, etc.) expected to pass through the doorway, the controller 116 dynamically adjusts a position (e.g., an open position) of the door panel 102 based on the detected height of the object to pass through the doorway. Additionally or alternatively, a rate of change in the height at which the beams of the array of height sensors 502 are crossed is indicative of the speed at which the object is approaching the doorway. Accordingly, in some examples, the controller 116 uses the rate of change in the height information to adjust or control the speed at which the door panel 102 is opened. Adjusting the height and/or speed of the door panel 102 dynamically based on the detected height and/or approach speed of an approaching object enables the door panel 102 to be opened no more and/or no more quickly than needed to allow passage of the object. This approach can improve efficiency by reducing the amount of conditioned (e.g., heated or cooled) air on one side of the door panel 102 from mixing with unconditioned or differently conditioned air on the other side.

In some examples, the controller 116 causes the leading edge 608 of the door panel 102 to move according to changes in the detected height at which the beams of the array of height sensors 502 are crossed. Thus, as shown in the illustrated example of FIG. 6, the leading edge 608 of the door panel 102 is at a height corresponding to the middle of the arm of the person 602 where the beam of the array of height sensors 502 is crossed. Notably, this is high enough for the front end of the items 606 to pass through the doorway, which, as shown in the illustrated example, have already begun to pass under the door panel 102. As the person 602 continues to approach the door 101, so as to cross the beam at a higher point, the door panel 102 rises accordingly. In some examples, the controller 116 can control the height of the leading edge 608 of the door panel 102 to be a threshold distance (e.g., 6 inches) above the detected height at which the beam is crossed to provide some clearance for the person 602 (or other object) passing through the doorway.

In some examples, the beams associated with different sensors in the array of height sensors 502 can be crossed at different heights. In some such examples, the controller 116 uses the highest detected point as the assumed height of the object passing through the doorway. In some examples, as shown in FIG. 6, a separate array of height sensors 610 is positioned on the opposite side of the doorway to generate beams in the opposite direction to enable the height of the leading edge 608 of the door panel 102 to be dynamically adjusted in response to traffic approaching the door from the opposite direction. Further, in some examples, height information collected by the controller 116 for an object approaching from one side of the door can be used in conjunction with height information collected by the other array of height sensors 502, 610 on the other side to adjust the closing of the door panel 102. That is, in some examples, the controller 116 generates a height profile for an object that approaches the door 101 based on the height information provided by the array of height sensors 502 over time. As the object passes through the doorway and moves away from the door 101 on the other side, a similar height profile can be expected to be detected by the other array of height sensors 610 on the other side of the door 101. Based on the height profile generated during the approach of the object, the controller 116 can anticipate the height profile of the object as it leaves the other side and, therefore, can adjust the height of the door panel 102 accordingly. For instance, the controller 116 can close the door panel 102 part way from the top height to which it was opened if it is known, based on the height profile, that the highest part of the object has already cleared the doorway.

In some examples, rather than controlling the height of the door to match (within some threshold) the height at which the beams of the arrays of height sensors 502 are crossed, the controller 116 can initially drive the door panel 102 to a preset height at a relatively high speed as soon as an object is detected (e.g., independent of the detected height). Once the door panel 102 is raised to the preset height, the controller 116 can then adjust the height of the door panel 102 higher as needed for taller objects based on the height detected from the array of height sensors 502.

In this example, the array of height sensors 502 are positioned on a front face of the housing 110 for the roller 108 (FIG. 1). However, the array of height sensors 502 can be positioned at any suitable location. For instance, in some examples, the array of height sensors 502 are embedded within or otherwise integrated into the housing 110. In other examples, the array of height sensors 502 is positioned on an underside of the housing 110 (e.g., in front of the door panel 102). In other examples, the array of height sensors 502 is mounted to the wall and/or any other structure independent of the housing 110 (e.g., above or below the sensor adjustment system 126. In some examples, different mechanisms other than an array of photo-eyes can be implemented to detect the height of approaching objects. For instance, in some examples, the laser planes emitted by the ranging sensor 124 can be used in a similar manner to separate beams of the array of height sensors 502 outlined above.

The particular arrangement of the array of height sensors 502 are useful to detect the height of objects so as to control the height of a vertically moving door panel (e.g., the door panel 102 of the illustrated example). A similar arrangement of sensors can be implemented to detect the width of objects approaching a horizontally moving door. In particularly, rather than detecting the distance an object is from the sensors, the controller 116 determines the width of the object based on the number and/or spacing of the beams that are crossed as an object approaches a horizontally translated door panel. In other examples, instead of using a generally horizontally arranged array of height sensors 502 (as shown in FIG. 5), one or more vertically arranged array of width sensors can be positioned to the side of the horizontally translating door panel to detect the width of an approaching object as detailed below in connection with FIGS. 7-10.

FIGS. 7-10 illustrate an example door system 700 constructed in accordance with teachings disclosed herein that includes two horizontally translating door panels 702, 704. Examples disclosed herein can be similarly applied to translating door systems with a single translating door panel or more than two door panels. In the illustrated example, the door panels 702, 704 are suspended from panel carriers 706 that can roll, slide, or otherwise travel along an overhead track system 708. In some examples, the door panels 702, 704 of the door system 700 are moved between an open position (as shown for example in FIGS. 7 and 8) and a closed position (as shown for example in FIGS. 9 and 10) by a motor control unit 710. In this example, the motor control unit 710 is controlled by a controller 116.

Figure 10:
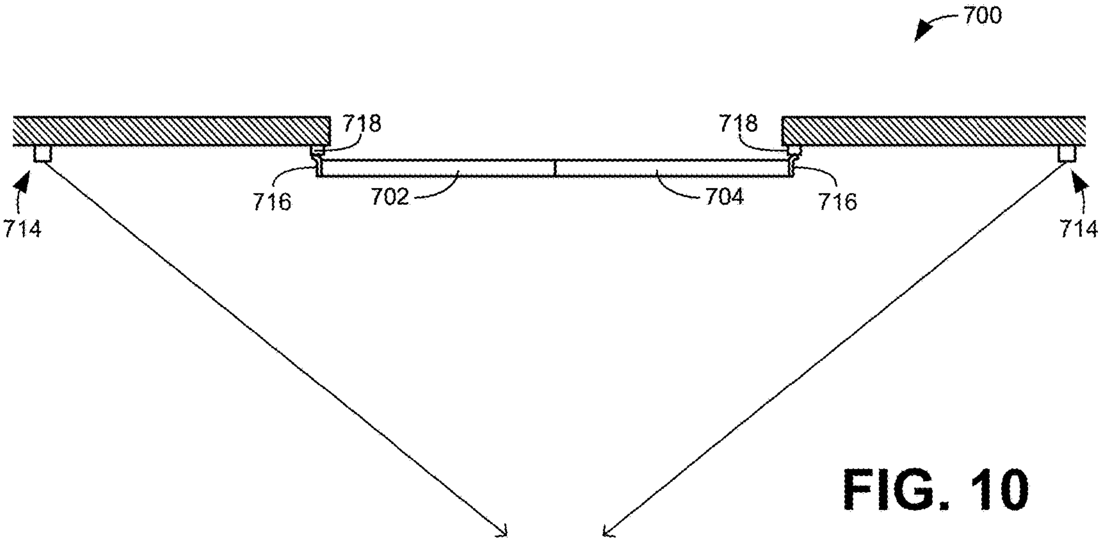
FIG. 10 is a cross-sectional view of the example door system of FIG. 9 taken along line 10-10 of FIG. 9.

As shown in the illustrated example, the door system 700 includes two arrays of width sensors 712, 714. In some examples, the arrays of width sensors 712, 714 correspond to an arrays of photo-eyes that generate beams at an angle relative to the doorway (as represented in FIGS. 8 and 10). In the illustrated example of FIGS. 7-10, the beams are generally non-perpendicular (e.g., generally parallel) to the floor. In this example, a separate array of width sensors 712, 714 is positioned on either side of the doorway with the respective beams angled towards a point of convergence in front of a center of the door. As a result, the distance of either side of an object (e.g., a pedestrian, a fork truck, etc.) from the respective arrays of width sensors 712, 714 at which point the beams of the sensors are crossed can be detected. Based on this distance information, the width of the object can be determined in a similar manner described above with respect to the array of height sensors 502. Further, although not shown in FIGS. 7-10, one of more of the sensors 122, 124, 125, 134, 136, 138, 144, 502 can be suitably adapted for implementation in connection with the example door system 700 of FIGS. 7-10.

Many horizontally translating door systems, such as the example door system 700 of FIGS. 7-10, include seals 716 mounted near the lateral edge of the door panels 702, 704 that is farthest away from the doorway when the panels 702, 704 are in the open position. As shown in the illustrated example of FIGS. 8 and 10, the seals 716 extend away from the door panels 702, 704 and towards the wall along which the door panels 702, 704 translate. Further, in this examples, the seals 716 are constructed so as to be spaced apart from the wall the door panels 702, 704 are in the open position (FIG. 8). However, the seals 716 sealingly engage a protrusion 718 on the wall when the door panels 702, 704 are in the closed position (FIG. 10). In some examples, the protrusions 718 extend around a perimeter (e.g., three edges) of the doorway. In some such examples, the door panels 702, 704, can also include seals extending along their upper edges to sealing engage with the upper portion of the protrusion. In some examples, the position of the seals 716 and the protrusion 718 can be reversed. That is, in some examples, the seals 716 are attached to and extend outward from the wall to engage with protrusion 718 on the door panels 702, 704.

Repeatedly opening and closing the door panels 702, 704 causes the repeated engagement and disengagement of the seals 716 with the protrusions 718. The repeated engagement of the seals 716 and the protrusions 718 can result in wear to the seals 716 and/or the protrusions 718 over time. In some examples, the controller 116 detects such wear based on changes in the current used to drive a motor associated with the motor control unit 710. More particularly, as the seals 716 and/or the protrusions 718 wear away, the force needed to drive the two components into sealing engagement lessens. Accordingly, if a current sensor of the motor control unit 710 provides feedback to the controller 116 indicating that the current used to drive the motor when the door is at or near the closed position satisfies (e.g., is less than) a threshold below a default or expected value (e.g., measured when the seal 716 is first implemented), the controller 116 determines that there is wear to the seal and/or the protrusion. In some such examples, the controller 116 triggers or generates an alert and/or notification to maintenance personnel to look into the issue.

Figure 7:
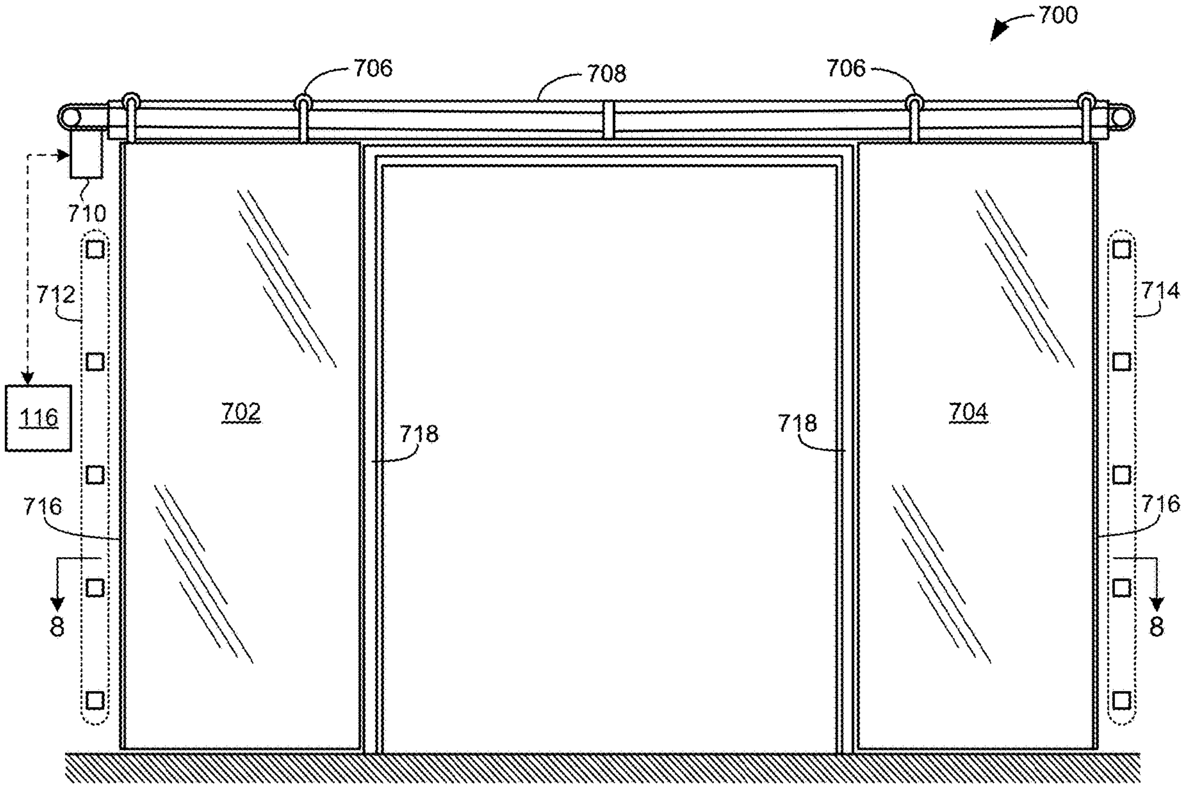
FIG. 7 is another example door system constructed in accordance with teachings disclosed herein with example door panels in an example open position.
Figure 8:
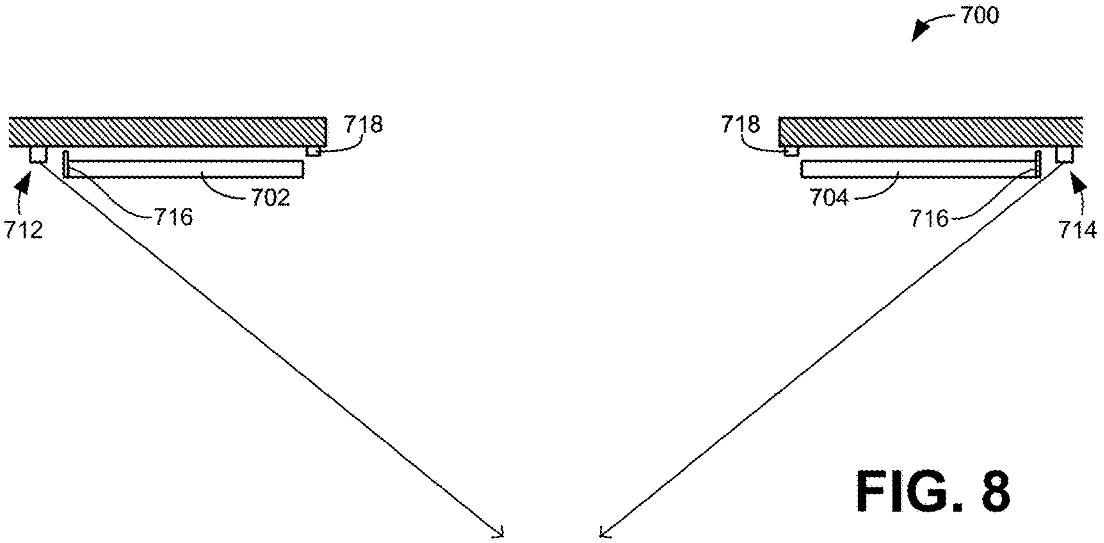
FIG. 8 is a cross-sectional view of the example door system of FIG. 7 taken along line 8-8 of FIG. 7.
Figure 9:
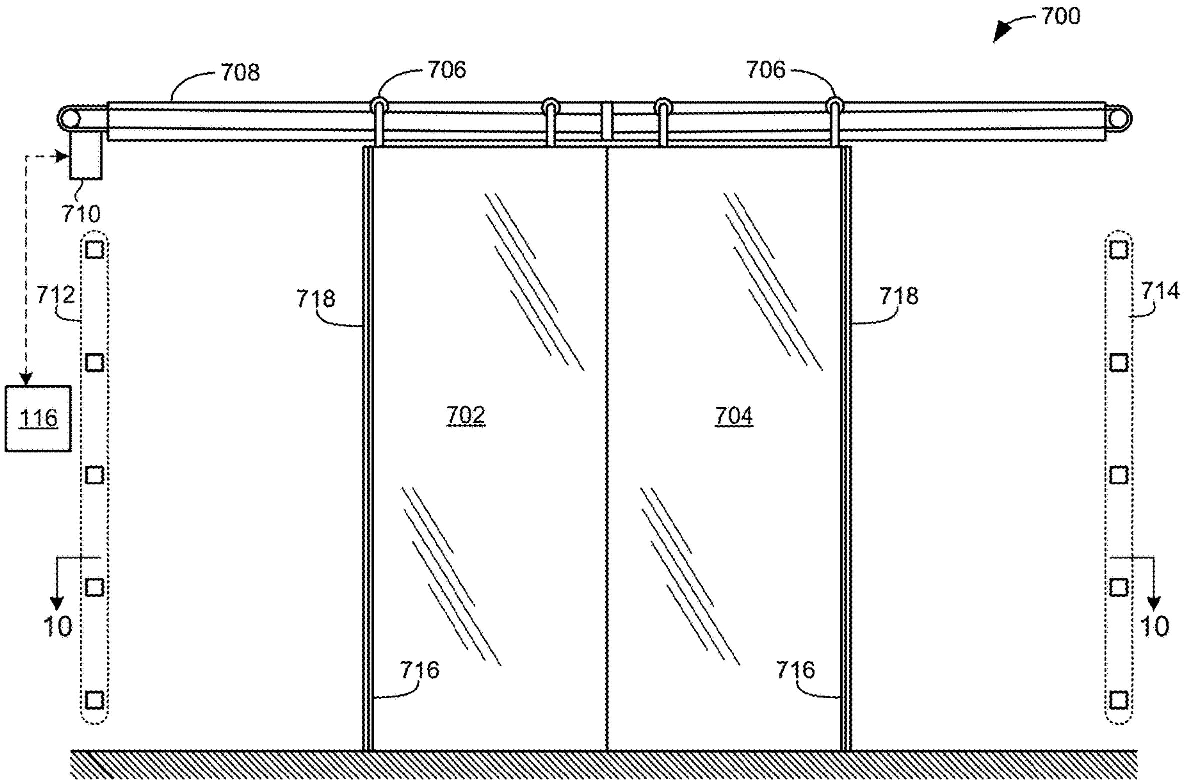
FIG. 9 is a similar view to FIG. 7 but with example door panels in an example closed position.
Figure 11:
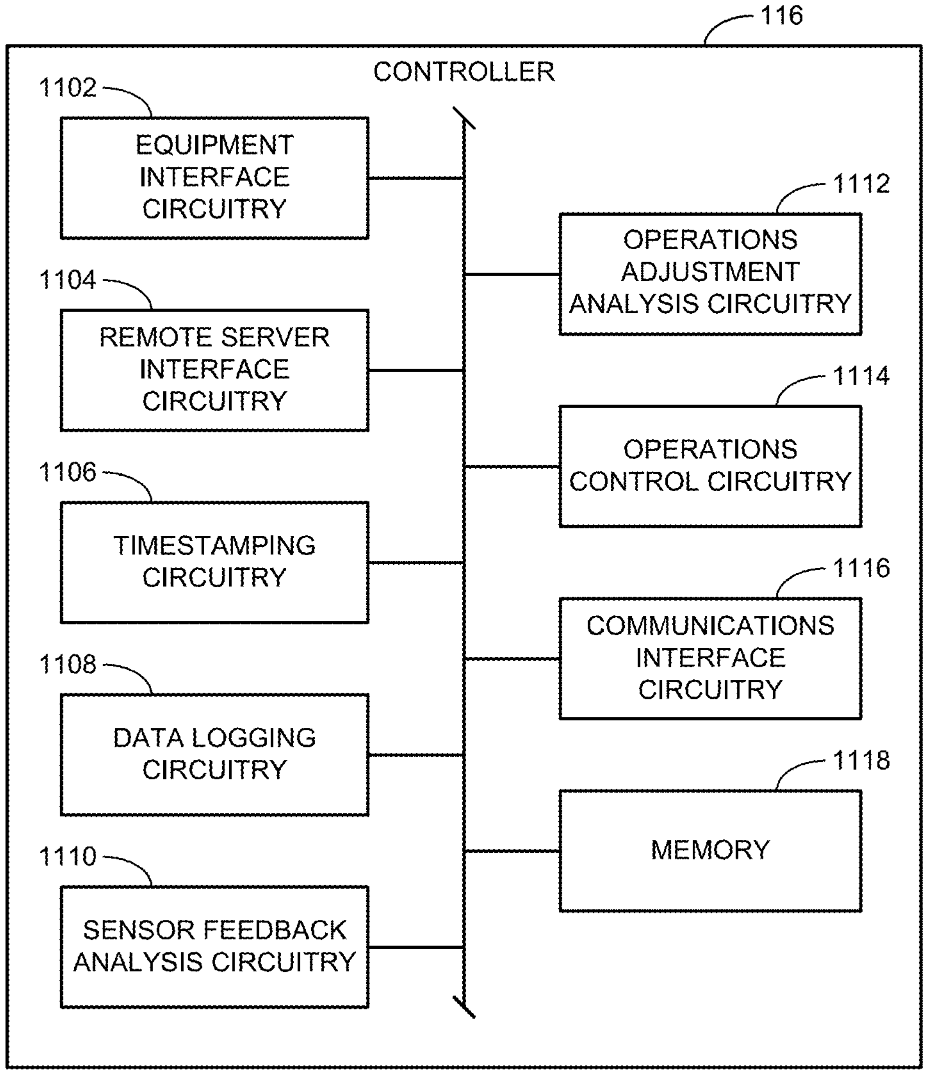
FIG. 11 illustrates an example implementation of an example controller of FIGS. 1, 5, 7, and/or 9.

FIG. 11 is a block diagram of the example controller 116 of FIGS. 1, 5, 7, and/or 9 to control operations of any one of the example door systems 100, 500, 700 of FIGS. 1-10. The controller 116 of FIG. 11 may be instantiated (e.g., creating an instance of, bring into being for any length of time, materialize, implement, etc.) by processor circuitry such as a central processing unit executing instructions. Additionally or alternatively, the controller 116 of FIG. 11 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 11 may, thus, be instantiated at the same or different times. Some or all of the circuitry may be instantiated, for example, in one or more threads executing concurrently on hardware and/or in series on hardware. Moreover, in some examples, some or all of the circuitry of FIG. 11 may be implemented by one or more virtual machines and/or containers executing on the microprocessor.

While the following discussion is provided with respect to the controller 116 of FIGS. 1, 5, 7, and/or 9, some or all of the components of the controller can also be implemented in the second controller 140. As shown in FIG. 11, the example controller 116 includes example equipment interface circuitry 1102, example remote server interface circuitry 1104, example timestamping circuitry 1106, example data logging circuitry 1108, example sensor feedback analysis circuitry 1110, example operations adjustment analysis circuitry 1112, example operations control circuitry 1114, example communications interface circuitry 1116, and example memory 1118.

The example equipment interface circuitry 1102 enables communications between the controller 116 and equipment associated with the door system 100. That is, in some examples, the controller 116 can provide instructions and/or commands via the equipment interface circuitry 1102 to different pieces of equipment associated with the door system 100 such as the motor control unit 112 and/or the sensor adjustment system 126. Further, the controller 116 can receive feedback from sensors associated with the equipment via the equipment interface circuitry 1102. In some examples, the equipment interface circuitry 1102 includes a user interface by which a user can provide inputs to the controller 116 to direct its operation (e.g., via the buttons or switches 118 and/or display screen 120). In some examples, the equipment interface circuitry 1102 is instantiated by processor circuitry executing equipment interface instructions and/or configured to perform operations such as those represented by the flowchart of FIG. 13-23.

The example remote server interface circuitry 1104 enables communications between the controller 116 and the remote server 146. That is, in some examples, the controller 116 transmits or reports sensor feedback data and/or other information to the remote server 146 via the remote server interface circuitry 1104. Further, in some examples, the controller 116 can receive information, instructions, and/or commands from the remote server 146 via the remote server interface circuitry 1104. In some examples, the remote server interface circuitry 1104 is instantiated by processor circuitry executing remote server interface instructions and/or configured to perform operations such as those represented by the flowchart of FIG. 13-23.

The example timestamping circuitry 1106 timestamps sensor feedback data obtained via the equipment interface circuitry 1102 and stores such data in the example memory 1118. The example data logging circuitry 1108 logs the sensor feedback data in the memory 1118 with the associated timestamp provided by the example timestamping circuitry 1106. Additionally or alternatively, the example data logging circuitry 1108 can provide the timestamped sensor feedback data to the remote server 146 via the remote server interface circuitry 1104. In some examples, the timestamping circuitry 1106 is instantiated by processor circuitry executing timestamping instructions and/or configured to perform operations such as those represented by the flowchart of FIG. 13-23. In some examples, the data logging circuitry 1108 is instantiated by processor circuitry executing data logging instructions and/or configured to perform operations such as those represented by the flowchart of FIG. 13-23.

The example sensor feedback analysis circuitry 1110 analyzes feedback signals or data from sensors associated with the door system 100 and/or associated timestamp data to enable the controller 116 to determine the status and/or condition of the associated equipment and/or the conditions of the environment and use of the area surrounding the door system 100. In some examples, the sensor feedback analysis circuitry 1110 is instantiated by processor circuitry executing sensor feedback analysis instructions and/or configured to perform operations such as those represented by the flowchart of FIG. 13-23. In some examples, the controller 116 can generate suitable commands and/or instructions to the equipment based on the analysis of the sensor feedback and timestamp data by the sensor feedback analysis circuitry 1110. For instance, the controller 116 can adjust the speed, timing, direction, and/or other aspects of the motor 114 to adjust the movement of the door panel 102. Additionally or alternatively, the controller 116 can adjust the position, orientation, and/or field of view of one of more of the sensors 122, 124, 125, 134, 136, 138, 144 associated with the door system 100 based on outputs of the sensor feedback analysis circuitry 1110. Further, in some examples, the controller 116 can generate alerts and/or notifications based on the analysis of sensor feedback and timestamp data. In some examples, the alerts and/or notifications can be visually represented via the display screen 120 of the controller 116. In some examples, the controller 116 can activate a separate output device (e.g., a light, a bell, a horn, etc.) to indicate the alert and/or notification. Additionally or alternatively, in some examples, the controller 116 can transmit the alert and/or notification to the remote server 146. In some examples, the controller 116 may not perform any particular action in response to the analysis of the sensor feedback analysis circuitry 1110. However, in some examples, the sensor feedback, the timestamp data, and/or the results of the analysis of the sensor feedback and timestamp data can be stored in the memory 1118. In some examples, the sensor feedback analysis circuitry 1110 can analyze such historical data to identify trends, patterns, and/or changes in conditions that appear over time.

As specific examples, the sensor feedback analysis circuitry 1110 can analyze the feedback from at least two of the photo-eye sensors 134, 136, 138 and associated timestamps to determine the speed and/or direction of traffic passing through the doorway. In other examples, the sensor feedback analysis circuitry 1110 determines the speed and/or direction of traffic using one or more of the ranging sensors 124 and/or the motion sensors 125. In some examples, the sensor feedback analysis circuitry 1110 analyzes sensor feedback data indicative of the direction of traffic on both sides of the doorway to detect potential collisions and/or near misses. In some examples, the sensor feedback analysis circuitry 1110 analyzes feedback from the elevated photo-eye sensor 142 in conjunction with feedback from at least one of the photo-eye sensors 134, 136, 138 at the base of the doorway to distinguish between a pedestrian and a fork truck passing through the doorway.

In some examples, the sensor feedback analysis circuitry 1110 analyzes the activation time to open the door (based on the timing of feedback from the ranging sensor 124, the motion sensor 125, and/or other activation system) in conjunction with feedback from the breakaway sensors 122 to determine whether the time of activation is contributing to impacts with the door panel 102 leading to breakaway events. For instance, if the number of breakaway events relative to a total number of door cycles (e.g., opening and closing of the door 101) exceeds a threshold, the sensor feedback analysis circuitry 1110 can determine that activation of the door 101 is occurring too late. In some examples, the number of breakaway events within a threshold period of time (independent of the total number of door cycles) can be used as an indication that the door 101 is being activated too late. The sensor feedback analysis circuitry 1110 can assess the timing of door activation using sensors other than breakaway sensors 122. For instance, in some examples, the sensor feedback analysis circuitry 1110 can determine the time between activation and when the beam of the photo-eye sensor 134 at the base of the doorway is crossed to indicate the amount of time between activation and when traffic reaches the doorway. In some such examples, if this time period is below a threshold, the sensor feedback analysis circuitry 1110 can determine that the door 101 is being activated too late. On the other hand, if the time period between activation and traffic actually passing through the doorway is above a threshold, the sensor feedback analysis circuitry 1110 can determine that the door 101 is being activated too early.

In some examples, the analysis of the sensor feedback data to determine whether the door 101 is opening too early (and, therefore, remaining open too long) or too late (and, therefore, result in an impact) can additionally or alternatively be performed by the operations adjustment analysis circuitry 1112. In some examples, the operations adjustment analysis circuitry 1112 is instantiated by processor circuitry executing operations adjustment analysis instructions and/or configured to perform operations such as those represented by the flowchart of FIG. 13-23. In some examples, the operations adjustment analysis circuitry 1112 uses the determination of the door 101 opening too early or too late to recommend changes to the position, orientation, and/or field of view of the relevant sensors that triggered the activation that was either too late or too early. In some examples, the operations adjustment analysis circuitry 1112 generates an alert and/or notification indicating the need for an adjustment to the sensors. Additionally or alternatively, in some examples, the operations adjustment analysis circuitry 1112 can automatically (e.g., without direct human input) adjust the position, orientation, and/or field of view of the relevant sensor by generating a command and/or instruction to an associated sensor adjustment system 126. In some examples, the operations adjustment analysis circuitry 1112 can adjust a sensor incrementally and then monitor any changes for a set period of time and then make further adjustments to (e.g., continually) refine the configuration of a sensor for improved operation.

While sensors can be adjusted to reduce breakaway events, the operations adjustment analysis circuitry 1112 can determine to adjust the sensors and/or other aspects of the door system 100 based on other detected conditions and/or factors. For instance, rather than opening too early or too late, the sensor feedback analysis circuitry 1110 and/or the operations adjustment analysis circuitry 1112 can determine that the door panel 102 remains open too long due to a sensor incorrectly detecting the presence of traffic near the doorway. Similarly, the sensor feedback analysis circuitry 1110 and/or the operations adjustment analysis circuitry 1112 can determine that the door panel 102 moves to an open position even though no traffic passes through (e.g., a false activation) because a sensor incorrectly triggered the door 101 by detecting traffic merely passing nearby the door 101. In some such examples, the operations adjustment analysis circuitry 1112 can again indicate that the relevant sensor(s) needs to be adjusted and/or can automatically adjust such sensor(s).

There are other factors that contribute to breakaway events (leading to damage and/or wear to the door panel 102), false activations (leading to energy inefficiencies), and/or doors remaining open too long (leading to energy inefficiencies) other than doors opening or closing at the wrong time based on the position, orientation, and/or field of view of sensors that trigger such opening and/or closing. For example, the traffic may have been moving too fast, a reclose timer for the door is set for too long, the motor is operating too slowly based on an incorrect configuration, an increase in friction between the door panel 102 and the tracks 106, and/or for any other reason(s). Accordingly, in some examples, the operations adjustment analysis circuitry 1112 can analyze sensor feedback data indicative of the speed of traffic and/or the operational state of the motor 114 when determining to adjust the sensors. In some examples, the operations adjustment analysis circuitry 1112 can determine to adjust the control parameters for the motor 114 (e.g., adjust the reclose timer, the command speed, the stopping position, etc.) in addition to or instead of adjusting the sensors. In some examples, such determinations can be provided to an engineer and/or maintenance personnel to implement the adjustments. In other examples, the operations adjustment analysis circuitry 1112 can implement such adjustments automatically without user input.

The example operations control circuitry 1114 controls the operations of the equipment associated with the door system 100. That is, in some examples, the operations control circuitry 1114 generates instructions and/or commands for the equipment based on the output of the sensor feedback analysis circuitry 1110 and/or the operations adjustment analysis circuitry 1112. In some examples, the operations control circuitry 1114 generates a graphical user interface to control and/or define the user interfaces rendered on the display screen 120 of the controller 116. In some examples, the operations control circuitry 1114 generates alerts and/or notifications to be transmitted to the remote server 146 and/or to other remote computing devices (e.g., mobile devices) of relevant individuals. In some examples, such alerts and/or notifications are transmitted directly to the remote computing devices via the example communications interface circuitry 1116. For instance, the communications interface circuitry 1116 can send out email messages and/or SMS messages to one or more designated computing devices. In some examples, the alerts and/or notifications can be transmitted to the remote server 146 via the remote server interface circuitry 1104 and the remote server 146 then distributes the messages to other remote computing devices. In some examples, the remote server interface circuitry 1104 and the communications interface circuitry 1116 can be distinct components of the controller 116. In other examples, the remote server interface circuitry 1104 and the communications interface circuitry 1116 can correspond to the same component. In some examples, the operations control circuitry 1114 is instantiated by processor circuitry executing operations control instructions and/or configured to perform operations such as those represented by the flowchart of FIG. 13-23. In some examples, the communications interface circuitry 1116 is instantiated by processor circuitry executing communications instructions and/or configured to perform operations such as those represented by the flowchart of FIG. 13-23.

While an example manner of implementing the controller 116 of FIGS. 1, 5, 7, and/or 9 is illustrated in FIG. 11, one or more of the elements, processes and/or devices illustrated in FIG. 11 can be combined, divided, re-arranged, omitted, eliminated and/or implemented in any other way. Further, the example equipment interface circuitry 1102, the example remote server interface circuitry 1104, the example timestamping circuitry 1106, the example data logging circuitry 1108, the example sensor feedback analysis circuitry 1110, the example operations adjustment analysis circuitry 1112, the example operations control circuitry 1114, the example communications interface circuitry 1116, the example memory 1118 and/or, more generally, the example controller 116 of FIG. 11 can be implemented by hardware alone or by hardware in combination with software and/or firmware. Thus, for example, any of the example equipment interface circuitry 1102, the example remote server interface circuitry 1104, the example timestamping circuitry 1106, the example data logging circuitry 1108, the example sensor feedback analysis circuitry 1110, the example operations adjustment analysis circuitry 1112, the example operations control circuitry 1114, the example communications interface circuitry 1116, the example memory 1118 and/or, more generally, the example controller 116 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example controller 116 of FIGS. 1, 5, 7, and/or 9 can include one or more elements, processes and/or devices in addition to, or instead of, those illustrated in FIG. 11, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, the apparatus includes means for logging data. For example, the means for logging data may be implemented by data logging circuitry 1108. In some examples, the data logging circuitry 1108 may be instantiated by processor circuitry such as the example processor circuitry 2412 of FIG. 24. For instance, the data logging circuitry 1108 may be instantiated by the example microprocessor 2500 of FIG. 25 executing machine executable instructions such as those implemented by at least blocks 1308, 1312, 1320, 1324, 1326, 1328 of FIG. 13, blocks 1410, 1414, 1420, 1422, 1426, 1430 of FIG. 14. In some examples, the data logging circuitry 1108 may be instantiated by hardware logic circuitry, which may be implemented by an ASIC, XPU, or the FPGA circuitry 2600 of FIG. 26 structured to perform operations corresponding to the machine readable instructions. Additionally or alternatively, the data logging circuitry 1108 may be instantiated by any other combination of hardware, software, and/or firmware. For example, the data logging circuitry 1108 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for analyzing sensor feedback data. For example, the means for analyzing sensor feedback data may be implemented by sensor feedback analysis circuitry 1110. In some examples, the sensor feedback analysis circuitry 1110 may be instantiated by processor circuitry such as the example processor circuitry 2412 of FIG. 24. For instance, the sensor feedback analysis circuitry 1110 may be instantiated by the example microprocessor 2500 of FIG. 25 executing machine executable instructions such as those implemented by at least blocks 1302, 1304, 1306, 1314, 1316, 1322, 1326, 1328 of FIG. 13, blocks 1402, 1408, 1412, 1418, 1428 of FIG. 14, blocks 1902, 1904, 1906, 1908, 1910, 1912, 1914, 1916, 1918 of FIG. 19, blocks 2002, 2004 of FIG. 20, block 2104, 2106 of FIG. 21, blocks 2204, 2210 of FIG. 22, and block 2308 of FIG. 23. In some examples, the sensor feedback analysis circuitry 1110 may be instantiated by hardware logic circuitry, which may be implemented by an ASIC, XPU, or the FPGA circuitry 2600 of FIG. 26 structured to perform operations corresponding to the machine readable instructions. Additionally or alternatively, the sensor feedback analysis circuitry 1110 may be instantiated by any other combination of hardware, software, and/or firmware. For example, the sensor feedback analysis circuitry 1110 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for analyzing data for operation adjustments associated with a door system. For example, the means for analyzing data may be implemented by operations adjustment analysis circuitry 1112. In some examples, the operations adjustment analysis circuitry 1112 may be instantiated by processor circuitry such as the example processor circuitry 2412 of FIG. 24. For instance, the operations adjustment analysis circuitry 1112 may be instantiated by the example microprocessor 2500 of FIG. 25 executing machine executable instructions such as those implemented by at least blocks 1432 of FIG. 14, blocks 1502, 1504, 1506, 1510, 1512 of FIG. 15, block 1602, 1604, 1606, 1610, 1612 of FIG. 16, block 1702, 1704, 1706, 1710, 1712 of FIG. 17, block 1802, 1804, 1806, 1810, 1812 of FIG. 18. In some examples, the operations adjustment analysis circuitry 1112 may be instantiated by hardware logic circuitry, which may be implemented by an ASIC, XPU, or the FPGA circuitry 2600 of FIG. 26 structured to perform operations corresponding to the machine readable instructions. Additionally or alternatively, the operations adjustment analysis circuitry 1112 may be instantiated by any other combination of hardware, software, and/or firmware. For example, the operations adjustment analysis circuitry 1112 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for controlling operations of a door system. For example, the means for controlling operations may be implemented by operations control circuitry 1114. In some examples, the operations control circuitry 1114 may be instantiated by processor circuitry such as the example processor circuitry 2412 of FIG. 24. For instance, the operations control circuitry 1114 may be instantiated by the example microprocessor 2500 of FIG. 25 executing machine executable instructions such as those implemented by at least blocks 1310, 1318 of FIG. 13, blocks 1404, 1406, 1416, 1424, 1434 of FIG. 14, block 1508 of FIG. 15, block 1608 of FIG. 16, block 1708 of FIG. 17, block 1808 of FIG. 18, block 1920 of FIG. 19, blocks 2006, 2008, 2010 of FIG. 20, blocks 2108, 2110 of FIG. 21, blocks 2202, 2206, 2208, 2212, 2214, 2216, 2218 of FIG. 22, blocks 2302, 2304, 2306, 2310, 2312 of FIG. 23. In some examples, the operations control circuitry 1114 may be instantiated by hardware logic circuitry, which may be implemented by an ASIC, XPU, or the FPGA circuitry 2600 of FIG. 26 structured to perform operations corresponding to the machine readable instructions. Additionally or alternatively, the operations control circuitry 1114 may be instantiated by any other combination of hardware, software, and/or firmware. For example, the operations control circuitry 1114 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for storing data. For example, the means for storing data may be implemented by memory 1118. In some examples, the memory 1118 may be instantiated by processor circuitry such as the example processor circuitry 2412 of FIG. 24. For instance, the memory 1118 may be instantiated by the example microprocessor 2500 of FIG. 25 executing machine executable instructions such as those implemented by at least blocks 2102 of FIG. 21. In some examples, the memory 1118 may be instantiated by hardware logic circuitry, which may be implemented by an ASIC, XPU, or the FPGA circuitry 2600 of FIG. 26 structured to perform operations corresponding to the machine readable instructions. Additionally or alternatively, the memory 1118 may be instantiated by any other combination of hardware, software, and/or firmware. For example, the memory 1118 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 12:
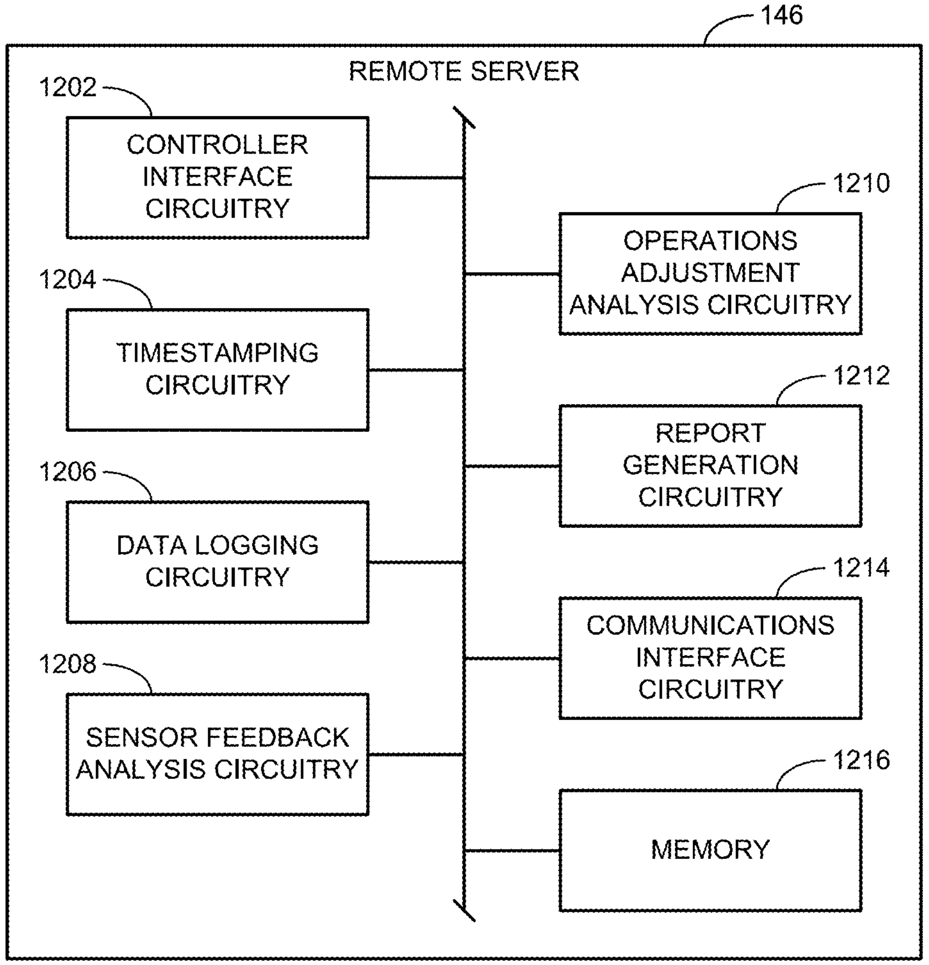
FIG. 12 illustrates an example implementation of an example remote server of FIG. 1.

FIG. 12 is a block diagram of remote server 146 of FIG. 1. The remote server 146 of FIG. 12 may be instantiated (e.g., creating an instance of, bring into being for any length of time, materialize, implement, etc.) by processor circuitry such as a central processing unit executing instructions. Additionally or alternatively, the remote server 146 of FIG. 12 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 12 may, thus, be instantiated at the same or different times. Some or all of the circuitry may be instantiated, for example, in one or more threads executing concurrently on hardware and/or in series on hardware. Moreover, in some examples, some or all of the circuitry of FIG. 12 may be implemented by one or more virtual machines and/or containers executing on the microprocessor.

As shown in FIG. 12, the example remote server 146 includes example controller interface circuitry 1202, example timestamping circuitry 1204, example data logging circuitry 1206, example sensor feedback analysis circuitry 1208, example operations adjustment analysis circuitry 1210, example report generation circuitry 1212, example communications interface circuitry 1214, and example memory 1216.

The example controller interface circuitry 1202 of FIG. 12 enables communications with the controllers 116, 140 and other similar controllers associated with other doors and/or other equipment. That is, the controller interface circuitry 1202 receives sensor feedback data any other type of data collected and reported by the controller 116 of the door system 100. Such data can be aggregated from multiple controllers associated with different doors within a facility and stored in the memory 1216 for subsequent analysis and/or processing. Additionally or alternatively, in some examples, the controller interface circuitry 1202 transmits instructions, commands, and/or other types of information to the controller 116. In some examples, the controller interface circuitry 1202 is instantiated by processor circuitry executing controller interface instructions and/or configured to perform operations such as those represented by the flowchart of FIG. 13-23.

The example timestamping circuitry 1204 in FIG. 12 provides similar functionality to the timestamping circuitry 1106 of the controller 116 described above in connection with FIG. 11. In some examples, the timestamping circuitry 1204 of FIG. 12 is duplicative of the timestamping circuitry

1106 of FIG. 11. In some examples, the timestamping circuitry 1106 can be omitted from the controller 116 of FIG. 11. In some examples, the timestamping circuitry 1204 can be omitted from the remote server 146 of FIG. 12. In some examples, regardless of whether data is timestamped by the example timestamping circuitry 1106 of FIG. 11 or the example timestamping circuitry 1204 of FIG. 12, the example data logging circuitry 1206 of FIG. 12 logs the timestamped data in the example memory 1216. In some examples, the timestamping circuitry 1204 is instantiated by processor circuitry executing timestamping instructions and/or configured to perform operations such as those represented by the flowchart of FIG. 13-23. In some examples, the data logging circuitry 1206 is instantiated by processor circuitry executing data logging instructions and/or configured to perform operations such as those represented by the flowchart of FIG. 13-23.

In some examples, the sensor feedback analysis circuitry 1208 is instantiated by processor circuitry executing sensor feedback analysis instructions and/or configured to perform operations such as those represented by the flowchart of FIG. 13-23. The example sensor feedback analysis circuitry 1208 in FIG. 12 provides similar functionality to the sensor feedback analysis circuitry 1110 of the controller 116 described above in connection with FIG. 11. Additionally, in some examples, the sensor feedback analysis circuitry 1208 in the remote server 146 shown in FIG. 12 also analyzes sensor feedback data (and associated timestamps) associated with one or more other door systems different than the door system 100 of FIG. 1. Further, in some such examples, the sensor feedback analysis circuitry 1208 compares sensor feedback data (and associated timestamps) aggregated from the multiple different door systems. In some examples, the sensor feedback analysis circuitry 1208 of FIG. 12 is duplicative of the sensor feedback analysis circuitry 1110 of FIG. 11. In some examples, the sensor feedback analysis circuitry 1110 can be omitted from the controller 116 of FIG. 11. In some examples, the sensor feedback analysis circuitry 1208 can be omitted from the remote server 146 of FIG. 12. In some examples, the data logging circuitry 1206 logs data output by the sensor feedback analysis circuitry 1110 of FIG. 11 and/or the sensor feedback analysis circuitry 1208 of FIG. 12.

The example operations adjustment analysis circuitry 1210 in FIG. 12 provides similar functionality to the operations adjustment analysis circuitry 1112 of the controller 116 described above in connection with FIG. 11. In some examples, the operations adjustment analysis circuitry 1210 of FIG. 12 is duplicative of the operations adjustment analysis circuitry 1112 of FIG. 11. In some examples, the operations adjustment analysis circuitry 1112 can be omitted from the controller 116 of FIG. 11. In some examples, the operations adjustment analysis circuitry 1210 can be omitted from the remote server 146 of FIG. 12. In some examples, the operations adjustment analysis circuitry 1210 is instantiated by processor circuitry executing operations adjustment analysis instructions and/or configured to perform operations such as those represented by the flowchart of FIG. 13-23.

The example report generation circuitry 1212 of FIG. 12 generates alerts, notifications, and/or reports indicative of the aggregated sensor feedback data and/or the results of the analysis of the sensor feedback data. In some examples, the report generation circuitry 1212 relays and/or incorporates the alerts and/or notifications generated by the operations control circuitry 1114 of the controller 116 of FIG. 11. In some examples, the report generation circuitry 1212 can provide the alerts, notifications, and/or reports to a web server to display the information in one or more webpages accessible by relevant personnel. Additionally or alternatively, the report generation circuitry 1212 can generate alerts, notifications, and/or reports that are transmitted directly to computing devices of relevant personnel via the example communications interface circuitry 1214. For instance, the communications interface circuitry 1214 can send out email messages and/or SMS messages to one or more designated computing devices. In some examples, the report generation circuitry 1212 is instantiated by processor circuitry executing report generation instructions and/or configured to perform operations such as those represented by the flowchart of FIG. 13-23. In some examples, the communications interface circuitry 1214 is instantiated by processor circuitry executing communications interface instructions and/or configured to perform operations such as those represented by the flowchart of FIG. 13-23.

While an example manner of implementing the remote server 146 of FIG. 1 is illustrated in FIG. 12, one or more of the elements, processes and/or devices illustrated in FIG. 12 can be combined, divided, re-arranged, omitted, eliminated and/or implemented in any other way. Further, the example controller interface circuitry 1202, the example timestamping circuitry 1204, the example data logging circuitry 1206, the example sensor feedback analysis circuitry 1208, the example operations adjustment analysis circuitry 1210, the example report generation circuitry 1212, the example communications interface circuitry 1214, the example memory 1216 and/or, more generally, the example remote server 146 of FIG. 1 can be implemented by hardware, software, firmware and/or any combination of hardware, software and/or firmware. Thus, for example, any of the example controller interface circuitry 1202, the example timestamping circuitry 1204, the example data logging circuitry 1206, the example sensor feedback analysis circuitry 1208, the example operations adjustment analysis circuitry 1210, the example report generation circuitry 1212, the example communications interface circuitry 1214, the example memory 1216 and/or, more generally, the example remote server 146 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example controller interface circuitry 1202, the example timestamping circuitry 1204, the example data logging circuitry 1206, the example sensor feedback analysis circuitry 1208, the example operations adjustment analysis circuitry 1210, the example report generation circuitry 1212, the example communications interface circuitry 1214, and/or the example memory 1216 is/are hereby expressly defined to include a non-transitory computer readable storage device or storage disk such as a memory, a digital versatile disk (DVD), a compact disk (CD), a Blu-ray disk, etc. including the software and/or firmware. Further still, the example remote server 146 of FIG. 1 can include one or more elements, processes and/or devices in addition to, or instead of, those illustrated in FIG. 12, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic circuitry, machine readable instructions, hardware implemented state machines, and/or any combination thereof for implementing the controller 116 of FIGS. 1, 5, 7, 9, and/or 11 are shown in FIGS. 13-23. Although described with reference to the controller 116, as described above, many of the functionalities of the controller 116 can additionally or alternatively be implemented by the controller 140 and/or the remote server 146. As such, in some examples, one or more of the blocks in one or more of FIGS. 13-23 can be implemented by the controller 140 and/or the remote server 146 in addition to or instead of the controller 116. The machine readable instructions represented in FIGS. 13-23 can be one or more executable programs or portion(s) of an executable program for execution by processor circuitry, such as the processor circuitry 2412 shown in the example processor platform 2400 discussed below in connection with FIG. 24 and/or the example processor circuitry discussed below in connection with FIGS. 25 and/or 26. The program can be embodied in software stored on one or more non-transitory computer readable storage media such as a compact disk (CD), a floppy disk, a hard disk drive (HDD), a solid-state drive (SDD), a digital versatile disk (DVD), a Blu-ray disk, or a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 13-23, many other methods of implementing the example controller 116 can alternatively be used. For example, the order of execution of the blocks can be changed, and/or some of the blocks described can be changed, eliminated, or combined. Additionally or alternatively, any or all of the blocks can be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry can be distributed in different network locations and/or local to one or more hardware devices (e.g., a single-core processor (e.g., a single core central processor unit (CPU)), a multi-core processor in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein can be stored in one or more of a compressed format, an encrypted format, a fragmented format, a compiled format, an executable format, a packaged format, etc. Machine readable instructions as described herein can be stored as data or a data structure (e.g., as portions of instructions, code, representations of code, etc.) that can be utilized to create, manufacture, and/or produce machine executable instructions. For example, the machine readable instructions can be fragmented and stored on one or more storage devices and/or computing devices (e.g., servers) located at the same or different locations of a network or collection of networks (e.g., in the cloud, in edge devices, etc.). The machine readable instructions can require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions can be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions can be stored in a state in which they can be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, can include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions can be represented using any of the following languages: C, C++, Java, C#, Perl, Python, JavaScript, HyperText Markup Language (HTML), Structured Query Language (SQL), Swift, etc.

As mentioned above, the example operations of FIGS. 13-23 can be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 13:
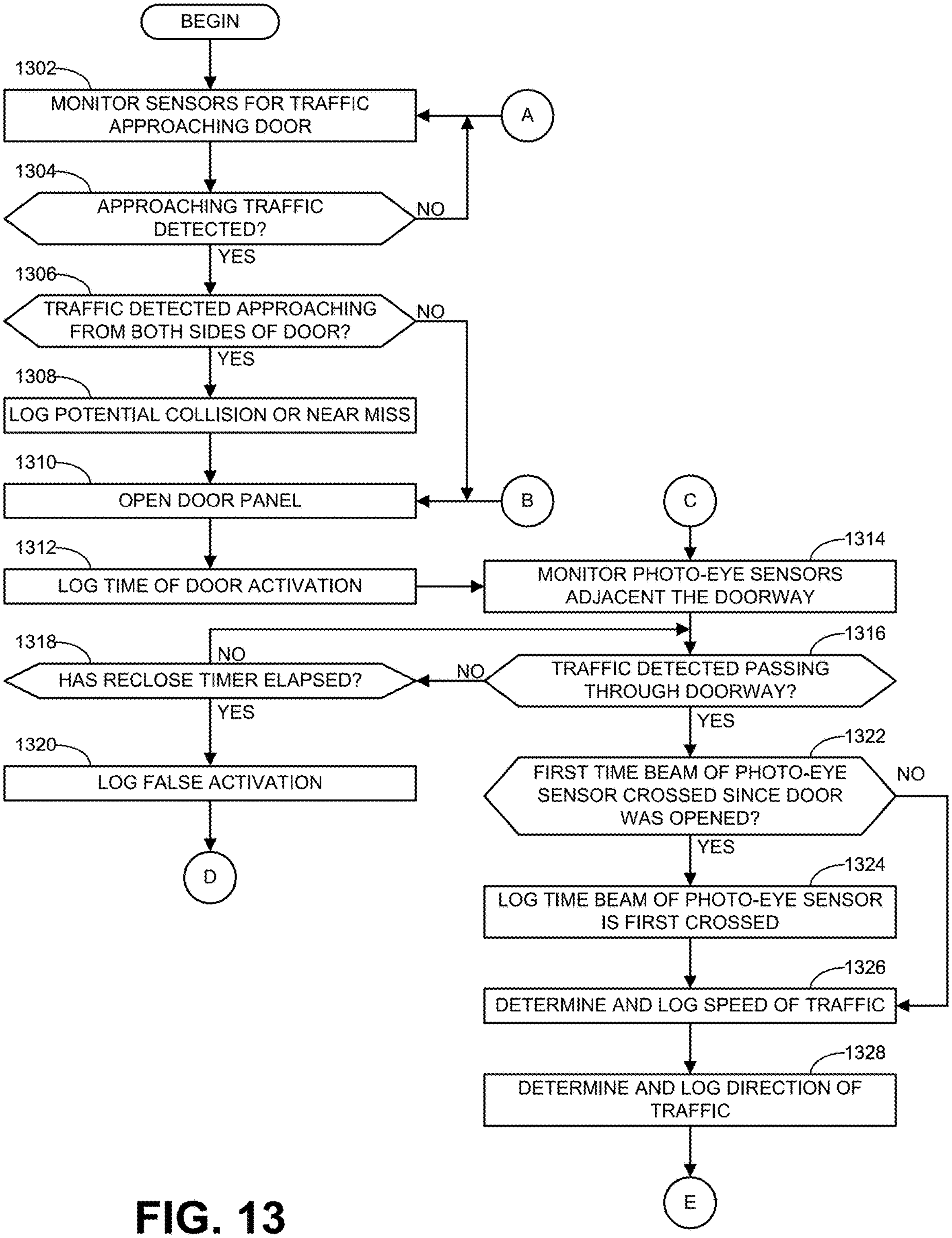
FIGS. 13-23 are flowcharts representative of machine readable instructions and/or example operations to implement the example controller of FIGS. 1, 5, 7, 9, and/or 11.

The example machine readable instructions and/or example operations of FIG. 13 begins at block 1302 where the example sensor feedback analysis circuitry 1110 monitors sensors for traffic approaching the door 101. In some examples, the sensors being monitored correspond to one or more of the buttons or switches 118 (or other manual door actuation mechanism), the touchscreen 120 of the controller 116, the ranging sensor 124, and/or the motion or presence sensor 125. At block 1304, the example sensor feedback analysis circuitry 1110 determines whether approaching traffic has been detected. If not, control returns to block 1302. If so, control advances to block 1306 where the example sensor feedback analysis circuitry 1110 determines whether traffic is approaching from both sides of the door. If so, control advances to block 1308 where the example data logging circuitry 1108 logs a potential collision or near miss. Thereafter, control advances to block 1310 where the operations control circuitry 1114 opens the door panel 102 of the door 101. In some examples, in response to detecting a potential collision or near miss, the operations control circuitry 1114 can generate an alert (e.g., trigger a bell, a horn, a light, etc.) to notify individuals on either side of the doorway that traffic is approaching from the opposite side. Returning to block 1306, if the example sensor feedback analysis circuitry 1110 determines that traffic is not approaching from both sides of the door, control advances directly to block 1310 to open the door panel 102.

At block 1312, the example data logging circuitry 1108 (in conjunction with the example timestamping circuitry 1106) logs the time of the door activation. At block 1314, the example sensor feedback analysis circuitry 1110 monitors photo-eye sensors adjacent the doorway. The photo-eye sensors can correspond to any one of the photo-eye sensors 134, 136, 138, 142. At block 1316, the example sensor feedback analysis circuitry 1110 determines whether traffic passing through the doorway has been detected. In some examples, traffic passing through the doorway is detected based on the beam of at least one of the photo-eye sensors 134, 136, 138, 142 being crossed or interrupted. If no traffic has been detected passing through the doorway (e.g., no photo-eye sensor has been tripped), control advances to block 1318 where the operations control circuitry 1114 determines whether a reclose timer has elapsed. If not, control returns to block 1316. If the reclose timer has elapsed (and no traffic was detected passing through the doorway at block 1316), control advances to block 1320 where the example data logging circuitry 1108 logs a false activation. In some examples, the particular sensor that triggered the activation of the door 101 is associated with the log entry of the false activation so that it can be linked to the particular sensor that triggered the activation. Associating this information is useful to identify which sensor may need to be adjusted if it is frequently the cause of a false activation. After logging the false activation, control advances to block 1424 of FIG. 14 where the operations control circuitry 1114 closes the door panel 102.

Returning to block 1316, if the example sensor feedback analysis circuitry 1110 determines that traffic has been detected passing through the doorway, control advances to block 1322 where the example sensor feedback analysis circuitry 1110 determines whether it is the first time the beam of the photo-eye sensor has been crossed (e.g., in an interrupted state) since the door 101 was opened. If so, control advances to block 1324 where the example data logging circuitry 1108 (in conjunction with the example timestamping circuitry 1106) logs the time the beam of the photo-eye sensor was first crossed. Thereafter, control advances to block 1326. If the traffic detected by the photo-eye sensor is not the first instance of detected traffic since the door 101 was opened, control advances directly to block 1326. At block 1326, the example sensor feedback analysis circuitry 1110 (in conjunction with the example data logging circuitry 1108) determines and logs the speed of the traffic. In some examples, the speed of traffic is determined based on the time difference between the beams of two separate photo-eye sensors and a known distance between the sensors. In other examples, the speed can be determined based on feedback from the ranging sensor 124 and/or the motion sensor 125. At block 1328, the example sensor feedback analysis circuitry 1110 (in conjunction with the example data logging circuitry 1108) determines and logs the direction of the traffic. In some examples, the direction of traffic is determined based the order in which the beams of the two separate photo-eye sensors and a known distance between the sensors. In other examples, the direction can be determined based on feedback from the ranging sensor 124 and/or the motion sensor 125. Thereafter, control advances to block 1402 of FIG. 14.

At block 1402, the example sensor feedback analysis circuitry 1110 determines whether the beam of a photo-eye sensor is still crossed (or interrupted). The controller 116 determines that an object or something is still in the path of the doorway such that the door panel 102 cannot safely be closed in response to one of the beams of the photo-eye sensors being crossed or in an interrupted state. Accordingly, if a beam of a photo-eye sensor is crossed, control advances to block 1404 where the example operations control circuitry 1114 determines whether a threshold time period has elapsed since the beam was first crossed (as logged at block 1324 of FIG. 13). If not, control returns to block 1402. If the threshold time period has elapsed, control advances to block 1406 where the example operations control circuitry 1114 generates an alert indicating the door 101 has been opened for too long (e.g., for a period of time that is greater than a threshold period, for an excess period of time) and/or that an object is present in the doorway. In some examples, this alert can be generated locally by the door to inform individuals near the door about the situation. Additionally or alternatively, the operations control circuitry 1114 can provide the alert to the remote server 146 to transmit the alert to relevant personnel. Thereafter, at block 1408, the example sensor feedback analysis circuitry 1110 determines whether the beam of the photo-eye sensor is still crossed (e.g., in an interrupted state). If so, control remains at block 1408. If the beam is no longer crossed (e.g., the doorway has been cleared of traffic and/or the beam is not interrupted), control advances to block 1410, where the example data logging circuitry 1108 (in conjunction with the example timestamping circuitry 1106) logs the time traffic cleared the beam of the photo-eye sensor. Returning to block 1402, if the sensor feedback analysis circuitry 1110 determines that the beam of the photo-eye sensor is not crossed (e.g., is not interrupted), control advances directly to block 1410.

At block 1412, the example sensor feedback analysis circuitry 1110 determines whether a breakaway event was detected (e.g., based on feedback from the breakaway sensors 122). If so, control advances to block 1414 where the example data logging circuitry 1108 (in conjunction with the example timestamping circuitry 1106) logs the breakaway event. In some examples, the particular sensor that triggered the activation of the door 101 is associated with the log entry of the breakaway event so that the event can be linked to the particular sensor that triggered the activation. Associating this information is useful to identify which sensor may need to be adjusted if it is (e.g., frequently) the cause of a breakaway event. After logging the breakaway event, control advances to block 1416. If no breakaway event is detected at block 1412, control advances directly to block 1416. At block 1416, the operations control circuitry 1114 determines whether the reclose timer has elapsed. If not, control returns to block 1314 of FIG. 13 to continue monitoring the photo-eye sensors. If the reclose timer has elapsed, control advances to block 1418 where the example sensor feedback analysis circuitry 1110 determines whether the beam of the elevated photo-eye sensor 142 was crossed during the cycle of the door. If so, control advances to block 1420 where the example data logging circuitry 1108 labels the traffic as a fork truck. Thereafter, control advances to block 1424. If the example sensor feedback analysis circuitry 1110 determines, at block 1418, that the beam of the elevated photo-eye sensor 142 was not crossed (e.g., uninterrupted), control advances to block 1422 where the example data logging circuitry 1108 labels the traffic as a pedestrian. Thereafter, control advances to block 1424. Although the elevated photo-eye sensor 142 is described as being used to distinguish a fork truck from a pedestrian, in other examples, a similar determination can be made based on feedback from the ranging sensor 124.

At block 1424, the example operations control circuitry 1114 closes the door panel 102. At block 1426, the example data logging circuitry 1108 (in conjunction with the example timestamping circuitry 1106) logs the time the door panel 102 begins closing. At block 1428, the example sensor feedback analysis circuitry 1110 determines whether to reverse the door panel 102. In some examples, reversing the movement of door (e.g., reopening the door as it is being closed) can be determined based on feedback from a reversing edge sensor on the door panel 102, based on feedback from one of the photo-eye sensors 134, 136, 138 being tripped, based on feedback from the breakaway sensor 142, based on feedback from the bag-up sensor 144, based on input from one of the buttons or switches 118, and/or based on additional traffic detected by the ranging sensor 124 and/or the motion sensor 125. If the door panel 102 is to be reversed, control advances to block 1430 where the example data logging circuitry 1108 (in conjunction with the example timestamping circuitry 1106) logs the time of the door reversal. Thereafter, control returns to block 1310 of FIG. 13 to open the door panel 102. If the door panel 102 is not to be reversed, the door panel 102 will return to the fully closed position and control advances to block 1432 where the example operations adjustment analysis circuitry 1112 analyzes data for adjustments to operations of the door 101. Example implementations of block 1432 are provided in further detail below in connection with FIGS. 15-18. At block 1434, the operations control circuitry 1114 determines whether to continue. If so, control returns to block 1302 of FIG. 13. Otherwise, the example process of FIGS. 13 and 14 ends.

Figure 14:
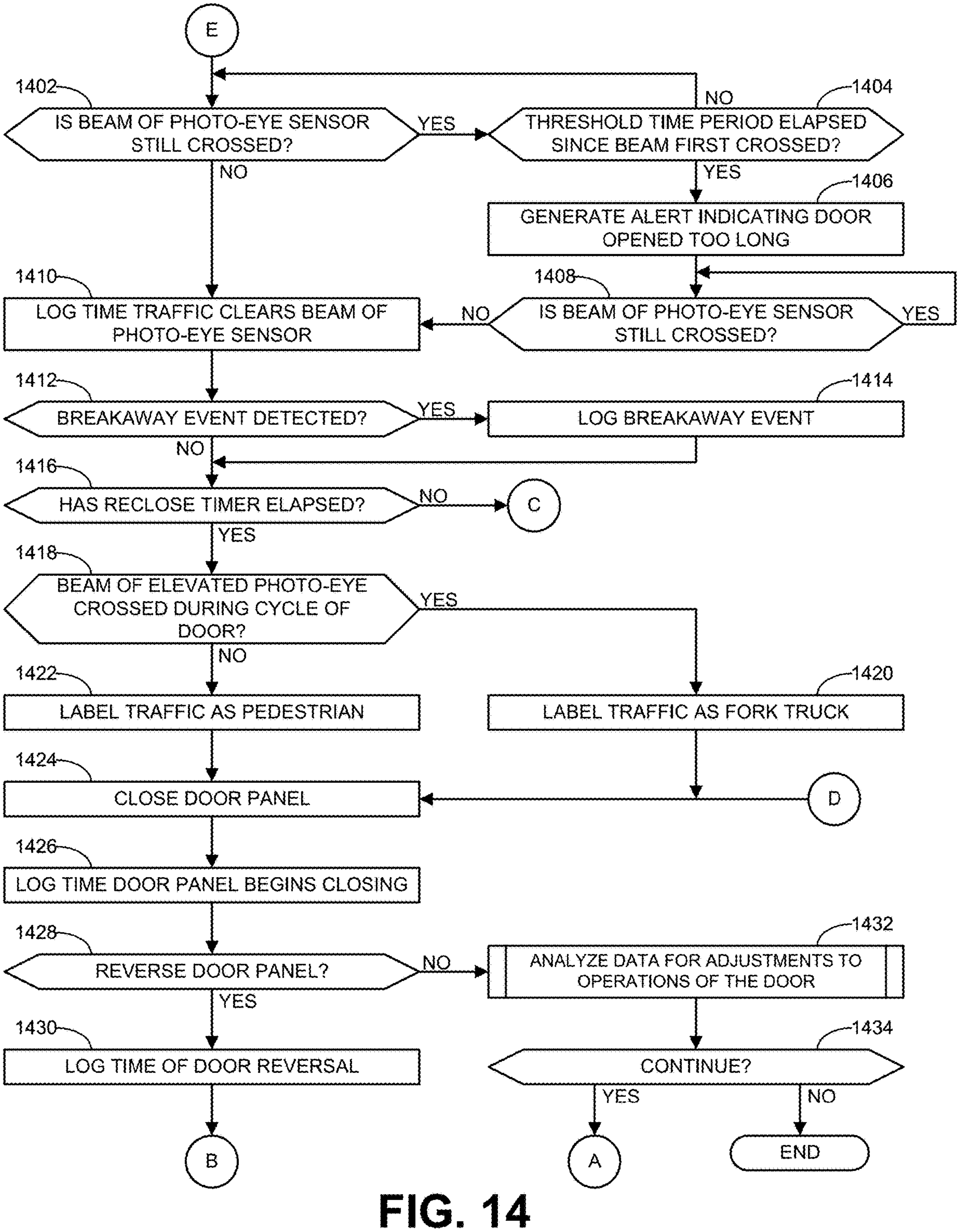

FIGS. 15-18 are flowcharts representative of example machine readable instructions and/or example operations that can be executed to implement block 1432 of FIG. 14. Any one of the flowcharts of FIGS. 15-18 can be implemented independent of the others. Thus, in some examples, implementation of block 1432 of FIG. 14 corresponds to a particular one of FIGS. 15-18. In some examples, implementation of block 1432 of FIG. 14 can include more than one or even all of FIGS. 15-18. In some examples, one or more of FIGS. 15-18 can be implemented each iteration through the process of FIGS. 13 and 14. In other examples, one or more of FIGS. 15-18 can be implemented on a periodic or aperiodic basis.

Figure 15:
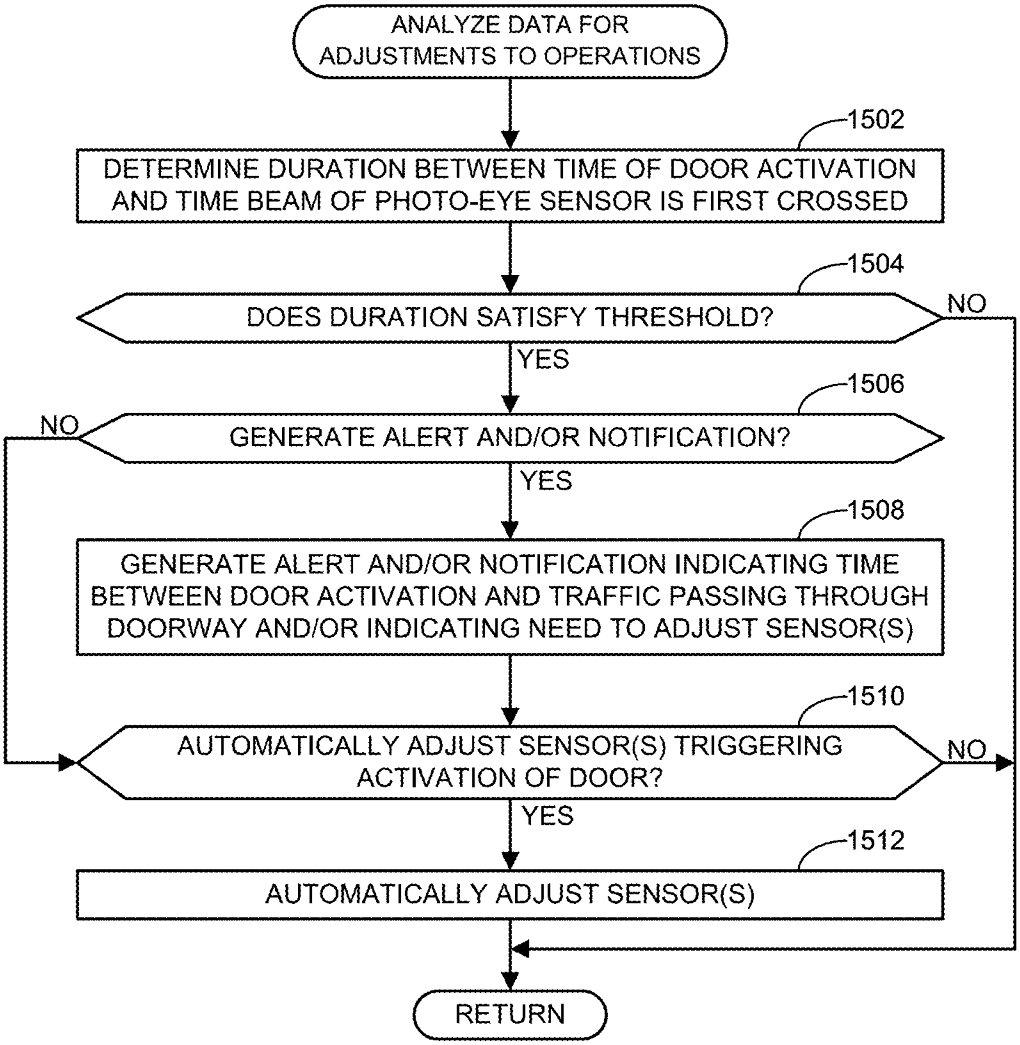

The example program of FIG. 15 begins at block 1502 where the example operations adjustment analysis circuitry 1112 determines a duration between the time of door activation (logged at block 1308 of FIG. 13) and the time the beam of the photo-eye sensor was first crossed (logged at block 1324 of FIG. 13). In some examples, the duration can correspond to the current cycle of the door. In other examples, the duration can be the average or median duration based on an analysis of multiple cycles of the door across some relevant period of time (e.g., 1 hour, 1 day, 1 week, 1 month, etc.) and/or some relevant number of cycles (e.g., most recent 10 cycles, 120 cycles, 100 cycles, etc.). At block 1504, the example operations adjustment analysis circuitry 1112 determines whether the duration satisfies (e.g., is below) a threshold. In some examples, the threshold is defined based on the time it takes for the door panel 102 to move from the fully closed position to the fully open position. If the threshold is satisfied, control advances to block 1506 where the example operations adjustment analysis circuitry 1112 determines whether to generate an alert and/or notification. If so, control advances to block 1508, where the operations control circuitry 1114 generates an alert and/or notification indicating the time between the door activation and the traffic passing through the doorway and/or indicating a need to adjust the sensor(s). Thereafter, control advances to block 1510. Returning to block 1506, if the example operations adjustment analysis circuitry 1112 determines not to generate an alert and/or notification, control advances directly to block 1510.

At block 1510, the example operations adjustment analysis circuitry 1112 determines whether to automatically adjust the sensor(s) triggering activation of the door 101. In some examples, this determination is made automatically without input from a human. In other examples, this decision is made based on feedback from a user responding to the alert and/or notification generated at block 1508. If adjustments are to be made, control advances to block 1512 where the example operations adjustment analysis circuitry 1112 automatically adjusts the sensor(s). More particularly, in some examples, the operations adjustment analysis circuitry 1112 generates one or more commands and/or instructions that are provided to the sensor adjustment system 126 associated with the sensor(s) to be adjusted. In some examples, the nature of the commands and/or instructions and/or the particular sensor that is adjusted is determined based on which sensor triggered the activation of the door and/or other sensor feedback data relating to the opening of the door. Thereafter, the example process of FIG. 15 ends and returns to complete the process of FIGS. 13 and 14. Returning to block 1510, if the sensors are not to be automatically adjusted (e.g., it is left up to an engineer or maintenance personnel to make the adjustments), the example process of FIG. 15 ends and returns to complete the process of FIGS. 13 and 14. Similarly, if it is determined at block 1504 that the threshold has not been satisfied, the example process of FIG. 15 ends and returns to complete the process of FIGS. 13 and 14.

Figure 16:
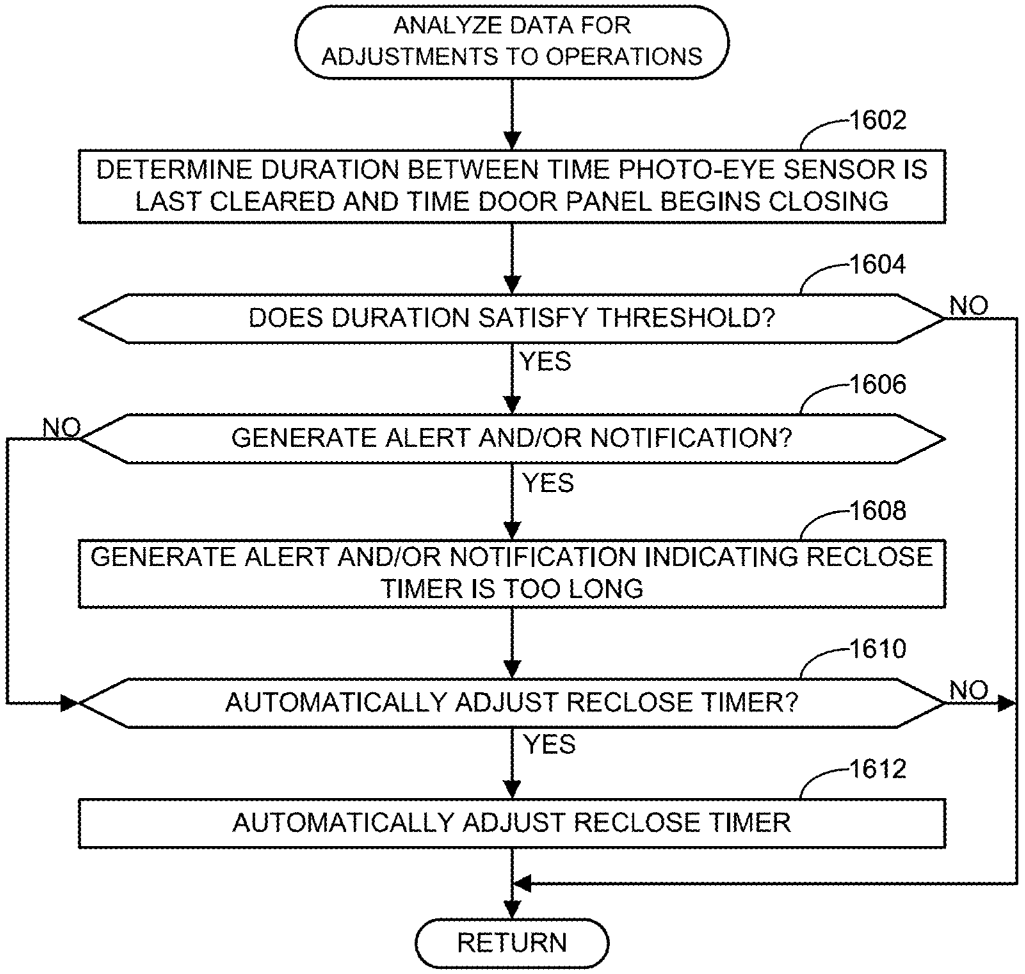

The example program of FIG. 16 begins at block 1602 where the example operations adjustment analysis circuitry 1112 determines a duration between the time a photo-eye sensor is last clears (logged at block 1410 of FIG. 14) and the time the door panel begins closing (logged at block 1426 of FIG. 14). In some examples, the duration can correspond to the current cycle of the door (e.g., the duration from a fully closed door moving to a fully open position and then returning to the fully closed position). In other examples, the duration can be the average or median duration based on an analysis of multiple cycles of the door across some relevant period of time (e.g., 1 hour, 1 day, 1 week, 1 month, etc.) and/or some relevant number of cycles (e.g., most recent 10 cycles, 120 cycles, 100 cycles, etc.). At block 1604, the example operations adjustment analysis circuitry 1112 determines whether the duration satisfies (e.g., exceeds) a threshold. If the threshold is satisfied, control advances to block 1606 where the example operations adjustment analysis circuitry 1112 determines whether to generate an alert and/or notification. If so, control advances to block 1608, where the operations control circuitry 1114 generates an alert and/or notification indicating the reclose timer is too long (e.g., exceeds a threshold duration of the time). Thereafter, control advances to block 1610. Returning to block 1606, if the example operations adjustment analysis circuitry 1112 determines not to generate an alert and/or notification, control advances directly to block 1610.

At block 1610, the example operations adjustment analysis circuitry 1112 determines whether to automatically adjust the reclose timer. In some examples, this determination is made automatically without input from a human. In other examples, this decision is made based on feedback from a user responding to the alert and/or notification generated at block 1608. If adjustments are to be made, control advances to block 1612 where the example operations adjustment analysis circuitry 1112 automatically adjusts the reclose timer. Thereafter, the example process of FIG. 16 ends and returns to complete the process of FIGS. 13 and 14. Returning to block 1610, if the reclose timer is not to be automatically adjusted (e.g., it is left up to an engineer or maintenance personnel to make the adjustments) the example process of FIG. 16 ends and returns to complete the process of FIGS. 13 and 14. Similarly, if it is determined at block 1604 that the threshold has not been satisfied, the example process of FIG. 16 ends and returns to complete the process of FIGS. 13 and 14.

Figure 17:
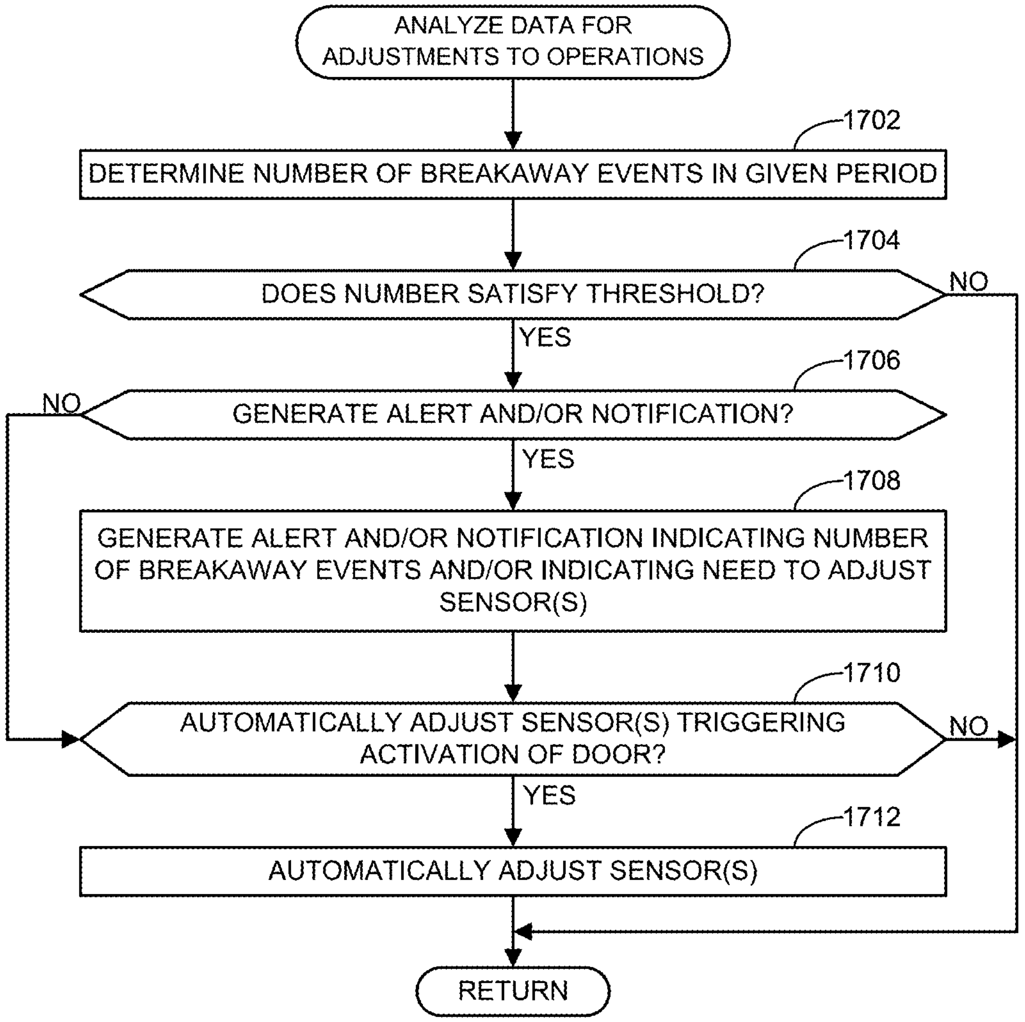

The example program of FIG. 17 begins at block 1702 where the example operations adjustment analysis circuitry 1112 determines a number of breakaway events (logged at block 1414 of FIG. 14) in a given period of time. In some examples, the number is a count of the breakaway events in the given period of time. In other examples, the number can be the ratio, proportion, or percentage of breakaway events relative to all cycles of the door during the given period. In some examples, the given period of time corresponds to some relevant period of time (e.g., 1 hour, 1 day, 1 week, 1 month, etc.) and/or some relevant set of cycles (e.g., most recent 10 cycles, 120 cycles, 100 cycles, etc.). At block 1704, the example operations adjustment analysis circuitry 1112 determines whether the number satisfies (e.g., exceeds) a threshold. If the threshold is satisfied, control advances to block 1706 where the example operations adjustment analysis circuitry 1112 determines whether to generate an alert and/or notification. If so, control advances to block 1708, where the operations control circuitry 1114 generates an alert and/or notification indicating the number of breakaway events and/or indicating a need to adjust the sensor(s). Thereafter, control advances to block 1710. Returning to block 1706, if the example operations adjustment analysis circuitry 1112 determines not to generate an alert and/or notification, control advances directly to block 1710.

At block 1710, the example operations adjustment analysis circuitry 1112 determines whether to automatically adjust the sensor(s) triggering activation of the door 101. In some examples, this determination is made automatically without input from a human. In other examples, this decision is made based on feedback from a user responding to the alert and/or notification generated at block 1708. If adjustments are to be made, control advances to block 1712 where the example operations adjustment analysis circuitry 1112 automatically adjusts the sensor(s). More particularly, in some examples, the operations adjustment analysis circuitry 1112 generates one or more commands and/or instructions that are provided to the sensor adjustment system 126 associated with the sensor(s) to be adjusted. In some examples, the nature of the commands and/or instructions and/or the particular sensor that is adjusted is determined based on which sensor triggered the activation of the door 101 and/or other sensor feedback data relating to the opening of the door 101. Thereafter, the example process of FIG. 17 ends and returns to complete the process of FIGS. 13 and 14. Returning to block 1710, if the sensors are not to be automatically adjusted (e.g., it is left up to an engineer or maintenance personnel to make the adjustments) the example process of FIG. 17 ends and returns to complete the process of FIGS. 13 and 14. Similarly, if it is determined at block 1704 that the threshold has not been satisfied, the example process of FIG. 17 ends and returns to complete the process of FIGS. 13 and 14.

Figure 18:
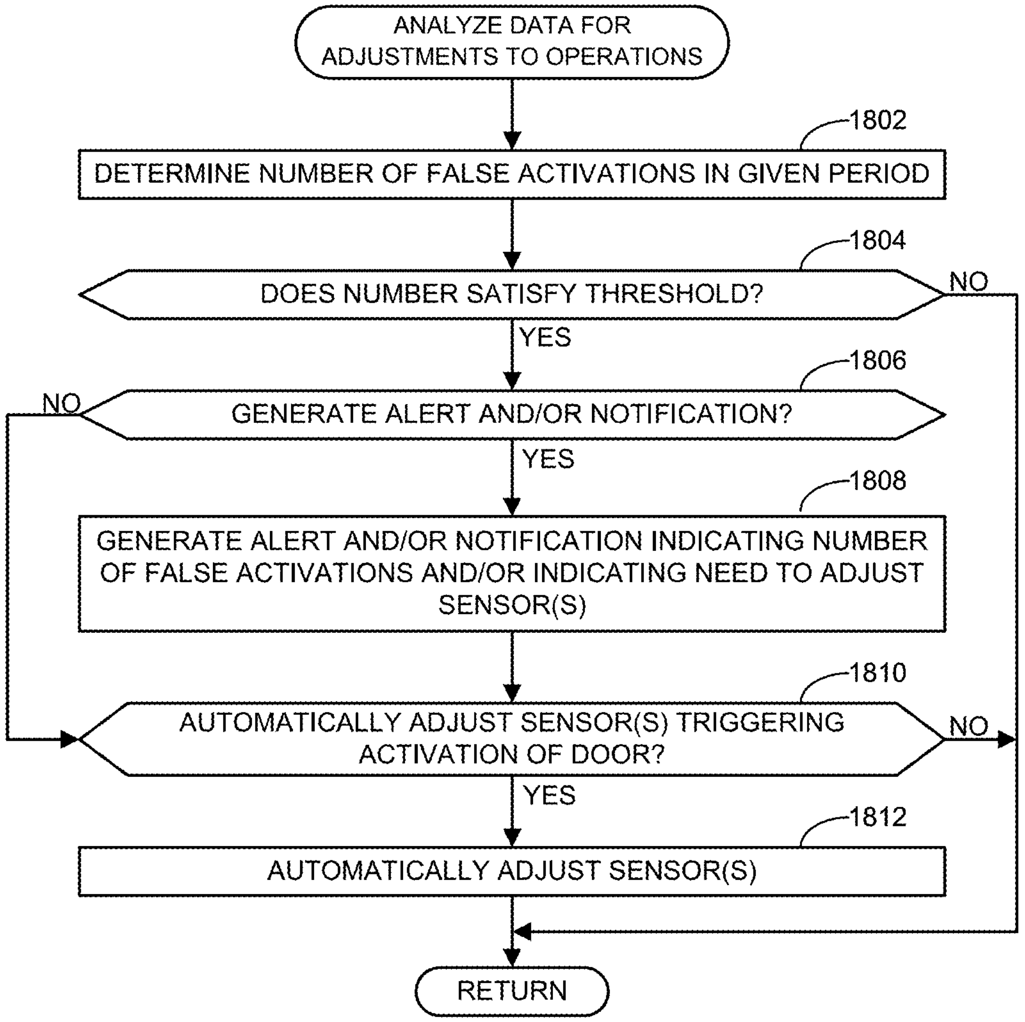

The example program of FIG. 18 begins at block 1802 where the example operations adjustment analysis circuitry 1112 determines a number of false activations (logged at block 1320 of FIG. 14) in a given period of time. In some examples, the number is a count of false activations in the given period of time. In other examples, the number can be the ratio, proportion, or percentage of false activations relative to all cycles of the door 101 during the given period. In some examples, the given period of time corresponds to some relevant period of time (e.g., 1 hour, 1 day, 1 week, 1 month, etc.) and/or some relevant set of cycles (e.g., most recent 10 cycles, 120 cycles, 100 cycles, etc.). At block 1804, the example operations adjustment analysis circuitry 1112 determines whether the number satisfies (e.g., exceeds) a threshold. If the threshold is satisfied, control advances to block 1806 where the example operations adjustment analysis circuitry 1112 determines whether to generate an alert and/or notification. If so, control advances to block 1808, where the operations control circuitry 1114 generates an alert and/or notification indicating the number of false activations and/or indicating a need to adjust the sensor(s). Thereafter, control advances to block 1810. Returning to block 1806, if the example operations adjustment analysis circuitry 1112 determines not to generate an alert and/or notification, control advances directly to block 1810.

At block 1810, the example operations adjustment analysis circuitry 1112 determines whether to automatically adjust the sensor(s) triggering activation of the door 101. In some examples, this determination is made automatically without input from a human. In other examples, this decision is made based on feedback from a user responding to the alert and/or notification generated at block 1808. If adjustments are to be made, control advances to block 1812 where the example operations adjustment analysis circuitry 1112 automatically adjusts the sensor(s). More particularly, in some examples, the operations adjustment analysis circuitry 1112 generates one or more commands and/or instructions that are provided to the sensor adjustment system 126 associated with the sensor(s) to be adjusted. In some examples, the nature of the commands and/or instructions and/or the particular sensor that is adjusted is determined based on which sensor triggered the activation of the door 101 and/or other sensor feedback data relating to the opening of the door 101. Thereafter, the example process of FIG. 18 ends and returns to complete the process of FIGS. 13 and 14. Returning to block 1810, if the sensors are not to be automatically adjusted (e.g., it is left up to an engineer or maintenance personnel to make the adjustments) the example process of FIG. 18 ends and returns to complete the process of FIGS. 13 and 14. Similarly, if it is determined at block 1804 that the threshold has not been satisfied, the example process of FIG. 18 ends and returns to complete the process of FIGS. 13 and 14.

Figure 19:
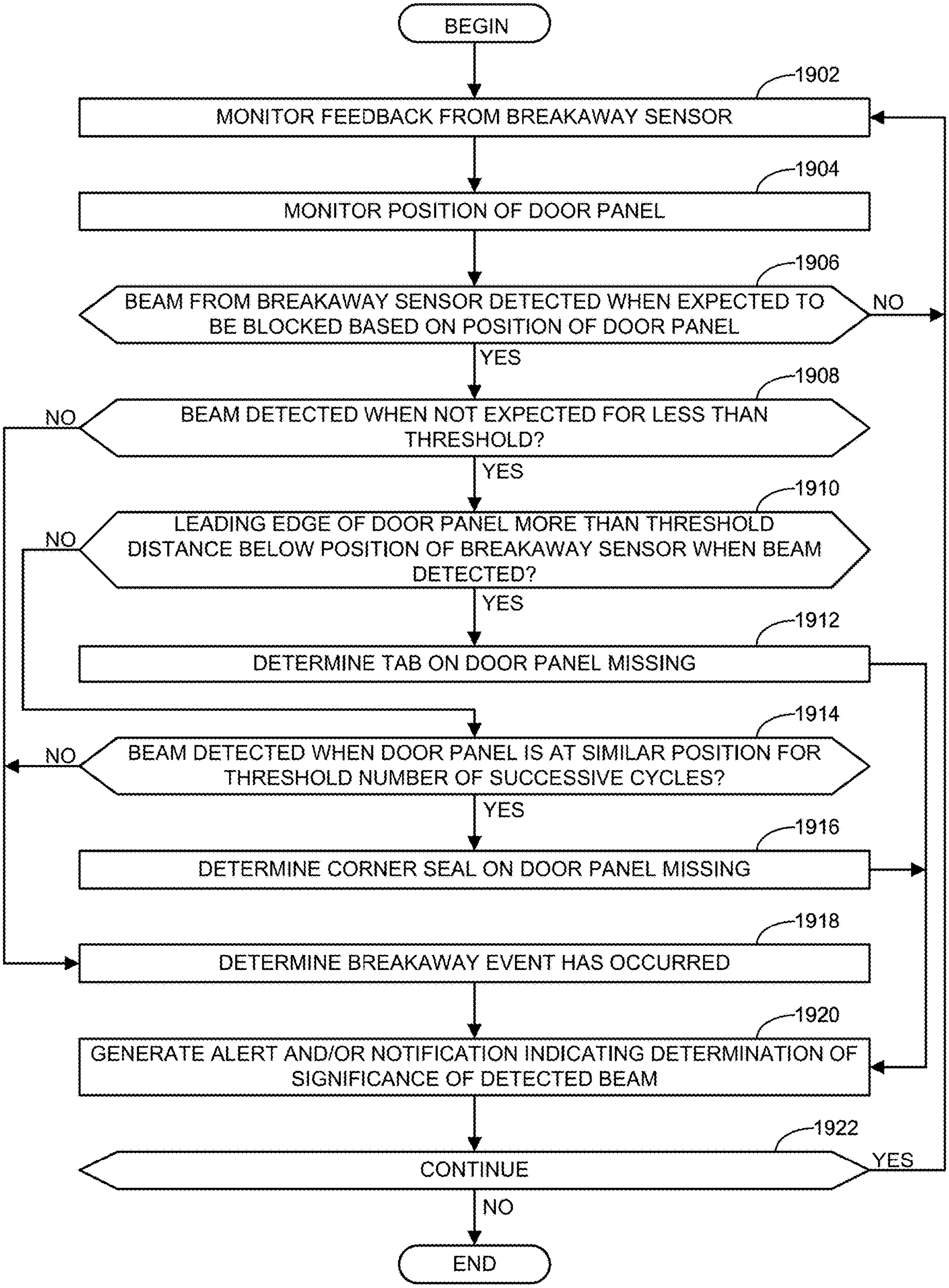

The example machine readable instructions and/or example operations of FIG. 19 can be implemented in conjunction with, in parallel to, and/or independent of any of the example programs represented by the flowcharts of FIGS. 13-18. The example program of FIG. 19 begins at block 1902 where the example sensor feedback analysis circuitry 1110 monitors feedback from a breakaway sensor 122. In this example, the breakaway sensor 122 is a photo-eye the emits a beam that is crossed by the door panel 102 when not in the fully open position as described above in connection with FIG. 4. At block 1904, the example sensor feedback analysis circuitry 1110 monitors the position of the door panel 102. In some examples, the position of the door panel 102 is monitored based on feedback from an encoder associated with the motor 114. At block 1906. the example sensor feedback analysis circuitry 1110 determines whether a beam from the breakaway sensor 122 is detected when expected to be blocked based on the position of the door panel 102. In some examples, the beam is expected to be blocked whenever the position of the door panel 102 is such that the leading edge of the door panel 102 is below the height of the beam. In some examples, the breakaway sensor 122 is located near the top of a track 106 used to guide the door panel 102 such that the beam is expected to be blocked during most of a door cycle except when the door panel 102 is at or near the fully open position. If no beam is detected when not expected, control returns to block 1902. If the beam is detected when expected to be blocked, control advances to block 1908.

At block 1908, the example sensor feedback analysis circuitry 1110 determines whether the beam is detected (e.g., an unexpected non-triggered state) when not expected for less than a threshold. In some examples, the threshold is a time threshold (e.g., 500 milliseconds, 200 milliseconds, etc.). In some examples, the threshold is a threshold distance of movement of the door panel 102 (e.g., corresponding to a width of a hole 408 used to secure a tab 402 to the door panel 102). If the beam is detected for less than the threshold, control advances to block 1910. If the beam is detected for at least the threshold, control advances to block 1918.

At block 1910, the example sensor feedback analysis circuitry 1110 determines whether the leading edge of the door panel 102 is more than a threshold distance below the position of the breakaway sensor when the beam is detected. In some examples, the threshold distance is the distance between the bottom edge of the door panel 102 and the hole 408 for the bottom-most tab 402. Comparing the position of the door panel 102 to a location within this threshold enables the controller 116 to distinguish between the beam being detected due to passing through a hole 408 (e.g., where a tab 402 is missing) and the beam being detected due to the corner seal 412 missing at the bottom edge of the door panel 102. Thus, if the leading edge of the door panel is more than the threshold distance below the breakaway sensor 122, control advances to block 1912 where the example sensor feedback analysis circuitry 1110 determines that a tab 402 on the door panel 102 is missing. In some examples, the sensor feedback analysis circuitry 1110 calculates a location of the missing tab 402 based on the position of the door panel 102 at the time the beam is detected. Thereafter, control advances to block 1920. If the leading edge of the door panel is not more than the threshold distance below the breakaway sensor 122, control advances to block 1914.

At block 1914, the example sensor feedback analysis circuitry 1110 determines whether the beam is detected when the door panel 102 is at a similar position (e.g., the leading edge being within the threshold distance of the breakaway sensor 122) for a threshold number of successive cycles. The threshold can be any suitable number (e.g., 1, 2, 3, 4, etc.). If the beam is detected when the door panel 102 is at the similar position for the threshold number of successive cycles (e.g., a unexpected non-triggered condition), control advances to block 1916. Otherwise, control advances to block 1918. In some examples, block 1914 can be omitted such that control advances directly to block 1916 (which is effectively the same as setting the threshold number of successive cycles to 1). At block 1916, the example sensor feedback analysis circuitry 1110 determines that a corner seal 412 on the door panel 102 is missing. Thereafter, control advances to block 1920.

At block 1918, the example sensor feedback analysis circuitry 1110 determines that a breakaway event has occurred. At block 1920, the example operations control circuitry 1114 generates an alert and/or notification indicating the determination of the significance of the detected beam (e.g., the determination at any one of blocks 1912, 1916, or 1918). Thereafter, control advances to block 1922 to determine whether to continue the process. If so, control returns to block 1902. Otherwise, the example process of FIG. 19 ends.

Figure 20:
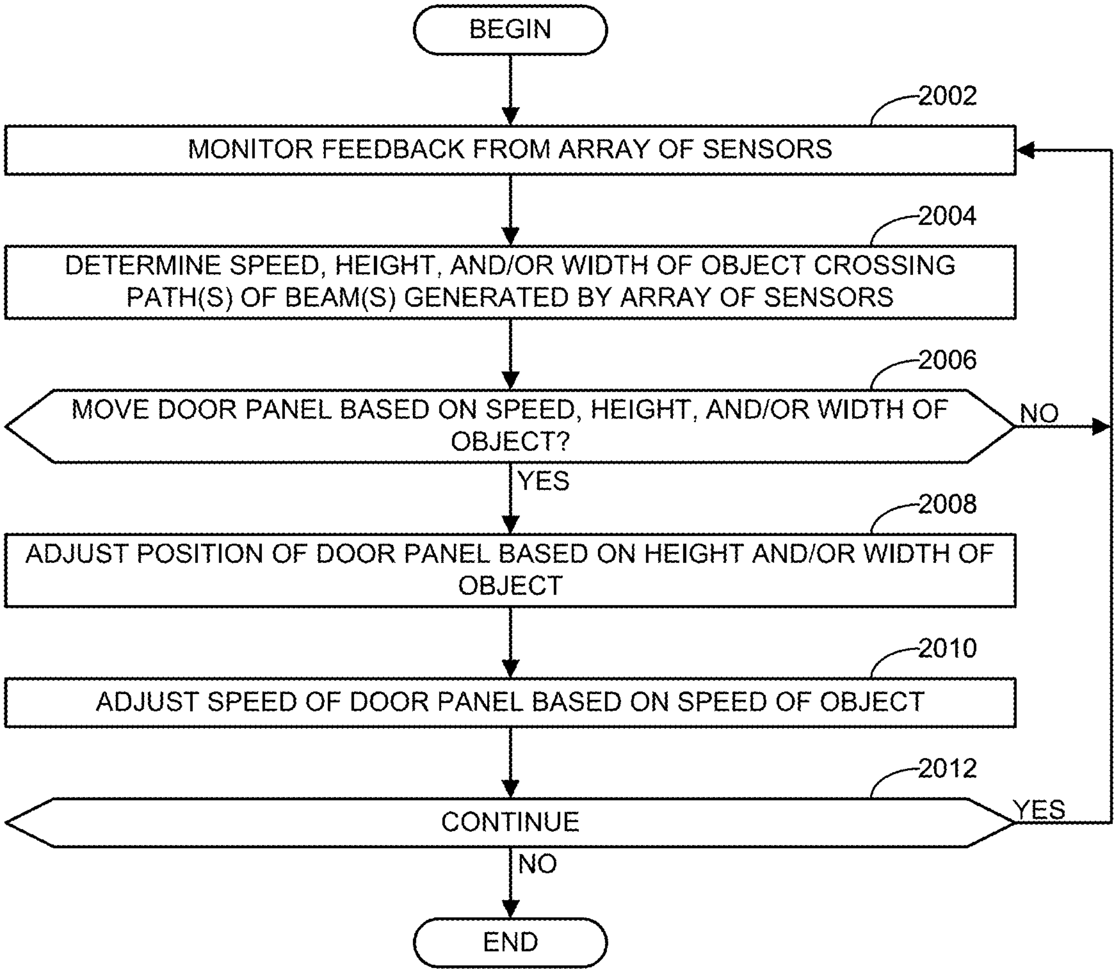

The example machine readable instructions and/or example operations of FIG. 20 can be implemented in conjunction with, in parallel to, and/or independent of any of the example programs represented by the flowcharts of FIGS. 13-19. The example program of FIG. 20 begins at block 2002 where the example sensor feedback analysis circuitry 1110 monitors feedback from an array of sensors (e.g., the array of height sensors 502 or the arrays of width sensors 712, 714). At block 2004, the example sensor feedback analysis circuitry 1110 determines a speed, height, and/or width of an object crossing path(s) of beam(s) generated by the array of sensors. At block 2006, the example operations control circuitry 1114 determines whether to move the door panel 102 based on the height and/or width of the object. In some examples, movement of the door panel 102 is unnecessary because the door panel 102 is already in a position that provides adequate clearance for the object based on the detected height and/or width. If the door panel is not to be moved, control returns to block 2002. If the door panel is to be moved based on the height and/or width of the object, control advances to block 2008 where the operations control circuitry 1114 adjusts the position of the door panel 102 based on the height and/or width of the object. At block 2010, the operations control circuitry 1114 adjusts the speed of the door panel 102 based on the speed of the object. In some examples, either block 2008 or block 2010 may be omitted and/or otherwise skipped. As a result, in some examples, the position of the door panel 102 is adjusted without adjusting the speed at which the door panel 102 is moved regardless of the detected speed of the object. Similarly, in some examples, the speed of the door is adjusted without adjusting a preset position to which the door panel 102 is to move (e.g., independent of the detected height and/or width). Thereafter, control advances to block 2012 to determine whether to continue the process. If so, control returns to block 2002. Otherwise, the example process of FIG. 20 ends.

Figure 21:
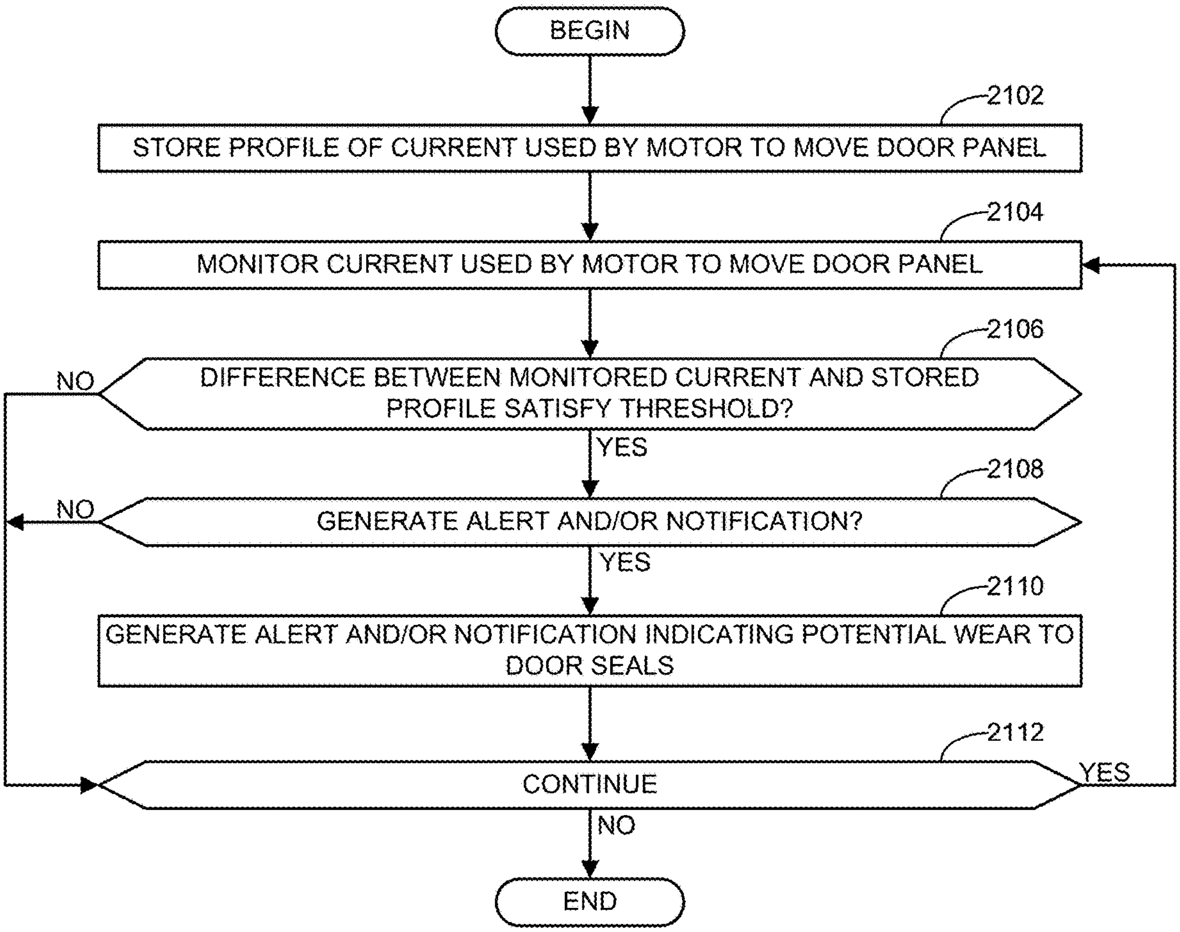

The example machine readable instructions and/or example operations of FIG. 21 can be implemented in conjunction with, in parallel to, and/or independent of any of the example programs represented by the flowcharts of FIGS. 13-20. The example program of FIG. 21 begins at block 2102 where the example memory 1118 stores a profile of the current used by a motor to move the door panel 102. In some examples, the profile of the current is captured when the door system is first installed and/or after a maintenance check confirming it is operating normally and there is no appreciable wear to the door seals 716 and/or associated protrusions 718. At block 2104, the example sensor feedback analysis circuitry 1110 monitors the current used by the motor to move the door panel 102.

At block 2106, the example sensor feedback analysis circuitry 1110 determines whether a difference between the monitored current and the stored profile satisfies (e.g., exceeds a threshold). If so, control advances to block 2108 where the example operations control circuitry 1114 determines whether to generate an alert and/or notification. In some examples, an alert is not generated until a threshold number of door cycles have resulted in the difference satisfying (e.g., exceeding) the threshold. If an alert and/or notification is to be generated, control advances to block 2110, where the operations control circuitry 1114 generates an alert and/or notification indicating potential wear to the door seals 716. Thereafter, control advances to block 2112. Returning to block 2108, if the example operations control circuitry 1114 determines not to generate an alert and/or notification, control advances directly to block 2112. At block 2112, the controller 116 determine whether to continue the process. If so, control returns to block 2104. Otherwise, the example process of FIG. 21 ends.

Figure 22:
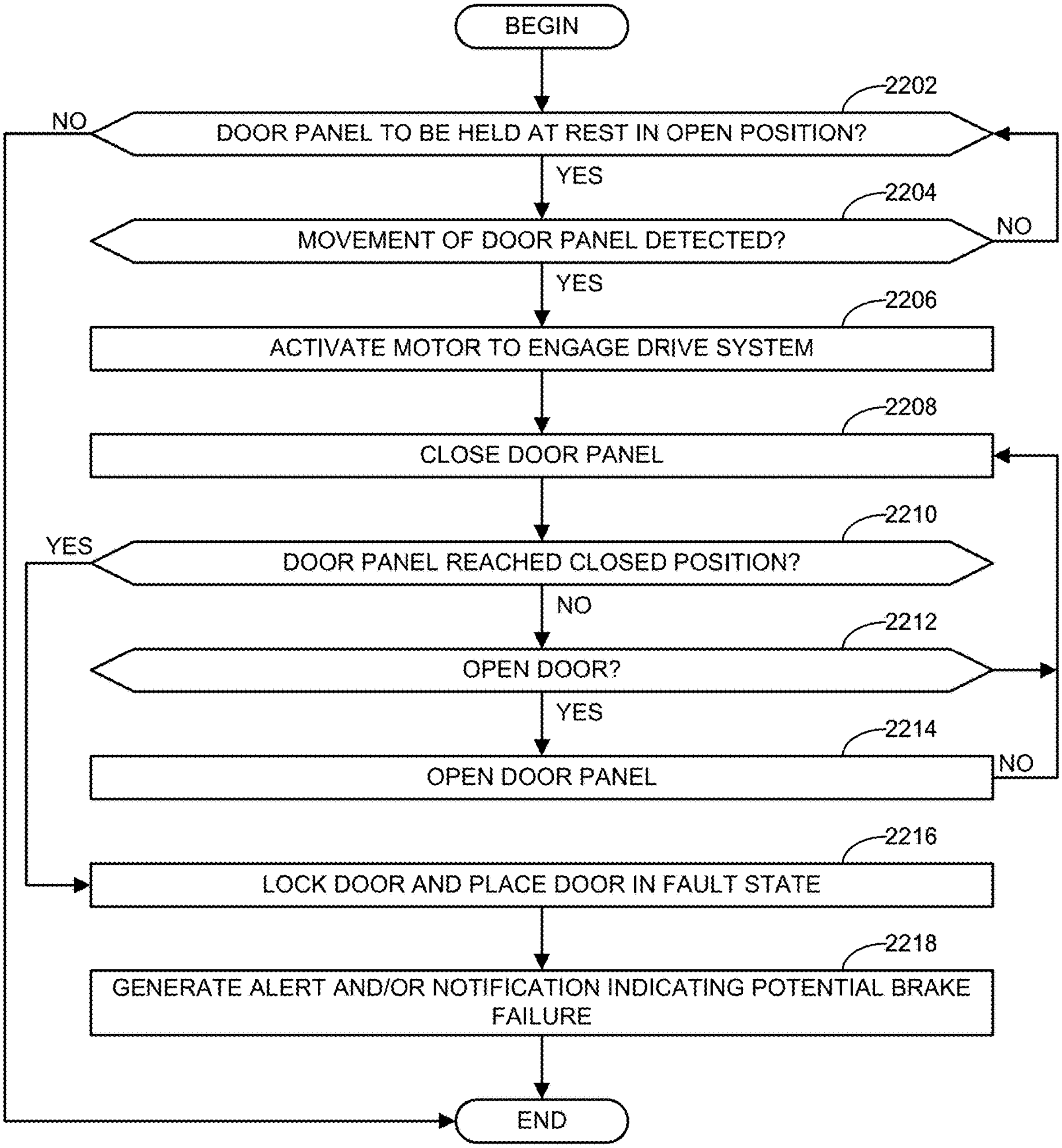

The example machine readable instructions and/or example operations of FIG. 22 can be implemented in conjunction with, in parallel to, and/or independent of any of the example programs represented by the flowcharts of FIGS. 13-21. The example program of FIG. 22 begins at block 2202 where the example operations control circuitry 1114 determines whether the door panel 102 is to be held at rest in an open position. If not (e.g., the door is either not open or is being moved between an open and closed position), the program of FIG. 22 does not apply and, therefore, ends. However, if the door panel 102 is to be held at rest in an open position, control advanced to block 2204. At block 2204, the example sensor feedback analysis circuitry 1110 determines whether movement of the door panel is detected. In some examples, the sensor feedback analysis circuitry 1110 detects such movement based on feedback from the encoder 115. In some examples, such movement is detected when the amount of movement satisfies (e.g., exceeds) a threshold distance of movement (e.g., at least 2 inches, at least 3 inches, at least 6 inches, etc.). If no movement satisfying the threshold is detected, control returns to block 2202. If the example sensor feedback analysis circuitry 1110 detects movement, control advances to block 2206.

Movement of the door panel (detected at block 2204) when such movement is not expected (based on the door panel intended to be held at rest as determined at block 2202) is an indication that a brake associated with the door 101 has failed and that the door panel 102 is falling under its own weight. Accordingly, at block 2206, the example operations control circuitry 1114 activates the motor 114 to engage an associated drive system. Engaging the drive system can stop the door panel 102 from free falling. In some examples, the motor 114 is activated to return the door panel 102 to the open position. In other examples, the motor 114 is activated to move the door panel 102 to a closed position. Once the drive system is engaged, control advances to block 2208 where the example operations control circuitry 1114 closes the door panel 102 of the door 101. At block 2210, the example sensor feedback analysis circuitry 1110 determines whether the door panel 102 has reached the closed position. If so, control advances to block 2216 where the example operations control circuitry 1114 locks the door and places the door in a fault state. Thus, this example program attempts to close the door 101 as soon as possible after a brake failure is detected to then lock the door 101 so as to prevent the door panel 102 from falling and potentially causing damage or injury.

Returning to block 2210, if the example sensor feedback analysis circuitry 1110 determines that the door panel 102 has not yet reached the closed position, there is a possibility the door 101 may need to be reopened (based on an activation or reversal signal from an associated sensor and/or manual input). Thus, prior to reaching the close position to lock the door, at block 2212, the example operations control circuitry 1114 determines whether to open the door. If so, control advances to block 2214 where the example operations control circuitry 1114 reopens the door. Thereafter, control returns to block 2208 to again attempt to close the door completely so that the door can be locked. If there is no need to open the door (determined at block 2212), control returns directly to block 2208 to continue closing the door 101 until completely closed.

Once the door is fully closed, locked, and in a fault state (at block 2216), control advances to block 2218 where the example operations control circuitry 1114 generates an alert and/or notification indicating a potential brake failure. In some examples, the alert and/or notification may also indicate that the door has been locked pending maintenance. Thereafter, the example process of FIG. 22 ends.

Figure 23:
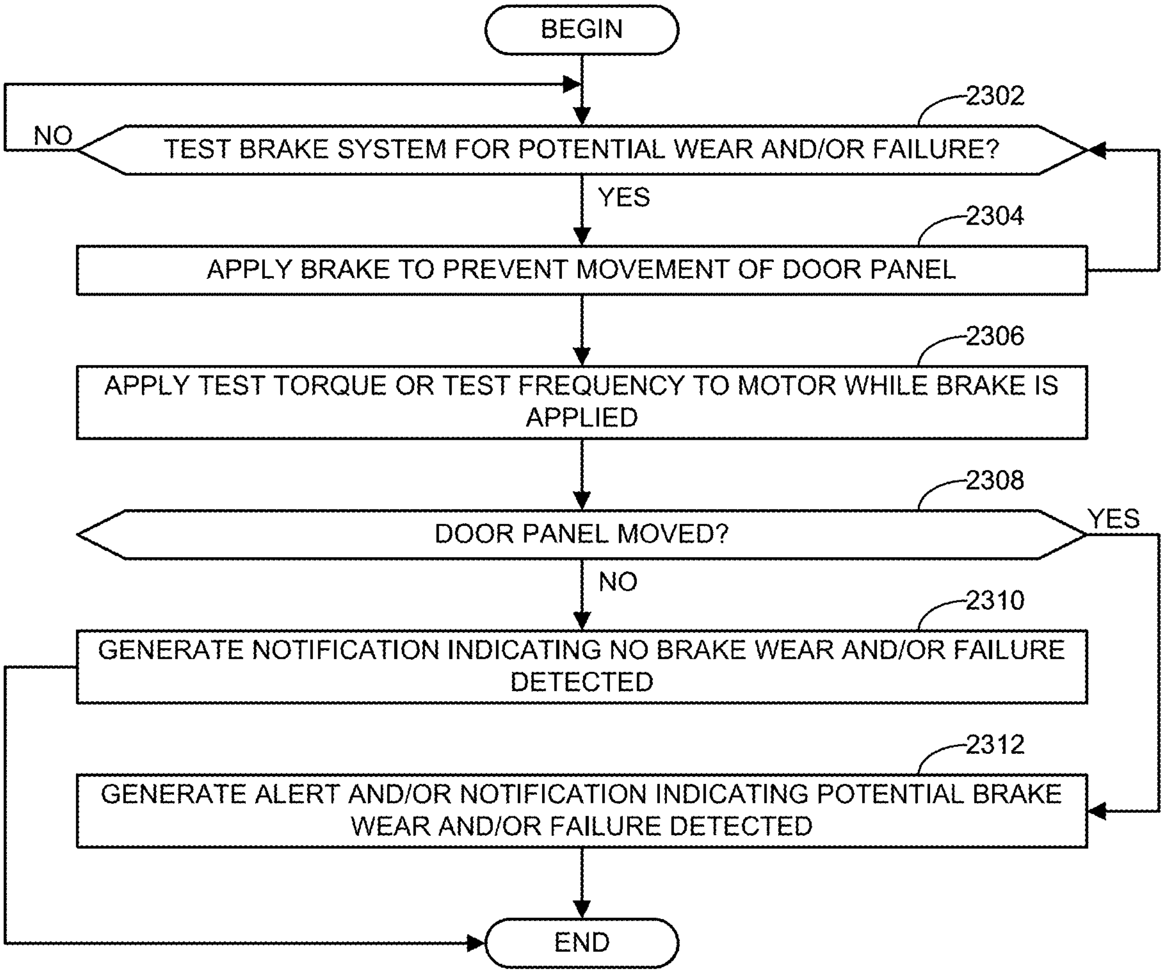

The example machine readable instructions and/or example operations of FIG. 23 can be implemented in conjunction with, in parallel to, and/or independent of any of the example programs represented by the flowcharts of FIGS. 13-22. The example program of FIG. 23 begins at block 2302 where the example operations control circuitry 1114 determines whether to test a brake system of the door 101 for potential wear and/or failure. In some examples, such testing is performed at each cycle of the door. In other examples, such testing is performed periodically and/or aperiodically as defined by a schedule, set number of door cycles, and/or based on user input. If no test is to be performed, control remains at block 2302. If a test of the brake system is to be performed, control advances to block 2304 where the example operations control circuitry 1114 applies the brake to prevent movement of the door panel 102. At block 2306, the example operations control circuitry 1114 applies a test torque or test speed to the motor 114 while the brake is applied. In some examples, the test torque or test speed is selected to be insufficient to overcome the force of the brake if the brake is in good working order but sufficient to overcome the force of a worn brake so as to cause movement to the door panel 102. At block 2308, the example sensor feedback analysis circuitry 1110 determines whether the door panel 102 moved. In some examples, this is determined based on feedback from the encoder 115. If no movement is detected, it can be confirmed that the brake is in good working order. Accordingly, in some examples, control advances to block 2310 where the example operations control circuitry 1114 generates a notification indicating no brake wear and/or failure was detected. Thereafter, the example process ends. In some examples, block 2310 is omitted.

Returning to block 2308, if movement of the door panel 102 is detected, this is an indication that the brake is worn and/or beginning to fail. Accordingly, in some examples, control advances to block 2312 where the example operations control circuitry 1114 generates an alert and/or notification indicating potential brake wear and/or brake failure has been detected. Thereafter, the example process of FIG. 23 ends.

Figure 24:
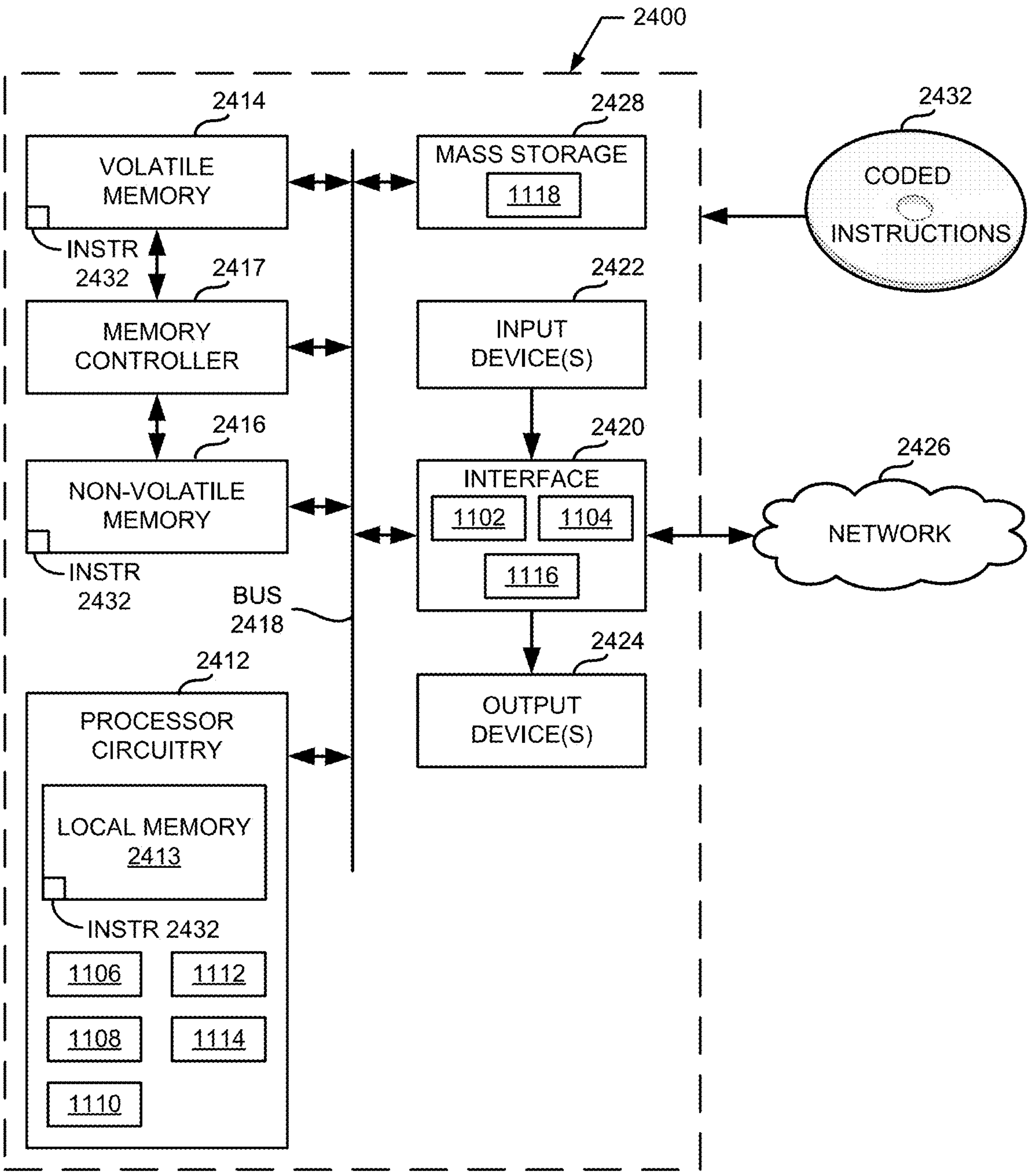
FIG. 24 is a block diagram of an example processing platform including processor circuitry structured to execute the example machine readable instructions and/or the example operations of FIGS. 13-23 to implement the example controller of FIGS. 1, 5, 7, 9, and/or 11.

FIG. 24 is a block diagram of an example processor platform 2400 structured to execute and/or instantiate the machine readable instructions and/or the operations of FIGS. 13-23 to implement the controller 116 of FIG. 11. The processor platform 2400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset (e.g., an augmented reality (AR) headset, a virtual reality (VR) headset, etc.) or other wearable device, or any other type of computing device.

The processor platform 2400 of the illustrated example includes processor circuitry 2412. The processor circuitry 2412 of the illustrated example is hardware. For example, the processor circuitry 2412 can be implemented by one or more integrated circuits, logic circuits, FPGAs, microprocessors, CPUs, GPUs, DSPs, and/or microcontrollers from any desired family or manufacturer. The processor circuitry 2412 may be implemented by one or more semiconductor based (e.g., silicon based) devices. In this example, the processor circuitry 2412 implements example timestamping circuitry 1106, the example data logging circuitry 1108, the example sensor feedback analysis circuitry 1110, the example operations adjustment analysis circuitry 1112, and the example operations control circuitry 1114.

The processor circuitry 2412 of the illustrated example includes a local memory 2413 (e.g., a cache, registers, etc.). The processor circuitry 2412 of the illustrated example is in communication with a main memory including a volatile memory 2414 and a non-volatile memory 2416 by a bus 2418. The volatile memory 2414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2416 may be implemented by flash memory and/or any other desired type of memory device. Access to the main memory 2414, 2416 of the illustrated example is controlled by a memory controller 2417.

The processor platform 2400 of the illustrated example also includes interface circuitry 2420. The interface circuitry 2420 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry implements the equipment interface circuitry 1102 and the example remote server interface circuitry 1104.

In the illustrated example, one or more input devices 2422 are connected to the interface circuitry 2420. The input device(s) 2422 permit(s) a user to enter data and/or commands into the processor circuitry 2412. The input device(s)

2422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2424 are also connected to the interface circuitry 2420 of the illustrated example. The output device(s) 2424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2420 of the illustrated example, thus, typically includes a graphics driver card, a graphics driver chip, and/or graphics processor circuitry such as a GPU.

The interface circuitry 2420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2400 of the illustrated example also includes one or more mass storage devices 2428 to store software and/or data. Examples of such mass storage devices 2428 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage device 2428 implements the example memory 1118.

The machine readable instructions 2432, which may be implemented by the machine readable instructions of FIGS. 13-23, may be stored in the mass storage device 2428, in the volatile memory 2414, in the non-volatile memory 2416, and/or on a removable non-transitory computer readable storage medium such as a CD or DVD.

Figure 25:
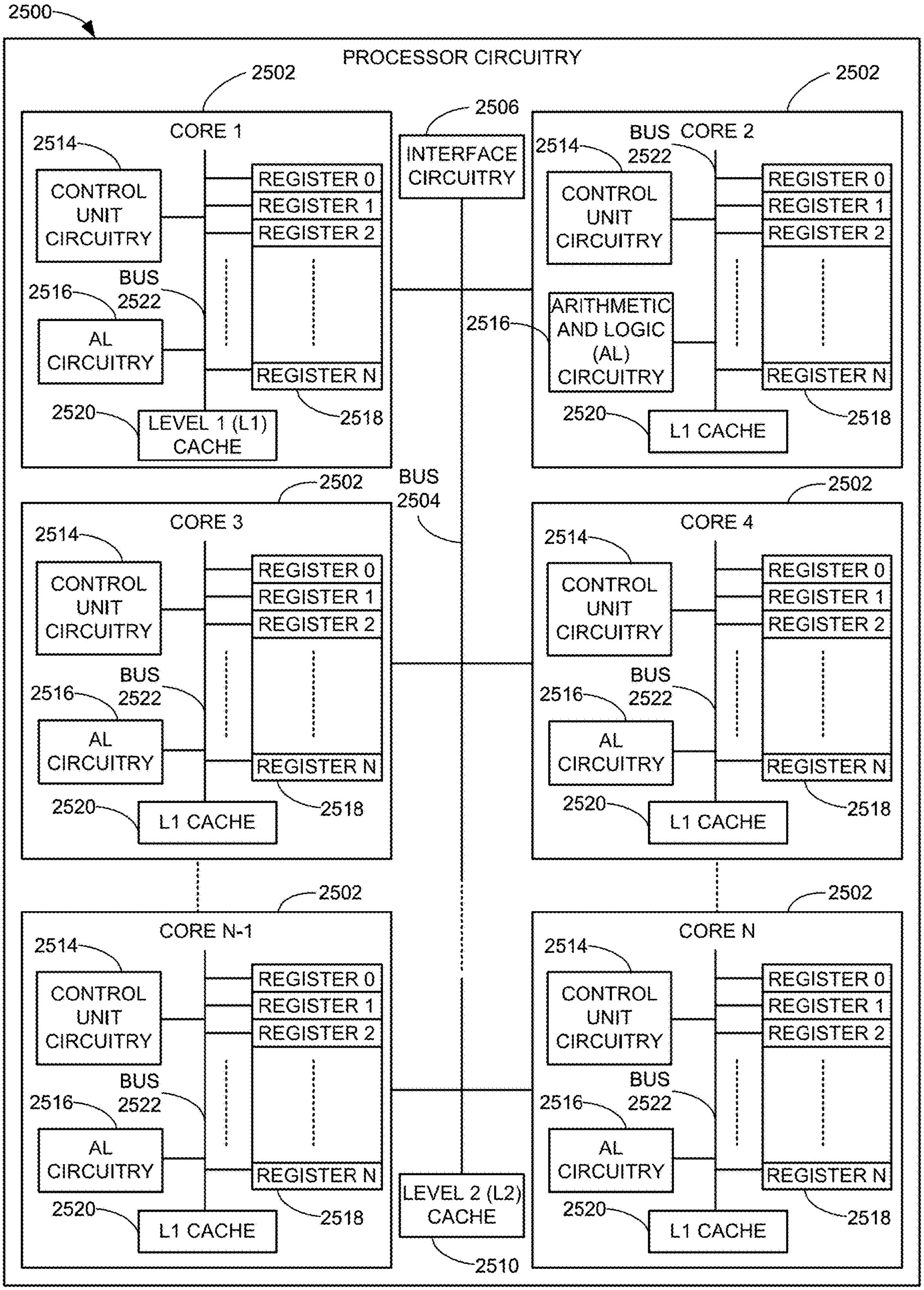
FIG. 25 is a block diagram of an example implementation of the processor circuitry of FIG. 24.

FIG. 25 is a block diagram of an example implementation of the processor circuitry 2412 of FIG. 24. In this example, the processor circuitry 2412 of FIG. 24 is implemented by a microprocessor 2500. For example, the microprocessor 2500 may be a general purpose microprocessor (e.g., general purpose microprocessor circuitry). The microprocessor 2500 executes some or all of the machine readable instructions of the flowcharts of FIGS. 13-23 to effectively instantiate the circuitry of FIG. 11 as logic circuits to perform the operations corresponding to those machine readable instructions. In some such examples, the circuitry of FIG. 11 is instantiated by the hardware circuits of the microprocessor 2500 in combination with the instructions. For example, the microprocessor 2500 may be implemented by multi-core hardware circuitry such as a CPU, a DSP, a GPU, an XPU, etc. Although it may include any number of example cores 2502 (e.g., 1 core), the microprocessor 2500 of this example is a multi-core semiconductor device including N cores. The cores 2502 of the microprocessor 2500 may operate independently or may cooperate to execute machine readable instructions. For example, machine code corresponding to a firmware program, an embedded software program, or a software program may be executed by one of the cores 2502 or may be executed by multiple ones of the cores 2502 at the same or different times. In some examples, the machine code corresponding to the firmware program, the embedded software program, or the software program is split into threads and executed in parallel by two or more of the cores 2502. The software program may correspond to a portion or all of the machine readable instructions and/or operations represented by the flowcharts of FIGS. 13-23.

The cores 2502 may communicate by a first example bus 2504. In some examples, the first bus 2504 may be implemented by a communication bus to effectuate communication associated with one(s) of the cores 2502. For example, the first bus 2504 may be implemented by at least one of an Inter-Integrated Circuit (I2C) bus, a Serial Peripheral Interface (SPI) bus, a PCI bus, or a PCIe bus. Additionally or alternatively, the first bus 2504 may be implemented by any other type of computing or electrical bus. The cores 2502 may obtain data, instructions, and/or signals from one or more external devices by example interface circuitry 2506. The cores 2502 may output data, instructions, and/or signals to the one or more external devices by the interface circuitry 2506. Although the cores 2502 of this example include example local memory 2520 (e.g., Level 1 (L1) cache that may be split into an L1 data cache and an L1 instruction cache), the microprocessor 2500 also includes example shared memory 2510 that may be shared by the cores (e.g., Level 2 (L2 cache)) for high-speed access to data and/or instructions. Data and/or instructions may be transferred (e.g., shared) by writing to and/or reading from the shared memory 2510. The local memory 2520 of each of the cores 2502 and the shared memory 2510 may be part of a hierarchy of storage devices including multiple levels of cache memory and the main memory (e.g., the main memory 2414, 2416 of FIG. 24). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2502 may be referred to as a CPU, DSP, GPU, etc., or any other type of hardware circuitry. Each core 2502 includes control unit circuitry 2514, arithmetic and logic (AL) circuitry (sometimes referred to as an ALU) 2516, a plurality of registers 2518, the local memory 2520, and a second example bus 2522. Other structures may be present. For example, each core 2502 may include vector unit circuitry, single instruction multiple data (SIMD) unit circuitry, load/store unit (LSU) circuitry, branch/jump unit circuitry, floating-point unit (FPU) circuitry, etc. The control unit circuitry 2514 includes semiconductor-based circuits structured to control (e.g., coordinate) data movement within the corresponding core 2502. The AL circuitry 2516 includes semiconductor-based circuits structured to perform one or more mathematic and/or logic operations on the data within the corresponding core 2502. The AL circuitry 2516 of some examples performs integer based operations. In other examples, the AL circuitry 2516 also performs floating point operations. In yet other examples, the AL circuitry 2516 may include first AL circuitry that performs integer based operations and second AL circuitry that performs floating point operations. In some examples, the AL circuitry 2516 may be referred to as an Arithmetic Logic Unit (ALU). The registers 2518 are semiconductor-based structures to store data and/or instructions such as results of one or more of the operations performed by the AL circuitry 2516 of the corresponding core 2502. For example, the registers 2518 may include vector register(s), SIMD register(s), general purpose register(s), flag register(s), segment register(s), machine specific register(s), instruction pointer register(s), control register(s), debug register(s), memory management register(s), machine check register(s), etc. The registers 2518 may be arranged in a bank as shown in FIG. 25. Alternatively, the registers 2518 may be organized in any other arrangement, format, or structure including distributed throughout the core 2502 to shorten access time. The second bus 2522 may be implemented by at least one of an I2C bus, a SPI bus, a PCI bus, or a PCIe bus Each core 2502 and/or, more generally, the microprocessor 2500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 26:
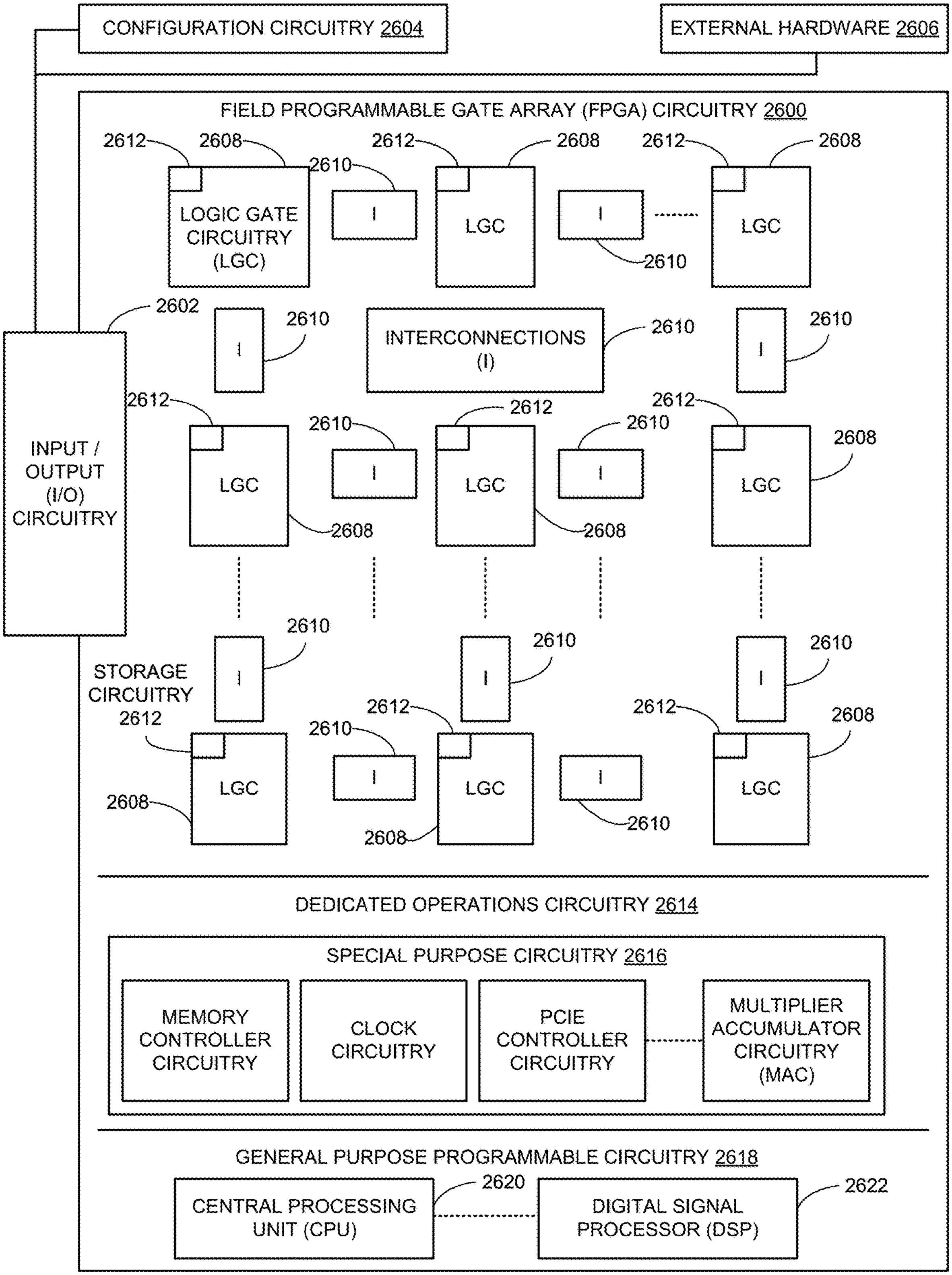
FIG. 26 is a block diagram of another example implementation of the processor circuitry of FIG. 24.

FIG. 26 is a block diagram of another example implementation of the processor circuitry 2412 of FIG. 24. In this example, the processor circuitry 2412 is implemented by FPGA circuitry 2600. For example, the FPGA circuitry 2600 may be implemented by an FPGA. The FPGA circuitry 2600 can be used, for example, to perform operations that could otherwise be performed by the example microprocessor 2500 of FIG. 25 executing corresponding machine readable instructions. However, once configured, the FPGA circuitry 2600 instantiates the machine readable instructions in hardware and, thus, can often execute the operations faster than they could be performed by a general purpose microprocessor executing the corresponding software.

More specifically, in contrast to the microprocessor 2500 of FIG. 25 described above (which is a general purpose device that may be programmed to execute some or all of the machine readable instructions represented by the flowcharts of FIGS. 13-23 but whose interconnections and logic circuitry are fixed once fabricated), the FPGA circuitry 2600 of the example of FIG. 26 includes interconnections and logic circuitry that may be configured and/or interconnected in different ways after fabrication to instantiate, for example, some or all of the machine readable instructions represented by the flowcharts of FIGS. 13-23. In particular, the FPGA circuitry 2600 may be thought of as an array of logic gates, interconnections, and switches. The switches can be programmed to change how the logic gates are interconnected by the interconnections, effectively forming one or more dedicated logic circuits (unless and until the FPGA circuitry 2600 is reprogrammed). The configured logic circuits enable the logic gates to cooperate in different ways to perform different operations on data received by input circuitry. Those operations may correspond to some or all of the software represented by the flowcharts of FIGS. 13-23. As such, the FPGA circuitry 2600 may be structured to effectively instantiate some or all of the machine readable instructions of the flowcharts of FIGS. 13-23 as dedicated logic circuits to perform the operations corresponding to those software instructions in a dedicated manner analogous to an ASIC. Therefore, the FPGA circuitry 2600 may perform the operations corresponding to the some or all of the machine readable instructions of FIGS. 13-23 faster than the general purpose microprocessor can execute the same.

In the example of FIG. 26, the FPGA circuitry 2600 is structured to be programmed (and/or reprogrammed one or more times) by an end user by a hardware description language (HDL) such as Verilog. The FPGA circuitry 2600 of FIG. 26, includes example input/output (I/O) circuitry 2602 to obtain and/or output data to/from example configuration circuitry 2604 and/or external hardware 2606. For example, the configuration circuitry 2604 may be implemented by interface circuitry that may obtain machine readable instructions to configure the FPGA circuitry 2600, or portion(s) thereof. In some such examples, the configuration circuitry 2604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2606 may be implemented by external hardware circuitry. For example, the external hardware 2606 may be implemented by the microprocessor 2500 of FIG. 25. The FPGA circuitry 2600 also includes an array of example logic gate circuitry 2608, a plurality of example configurable interconnections 2610, and example storage circuitry 2612. The logic gate circuitry 2608 and the configurable interconnections 2610 are configurable to instantiate one or more operations that may correspond to at least some of the machine readable instructions of FIGS. 13-23 and/or other desired operations. The logic gate circuitry 2608 shown in FIG. 26 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2608 to enable configuration of the electrical structures and/or the logic gates to form circuits to perform desired operations. The logic gate circuitry 2608 may include other electrical structures such as look-up tables (LUTs), registers (e.g., flip-flops or latches), multiplexers, etc.

The configurable interconnections 2610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2608 to program desired logic circuits.

The storage circuitry 2612 of the illustrated example is structured to store result(s) of the one or more of the operations performed by corresponding logic gates. The storage circuitry 2612 may be implemented by registers or the like. In the illustrated example, the storage circuitry 2612 is distributed amongst the logic gate circuitry 2608 to facilitate access and increase execution speed.

The example FPGA circuitry 2600 of FIG. 26 also includes example Dedicated Operations Circuitry 2614. In this example, the Dedicated Operations Circuitry 2614 includes special purpose circuitry 2616 that may be invoked to implement commonly used functions to avoid the need to program those functions in the field. Examples of such special purpose circuitry 2616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2600 may also include example general purpose programmable circuitry 2618 such as an example CPU 2620 and/or an example DSP 2622. Other general purpose programmable circuitry 2618 may additionally or alternatively be present such as a GPU, an XPU, etc., that can be programmed to perform other operations.

Although FIGS. 25 and 26 illustrate two example implementations of the processor circuitry 2412 of FIG. 24, many other approaches are contemplated. For example, as mentioned above, modern FPGA circuitry may include an on-board CPU, such as one or more of the example CPU 2620 of FIG. 26. Therefore, the processor circuitry 2412 of FIG. 24 may additionally be implemented by combining the example microprocessor 2500 of FIG. 25 and the example FPGA circuitry 2600 of FIG. 26. In some such hybrid examples, a first portion of the machine readable instructions represented by the flowcharts of FIGS. 13-23 may be executed by one or more of the cores 2502 of FIG. 25, a second portion of the machine readable instructions represented by the flowcharts of FIGS. 13-23 may be executed by the FPGA circuitry 2600 of FIG. 26, and/or a third portion of the machine readable instructions represented by the flowcharts of FIGS. 13-23 may be executed by an ASIC. It should be understood that some or all of the circuitry of FIG. 11 may, thus, be instantiated at the same or different times. Some or all of the circuitry may be instantiated, for example, in one or more threads executing concurrently and/or in series. Moreover, in some examples, some or all of the circuitry of FIG. 11 may be implemented within one or more virtual machines and/or containers executing on the microprocessor.

In some examples, the processor circuitry 2412 of FIG. 24 may be in one or more packages. For example, the microprocessor 2500 of FIG. 25 and/or the FPGA circuitry 2600 of FIG. 26 may be in one or more packages. In some examples, an XPU may be implemented by the processor circuitry 2412 of FIG. 24, which may be in one or more packages. For example, the XPU may include a CPU in one package, a DSP in another package, a GPU in yet another package, and an FPGA in still yet another package.

Figure 27:
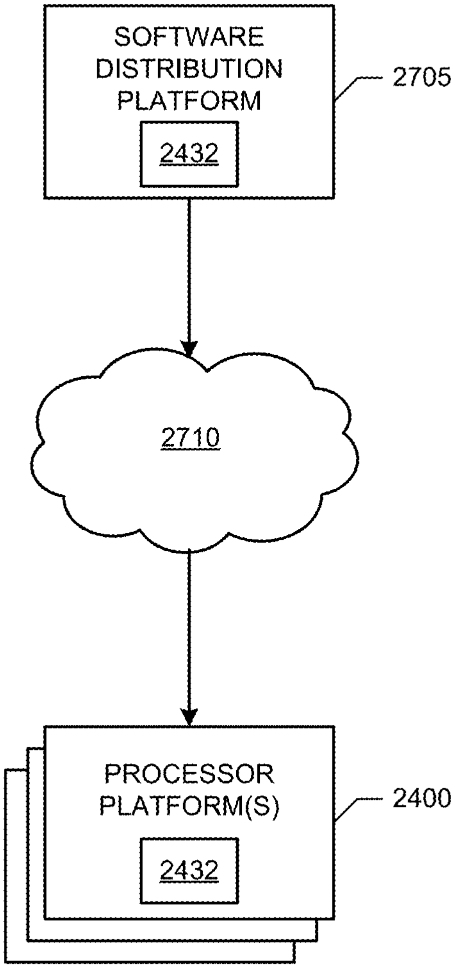
FIG. 27 is a block diagram of an example software distribution platform (e.g., one or more servers) to distribute software (e.g., software corresponding to the example machine readable instructions of FIGS. 13-23) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2705 to distribute software such as the example machine readable instructions 2432 of FIG. 24 to hardware devices owned and/or operated by third parties is illustrated in FIG. 27. The example software distribution platform 2705 may be implemented by any computer server, data facility, cloud service, etc., capable of storing and transmitting software to other computing devices. The third parties may be customers of the entity owning and/or operating the software distribution platform 2705. For example, the entity that owns and/or operates the software distribution platform 2705 may be a developer, a seller, and/or a licensor of software such as the example machine readable instructions 2432 of FIG. 24. The third parties may be consumers, users, retailers, OEMs, etc., who purchase and/or license the software for use and/or re-sale and/or sub-licensing. In the illustrated example, the software distribution platform 2705 includes one or more servers and one or more storage devices. The storage devices store the machine readable instructions 2432, which may correspond to the example machine readable instructions of FIGS. 13-23, as described above. The one or more servers of the example software distribution platform 2705 are in communication with an example network 2710, which may correspond to any one or more of the Internet and/or any of the example networks 2426 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2432 from the software distribution platform 2705. For example, the software, which may correspond to the example machine readable instructions of FIGS. 13-23, may be downloaded to the example processor platform 2400, which is to execute the machine readable instructions 2432 to implement the controller 116. In some examples, one or more servers of the software distribution platform 2705 periodically offer, transmit, and/or force updates to the software (e.g., the example machine readable instructions 2432 of FIG. 24) to ensure improvements, patches, updates, etc., are distributed and applied to the software at the end user devices.

From the foregoing, it will be appreciated that example methods, apparatus and articles of manufacture have been disclosed that combine feedback data from existing sensors associated with door systems and/or new/additional sensors to gain insights about the operational state of the door system, to gain insights about the conditions of the surrounding environment, and/or to facilitate adjustments to the operations of the door system in a manner that can improve efficiency, increase safety, and/or reduce wear and/or damage to the components of the door system. The disclosed methods, apparatus and articles of manufacture are accordingly directed to one or more practical applications of technological improvement(s) to the functioning of a door system.

Further examples and combinations thereof include the following:

Example 1 includes an apparatus comprising at least one memory, instructions, and processor circuitry to execute the instructions to monitor a position of a door panel associated with a door system, detect when a beam from a photo-eye sensor associated with the door system is in an unexpected non-triggered state based on the position of the door panel, and generate an alert or notification indicating a significance of the beam in the unexpected non-triggered state.

Example 2 includes the apparatus of example 1, wherein the processor circuitry is to determine that the significance of the beam in the unexpected non-triggered state corresponds to a missing tab on a lateral edge of the door panel.

Example 3 includes the apparatus of example 2, wherein the beam is in the unexpected non-triggered state when the beam passes through a hole in the door panel, the hole corresponding to a location of the tab on the door panel before going missing.

Example 4 includes the apparatus of example 3, wherein the processor circuitry is to determine that the significance of the beam in the unexpected non-triggered state corresponds to the missing tab when the beam is in the unexpected non-triggered state for at least one of less than a threshold period of time or a threshold distance of movement of the door panel, the threshold period of time corresponding to a duration for the hole to cross a path of the beam, the threshold distance corresponding to a width of the hole.

Example 5 includes the apparatus of example 1, wherein the processor circuitry is to determine that the significance of the beam in the unexpected non-triggered state corresponds to a missing corner seal on a lower corner of the door panel.

Example 6 includes the apparatus of example 5, wherein the processor circuitry is to determine that the significance of the beam in the unexpected non-triggered state corresponds to the missing corner seal when the beam is detected as unbroken by the door panel when a leading edge of the door panel is within a threshold distance of the photo-eye sensor.

Example 7 includes the apparatus of example 1, wherein the processor circuitry is to determine that the significance of the beam in the unexpected non-triggered state corresponds to a lateral edge of the door panel being dislodged from a track.

Example 8 includes an apparatus comprising sensor feedback analysis circuitry to monitor a position of a door panel associated with a door system, and detect when a beam from a photo-eye sensor associated with the door system is in an unexpected non-triggered state based on the position of the door panel, and operations control circuitry to generate an alert or notification indicating a significance of the beam in the unexpected non-triggered state.

Example 9 includes the apparatus of example 8, wherein the sensor feedback analysis circuitry is to determine that the significance of the beam in the unexpected non-triggered state corresponds to a missing tab on a lateral edge of the door panel.

Example 10 includes the apparatus of example 9, wherein the beam is in the unexpected non-triggered state when the beam passes through a hole in the door panel, the hole corresponding to a location of the tab on the door panel before going missing.

Example 11 includes the apparatus of example 10, wherein the sensor feedback analysis circuitry is to determine that the significance of the beam in the unexpected non-triggered state corresponds to the missing tab when the beam is in the unexpected non-triggered state for at least one of less than a threshold period of time or a threshold distance of movement of the door panel, the threshold period of time corresponding to a duration for the hole to cross a path of the beam, the threshold distance corresponding to a width of the hole.

Example 12 includes the apparatus of example 8, wherein the sensor feedback analysis circuitry is to determine that the significance of the beam in the unexpected non-triggered state corresponds to a missing corner seal on a lower corner of the door panel.

Example 13 includes the apparatus of example 12, wherein the sensor feedback analysis circuitry is to determine that the significance of the beam in the unexpected non-triggered state corresponds to the missing corner seal when the beam is detected as unbroken by the door panel when a leading edge of the door panel is within a threshold distance of the photo-eye sensor.

Example 14 includes the apparatus of example 8, wherein the sensor feedback analysis circuitry is to determine that the significance of the beam in the unexpected non-triggered state corresponds to a lateral edge of the door panel being dislodged from a track.

Example 15 includes a non-transitory computer readable medium comprising instructions that, when executed, cause a machine to at least monitor a position of a door panel associated with a door system, detect when a beam from a photo-eye sensor associated with the door system is in an unexpected non-triggered state based on the position of the door panel, and operations control circuitry to generate an alert or notification indicating a significance of the beam in the unexpected non-triggered state.

Example 16 includes the non-transitory computer readable medium of example 15, wherein the instructions cause the machine to determine that the significance of the beam in the unexpected non-triggered state corresponds to a missing tab on a lateral edge of the door panel.

Example 17 includes the non-transitory computer readable medium of example 16, wherein the beam is in the unexpected non-triggered state when the beam passes through a hole in the door panel, the hole corresponding to a location of the tab on the door panel before going missing.

Example 18 includes the non-transitory computer readable medium of example 17, wherein the instructions cause the machine to determine that the significance of the beam in the unexpected non-triggered state corresponds to the missing tab when the beam is in the unexpected non-triggered state for at least one of less than a threshold period of time or a threshold distance of movement of the door panel, the threshold period of time corresponding to a duration for the hole to cross a path of the beam, the threshold distance corresponding to a width of the hole.

Example 19 includes the non-transitory computer readable medium of example 15, wherein the instructions cause the machine to determine that the significance of the beam in the unexpected non-triggered state corresponds to a missing corner seal on a lower corner of the door panel.

Example 20 includes the non-transitory computer readable medium of example 19, wherein the instructions cause the machine to determine that the significance of the beam in the unexpected non-triggered state corresponds to the missing corner seal when the beam is detected as unbroken by the door panel when a leading edge of the door panel is within a threshold distance of the photo-eye sensor.

Example 21 includes the non-transitory computer readable medium of example 15, wherein the instructions cause the machine to determine that the significance of the beam in the unexpected non-triggered state corresponds to a lateral edge of the door panel being dislodged from a track.

Example 22 includes a method comprising monitoring a position of a door panel associated with a door system, detecting when a beam from a photo-eye sensor associated with the door system is in an unexpected non-triggered state based on the position of the door panel, and generating an alert or notification indicating a significance of the beam in the unexpected non-triggered state.

Example 23 includes the method of example 22, wherein the method includes determining that the significance of the beam in the unexpected non-triggered state corresponds to a missing tab on a lateral edge of the door panel.

Example 24 includes the method of example 23, wherein the beam is in the unexpected non-triggered state when the beam passes through a hole in the door panel, the hole corresponding to a location of the tab on the door panel before going missing.

Example 25 includes the method of example 24, wherein the method includes determining that the significance of the beam in the unexpected non-triggered state corresponds to the missing tab when the beam is in the unexpected non-triggered state for at least one of less than a threshold period of time or a threshold distance of movement of the door panel, the threshold period of time corresponding to a duration for the hole to cross a path of the beam, the threshold distance corresponding to a width of the hole.

Example 26 includes the method of example 22, wherein the method includes determining that the significance of the beam in the unexpected non-triggered state corresponds to a missing corner seal on a lower corner of the door panel.

Example 27 includes the method of example 26, wherein the method includes determining that the significance of the beam in the unexpected non-triggered state corresponds to the missing corner seal when the beam is detected as unbroken by the door panel when a leading edge of the door panel is within a threshold distance of the photo-eye sensor.

Example 28 includes the method of example 22, wherein the method includes determining that the significance of the beam in the unexpected non-triggered state corresponds to a lateral edge of the door panel being dislodged from a track.

Example 29 includes an apparatus comprising sensor feedback analysis circuitry to analyze sensor feedback data from sensors associated with a door system, and operations adjustment analysis circuitry to determine an adjustment to be made to a first sensor of the sensors based on the analysis of the sensor feedback data.

Example 30 includes the apparatus of example 29, further including operations control circuitry to generate an alert or notification recommending a human implement the adjustment.

Example 31 includes the apparatus of example 29, further including operations control circuitry to automatically implement the adjustment to the first sensor.

Example 32 includes the apparatus of example 29, wherein the sensors include a door activation sensor and a breakaway sensor, the door activation sensor to trigger activation of a door of the door system, the breakaway sensor to detect a breakaway event indicative of when a panel of the door system breaks away from a track to guide a lateral edge of the panel.

Example 33 includes the apparatus of example 32, wherein the operations adjustment analysis circuitry is to determine whether the adjustment is to be made based a number of breakaway events detected by the breakaway sensor over a given period of time.

Example 34 includes the apparatus of example 33, wherein the operations adjustment analysis circuitry is to compare the number of breakaway events to a threshold to determine whether the adjustment is to be made.

Example 35 includes the apparatus of example 33, wherein the operations adjustment analysis circuitry is to determine a ratio of the number of breakaway events to a total number of activation cycles of the door during the given period of time, and compare the ratio to a threshold to determine whether the adjustment is to be made.

Example 36 includes the apparatus of example 29, wherein the sensors include a door activation sensor and a photo-eye sensor, the door activation sensor to trigger activation of a door of the door system, the photo-eye sensor to detect traffic passing through a doorway associated with the door system.

Example 37 includes the apparatus of example 36, wherein the operations adjustment analysis circuitry is to determine whether the adjustment is to be made based on a time between the activation of the door and a tripping of the photo-eye sensor.

Example 38 includes the apparatus of example 36, wherein the operations adjustment analysis circuitry is to determine whether the adjustment is to be made based on a frequency that the photo-eye sensor does not detect traffic passing through the doorway while the door is open in response to being activated by the door activation sensor.

Example 39 includes the apparatus of example 36, wherein the operations adjustment analysis circuitry is to adjust a reclose timer for the door based on a duration between a first time when the sensor feedback data from the photo-eye sensor indicating the traffic has cleared the doorway and a second time when the door begins closing.

Example 40 includes the apparatus of example 36, wherein the photo-eye sensor is a first photo-eye sensor, the sensors including a second photo-eye sensor, the sensor feedback analysis circuitry to determine at least one of a direction of traffic or a speed of traffic based on a difference in timing of the first photo-eye sensor being tripped relative to the second photo-eye sensor being tripped.

Example 41 includes the apparatus of example 36, wherein the photo-eye sensor is a first photo-eye sensor, the sensors including a second photo-eye sensor, the first photo-eye sensor to be positioned proximate a base of the door system, the second photo-eye sensor to be positioned at an elevated position, the sensor feedback analysis circuitry to designate detected traffic as either pedestrian traffic or vehicular traffic based on the sensor feedback data from the first and second photo-eye sensors.

Example 42 includes the apparatus of example 29, wherein the sensors include a second sensor to emit a beam at an angle relative to a door panel in a closed position across a doorway of the door system, the sensor feedback analysis circuitry to determine at least one of a speed, a height, or a width of an object approaching the doorway based on a distance from the second sensor at which the object crosses the beam, the apparatus further including operations control circuitry to adjust a movement of the door panel based on the at least one of the speed, the height, or the width of the object.

Example 43 includes the apparatus of example 42, wherein the operations control circuitry is to adjust a position of the door panel in response to a change in at least one of the height or the width of the object.

Example 44 includes the apparatus of example 42, wherein the operations control circuitry is to adjust a speed of the door panel based on the speed of the object.

Example 45 includes the apparatus of example 29, wherein the sensors include a current sensor to measure a current used by a motor to move a door panel associated with the door system, the sensor feedback analysis circuitry to generate a profile of the current used by the motor at a first point in time, and compare the profile to the current used by the motor at a second point in time after the first point in time, the apparatus further including operations control circuitry to generate an alert or notification indicating potential wear to a seal associated with the door panel.

Example 46 includes an apparatus comprising at least one memory, instructions, and processor circuitry to execute the instructions to analyze sensor feedback data from sensors associated with a door system, and determine an adjustment to be made to a first sensor of the sensors based on the analysis of the sensor feedback data.

Example 47 includes the apparatus of example 46, wherein the processor circuitry is to generate an alert or notification recommending a human implement the adjustment.

Example 48 includes the apparatus of example 46, wherein the processor circuitry is to automatically implement the adjustment to the first sensor.

Example 49 includes the apparatus of example 46, wherein the sensors include a door activation sensor and a breakaway sensor, the door activation sensor to trigger activation of a door of the door system, the breakaway sensor to detect a breakaway event indicative of when a panel of the door system breaks away from a track to guide a lateral edge of the panel.

Example 50 includes the apparatus of example 49, wherein the processor circuitry is to determine whether the adjustment is to be made based a number of breakaway events detected by the breakaway sensor over a given period of time.

Example 51 includes the apparatus of example 50, wherein the processor circuitry is to compare the number of breakaway events to a threshold to determine whether the adjustment is to be made.

Example 52 includes the apparatus of example 50, wherein the processor circuitry is to determine a ratio of the number of breakaway events to a total number of activation cycles of the door during the given period of time, and compare the ratio to a threshold to determine whether the adjustment is to be made.

Example 53 includes the apparatus of example 46, wherein the sensors include a door activation sensor and a photo-eye sensor, the door activation sensor to trigger activation of a door of the door system, the photo-eye sensor to detect traffic passing through a doorway associated with the door system.

Example 54 includes the apparatus of example 53, wherein the processor circuitry is to determine whether the adjustment is to be made based on a time between the activation of the door and a tripping of the photo-eye sensor.

Example 55 includes the apparatus of example 53, wherein the processor circuitry is to determine whether the adjustment is to be made based on a frequency that the photo-eye sensor does not detect traffic passing through the doorway while the door is open in response to being activated by the door activation sensor.

Example 56 includes the apparatus of example 53, wherein the processor circuitry is to adjust a reclose timer for the door based on a duration between a first time when the sensor feedback data from the photo-eye sensor indicating the traffic has cleared the doorway and a second time when the door begins closing.

Example 57 includes the apparatus of example 53, wherein the photo-eye sensor is a first photo-eye sensor, the sensors including a second photo-eye sensor, the processor circuitry to determine at least one of a direction of traffic or a speed of traffic based on a difference in timing of the first photo-eye sensor being tripped relative to the second photo-eye sensor being tripped.

Example 58 includes the apparatus of example 53, wherein the photo-eye sensor is a first photo-eye sensor, the sensors including a second photo-eye sensor, the first photo-eye sensor to be positioned proximate a base of the door system, the second photo-eye sensor to be positioned at an elevated position, the processor circuitry to designate detected traffic as either pedestrian traffic or vehicular traffic based on the sensor feedback data from the first and second photo-eye sensors.

Example 59 includes the apparatus of example 46, wherein the sensors include a second sensor to emit a beam at an angle relative to a door panel in a closed position across a doorway of the door system, the processor circuitry to determine at least one of a speed, a height, or a width of an object approaching the doorway based on a distance from the second sensor at which the object crosses the beam, and adjust movement of the door panel based on the at least one of the speed, the height, or the width of the object.

Example 60 includes the apparatus of example 59, wherein the processor circuitry is to adjust a position of the door panel in response to a change in at least one of the height or the width of the object.

Example 61 includes the apparatus of example 59, wherein the processor circuitry is to adjust a speed of the door panel based on the speed of the object.

Example 62 includes the apparatus of example 46, wherein the sensors include a current sensor to measure a current used by a motor to move a door panel associated with the door system, the processor circuitry to generate a profile of the current used by the motor at a first point in time, compare the profile to the current used by the motor at a second point in time after the first point in time, and generate an alert or notification indicating potential wear to a seal associated with the door panel.

Example 63 includes a non-transitory computer readable medium comprising instructions that, when executed, cause a machine to at least analyze sensor feedback data from sensors associated with a door system, and determine an adjustment to be made to a first sensor of the sensors based on the analysis of the sensor feedback data.

Example 64 includes the non-transitory computer readable medium of example 63, wherein the instructions cause the machine to generate an alert or notification recommending a human implement the adjustment.

Example 65 includes the non-transitory computer readable medium of example 63, wherein the instructions cause the machine to automatically implement the adjustment to the first sensor.

Example 66 includes the non-transitory computer readable medium of example 63, wherein the sensors include a door activation sensor and a breakaway sensor, the door activation sensor to trigger activation of a door of the door system, the breakaway sensor to detect a breakaway event indicative of when a panel of the door system breaks away from a track to guide a lateral edge of the panel.

Example 67 includes the non-transitory computer readable medium of example 66, wherein the instructions cause the machine to determine whether the adjustment is to be made based a number of breakaway events detected by the breakaway sensor over a given period of time.

Example 68 includes the non-transitory computer readable medium of example 67, wherein the instructions cause the machine to compare the number of breakaway events to a threshold to determine whether the adjustment is to be made.

Example 69 includes the non-transitory computer readable medium of example 67, wherein the instructions cause the machine to determine a ratio of the number of breakaway events to a total number of activation cycles of the door during the given period of time, and compare the ratio to a threshold to determine whether the adjustment is to be made.

Example 70 includes the non-transitory computer readable medium of example 63, wherein the sensors include a door activation sensor and a photo-eye sensor, the door activation sensor to trigger activation of a door of the door system, the photo-eye sensor to detect traffic passing through a doorway associated with the door system.

Example 71 includes the non-transitory computer readable medium of example 70, wherein the instructions cause the machine to determine whether the adjustment is to be made based on a time between the activation of the door and a tripping of the photo-eye sensor.

Example 72 includes the non-transitory computer readable medium of example 70, wherein the instructions cause the machine to determine whether the adjustment is to be made based on a frequency that the photo-eye sensor does not detect traffic passing through the doorway while the door is open in response to being activated by the door activation sensor.

Example 73 includes the non-transitory computer readable medium of example 70, wherein the instructions cause the machine to adjust a reclose timer for the door based on a duration between a first time when the sensor feedback data from the photo-eye sensor indicating the traffic has cleared the doorway and a second time when the door begins closing.

Example 74 includes the non-transitory computer readable medium of example 70, wherein the photo-eye sensor is a first photo-eye sensor, the sensors including a second photo-eye sensor, the instructions to cause the machine to determine at least one of a direction of traffic or a speed of traffic based on a difference in timing of the first photo-eye sensor being tripped relative to the second photo-eye sensor being tripped.

Example 75 includes the non-transitory computer readable medium of example 70, wherein the photo-eye sensor is a first photo-eye sensor, the sensors including a second photo-eye sensor, the first photo-eye sensor to be positioned proximate a base of the door system, the second photo-eye sensor to be positioned at an elevated position, the instructions to cause the machine to designate detected traffic as either pedestrian traffic or vehicular traffic based on the sensor feedback data from the first and second photo-eye sensors.

Example 76 includes the non-transitory computer readable medium of example 63, wherein the sensors include a second sensor to emit a beam at an angle relative to a door panel in a closed position across a doorway of the door system, the instructions to cause the machine to determine at least one of a speed, a height, or a width of an object approaching the doorway based on a distance from the second sensor at which the object crosses the beam, and adjust a movement of the door panel based on the at least one of the speed, the height, or the width of the object.

Example 77 includes the non-transitory computer readable medium of example 76, wherein the instructions cause the machine to adjust a position of the door panel in response to a change in at least one of the height or the width of the object.

Example 78 includes the non-transitory computer readable medium of example 76, wherein the instructions cause the machine to adjust a speed of the door panel based on the speed of the object.

Example 79 includes the non-transitory computer readable medium of example 63, wherein the sensors include a current sensor to measure a current used by a motor to move a door panel associated with the door system, the instructions to cause the machine to generate a profile of the current used by the motor at a first point in time, compare the profile to the current used by the motor at a second point in time after the first point in time, and generate an alert or notification indicating potential wear to a seal associated with the door panel.

Example 80 includes a method comprising analyzing, by executing an instruction with at least one processor, sensor feedback data from sensors associated with a door system, and determining, by executing an instruction with the at least one processor, an adjustment to be made to a first sensor of the sensors based on the analysis of the sensor feedback data.

Example 81 includes the method of example 80, further including generating an alert or notification recommending a human implement the adjustment.

Example 82 includes the method of example 80, further including automatically implementing the adjustment to the first sensor.

Example 83 includes the method of example 80, wherein the sensors include a door activation sensor and a breakaway sensor, the door activation sensor to trigger activation of a door of the door system, the breakaway sensor to detect a breakaway event indicative of when a panel of the door system breaks away from a track to guide a lateral edge of the panel.

Example 84 includes the method of example 83, further including determining whether the adjustment is to be made based a number of breakaway events detected by the breakaway sensor over a given period of time.

Example 85 includes the method of example 84, further including comparing the number of breakaway events to a threshold to determine whether the adjustment is to be made.

Example 86 includes the method of example 84, further including determining a ratio of the number of breakaway events to a total number of activation cycles of the door during the given period of time, and comparing the ratio to a threshold to determine whether the adjustment is to be made.

Example 87 includes the method of example 80, wherein the sensors include a door activation sensor and a photo-eye sensor, the door activation sensor to trigger activation of a door of the door system, the photo-eye sensor to detect traffic passing through a doorway associated with the door system.

Example 88 includes the method of example 87, further including determining whether the adjustment is to be made based on a time between the activation of the door and a tripping of the photo-eye sensor.

Example 89 includes the method of example 87, further including determining whether the adjustment is to be made based on a frequency that the photo-eye sensor does not detect traffic passing through the doorway while the door is open in response to being activated by the door activation sensor.

Example 90 includes the method of example 87, further including adjusting a reclose timer for the door based on a duration between a first time when the sensor feedback data from the photo-eye sensor indicating the traffic has cleared the doorway and a second time when the door begins closing.

Example 91 includes the method of example 87, wherein the photo-eye sensor is a first photo-eye sensor, the sensors including a second photo-eye sensor, the method further including determining at least one of a direction of traffic or a speed of traffic based on a difference in timing of the first photo-eye sensor being tripped relative to the second photo-eye sensor being tripped.

Example 92 includes the method of example 87, wherein the photo-eye sensor is a first photo-eye sensor, the sensors including a second photo-eye sensor, the first photo-eye sensor to be positioned proximate a base of the door system, the second photo-eye sensor to be positioned at an elevated position, the method further including designating detected traffic as either pedestrian traffic or vehicular traffic based on the sensor feedback data from the first and second photo-eye sensors.

Example 93 includes the method of example 80, wherein the sensors include a second sensor to emit a beam at an angle relative to a door panel in a closed position across a doorway of the door system, the method further including determining at least one of a speed, a height, or a width of an object approaching the doorway based on a distance from the second sensor at which the object crosses the beam, and adjusting a movement of the door panel based on the at least one of the speed, the height, or the width of the object.

Example 94 includes the method of example 93, wherein the adjusting of the movement includes adjusting a position of the door panel in response to a change in at least one of the height or the width of the object.

Example 95 includes the method of example 93, wherein the adjusting of the movement includes adjusting a speed of the door panel based on the speed of the object.

Example 96 includes the method of example 80, wherein the sensors include a current sensor to measure a current used by a motor to move a door panel associated with the door system, the method further including generating a profile of the current used by the motor at a first point in time, comparing the profile to the current used by the motor at a second point in time after the first point in time, and generating an alert or notification indicating potential wear to a seal associated with the door panel.

Example 97 includes an apparatus comprising at least one memory, instructions, and processor circuitry to execute the instructions to actuate a brake to apply a force that resists movement of a door panel associated with a door system, cause at least one of a threshold torque or a threshold speed to be used to drive a motor used to move the door panel, the at least one of the threshold torque or the threshold speed used while the brake is actuated, monitor movement of the door panel, and in response to detection of movement of the door panel while the brake is actuated, generate an alert or notification indicating at least one of potential brake wear or potential brake failure.

Example 98 includes the apparatus of example 97, wherein the at least one of the threshold torque or the threshold speed is insufficient to cause movement of the door panel when the brake has not been worn and is working properly.

Example 99 includes the apparatus of example 97, wherein the processor circuitry is to test the brake at every open cycle of the door panel.

Example 100 includes the apparatus of example 97, wherein the processor circuitry is to test the brake at intervals defined by a threshold number of open cycles of the door panel.

Example 101 includes the apparatus of example 97, wherein the processor circuitry is to test the brake at intervals defined by a threshold period of time.

Example 102 includes the apparatus of example 97, wherein the processor circuitry is to test the brake when the brake is initially setup with the door system, and determine the at least one of the threshold torque or the threshold speed based on a result of the test.

Example 103 includes an apparatus comprising operations control circuitry to actuate a brake to apply a force that resists movement of a door panel associated with a door system, cause at least one of a threshold torque or a threshold speed to be used to drive a motor used to move the door panel, the at least one of the threshold torque or the threshold speed used while the brake is actuated, and sensor feedback analysis circuitry to monitor movement of the door panel, the operations control circuitry to, in response to detection of movement of the door panel while the brake is actuated, generate an alert or notification indicating at least one of potential brake wear or potential brake failure.

Example 104 includes the apparatus of example 103, wherein the at least one of the threshold torque or the threshold speed is insufficient to overcome the force of the brake when the brake has not been worn and is working properly.

Example 105 includes the apparatus of example 103, wherein the operations control circuitry is to test the brake at every open cycle of the door panel.

Example 106 includes the apparatus of example 103, wherein the operations control circuitry is to test the brake at intervals defined by a threshold number of open cycles of the door panel.

Example 107 includes the apparatus of example 103, wherein the operations control circuitry is to test the brake at intervals defined by a threshold period of time.

Example 108 includes the apparatus of example 103, wherein the operations control circuitry is to test the brake when the brake is initially setup with the door system, and determine the at least one of the threshold torque or the threshold speed based on a result of the test.

Example 109 includes a non-transitory computer readable medium comprising instructions that, when executed, cause processor circuitry to at least actuate a brake to apply a force that resists movement of a door panel associated with a door system, cause at least one of a threshold torque or a threshold speed to be used to drive a motor used to move the door panel, the at least one of the threshold torque or the threshold speed used while the brake is actuated, monitor movement of the door panel, and in response to detection of movement of the door panel while the brake is actuated, generate an alert or notification indicating at least one of potential brake wear or potential brake failure.

Example 110 includes the non-transitory computer readable medium of example 109, wherein the at least one of the threshold torque or the threshold speed is insufficient to cause movement of the door panel when the brake has not been worn and is working properly.

Example 111 includes the non-transitory computer readable medium of example 109, wherein the instructions are to cause the processor circuitry to test the brake at every open cycle of the door panel.

Example 112 includes the non-transitory computer readable medium of example 109, wherein the instructions are to cause the processor circuitry to test the brake at intervals defined by a threshold number of open cycles of the door panel.

Example 113 includes the non-transitory computer readable medium of example 109, wherein the instructions are to cause the processor circuitry to test the brake at intervals defined by a threshold period of time.

Example 114 includes the non-transitory computer readable medium of example 109, wherein the instructions are to cause the processor circuitry to test the brake when the brake is initially setup with the door system, and determine the at least one of the threshold torque or the threshold speed based on a result of the test.

Example 115 includes a method comprising actuating a brake to apply a force that resists movement of a door panel associated with a door system, causing at least one of a threshold torque or a threshold speed to be used to drive a motor used to move the door panel, the at least one of the threshold torque or the threshold speed used while the brake is actuated, monitoring, by executing an instruction with processor circuitry, movement of the door panel, and in response to detection of movement of the door panel while the brake is actuated, generating, by executing an instruction with processor circuitry, an alert or notification indicating at least one of potential brake wear or potential brake failure.

Example 116 includes the method of example 115, wherein the at least one of the threshold torque or the threshold speed is insufficient to cause movement of the door panel when the brake has not been worn and is working properly.

Example 117 includes the method of example 115, further including testing the brake at every open cycle of the door panel.

Example 118 includes the method of example 115, further including testing the brake at intervals defined by a threshold number of open cycles of the door panel.

Example 119 includes the method of example 115, further including testing the brake at intervals defined by a threshold period of time.

Example 120 includes the method of example 115, further including testing the brake when the brake is initially setup with the door system, and determining the at least one of the threshold torque or the threshold speed based on a result of the test.

Example 121 includes an apparatus comprising at least one memory, instructions, and processor circuitry to execute the instructions to monitor movement of a door panel associated with a door system when the door panel is to be held in an open position, in response to detection of movement of the door panel when the door panel is to be held in the open position, activate a motor used to drive the door panel, control the door panel to a closed position, and lock the door system.

Example 122 includes the apparatus of example 121, wherein the processor circuitry is to place the door system into a fault state.

Example 123 includes the apparatus of example 121, wherein the processor circuitry is to generate an alert or notification indicating a potential brake failure.

Example 124 includes the apparatus of example 121, wherein, in response to detection of movement of the door panel, the processor circuitry is to activate the motor in a direction that drives the door panel towards the open position.

Example 125 includes the apparatus of example 124, wherein the processor circuitry is to control the door panel to the open position before controlling the door panel to the closed position.

Example 126 includes the apparatus of example 121, wherein, in response to detection of movement of the door panel, the processor circuitry is to activate the motor in a direction that drives the door panel towards the closed position.

Example 127 includes an apparatus comprising sensor feedback analysis circuitry to monitor movement of a door panel associated with a door system when the door panel is to be held in an open position, and operations control circuitry to in response to detection of movement of the door panel when the door panel is to be held in the open position, activate a motor used to drive the door panel, control the door panel to a closed position, and lock the door system.

Example 128 includes the apparatus of example 127, wherein the operations control circuitry is to place the door system into a fault state.

Example 129 includes the apparatus of example 127, wherein the operations control circuitry is to generate an alert or notification indicating a potential brake failure.

Example 130 includes the apparatus of example 127, wherein, in response to detection of movement of the door panel, the operations control circuitry is to activate the motor in a direction that drives the door panel towards the open position.

Example 131 includes the apparatus of example 130, wherein the operations control circuitry is to control the door panel to the open position before controlling the door panel to the closed position.

Example 132 includes the apparatus of example 127, wherein, in response to detection of movement of the door panel, the operations control circuitry is to activate the motor in a direction that drives the door panel towards the closed position.

Example 133 includes a non-transitory computer readable medium comprising instructions that, when executed, cause processor circuitry to at least comprising monitor movement of a door panel associated with a door system when the door panel is to be held in an open position, in response to detection of movement of the door panel when the door panel is to be held in the open position, activate a motor used to drive the door panel, control the door panel to a closed position, and lock the door system.

Example 134 includes the non-transitory computer readable medium of example 133, wherein the instructions cause the processor circuitry to place the door system into a fault state.

Example 135 includes the non-transitory computer readable medium of example 133, wherein the instructions cause the processor circuitry to generate an alert or notification indicating a potential brake failure.

Example 136 includes the non-transitory computer readable medium of example 133, wherein, in response to detection of movement of the door panel, the instructions cause the processor circuitry to activate the motor in a direction that drives the door panel towards the open position.

Example 137 includes the non-transitory computer readable medium of example 136, wherein the instructions cause the processor circuitry to control the door panel to the open position before controlling the door panel to the closed position.

Example 138 includes the non-transitory computer readable medium of example 133, wherein, in response to detection of movement of the door panel, the instructions cause the processor circuitry to activate the motor in a direction that drives the door panel towards the closed position.

Example 139 includes a method comprising monitoring movement of a door panel associated with a door system when the door panel is to be held in an open position, in response to detection of movement of the door panel when the door panel is to be held in the open position, activating, by executing instructions with processor circuitry, a motor used to drive the door panel, controlling the door panel to a closed position, and locking the door system.

Example 140 includes the method of example 139, further including placing the door system into a fault state.

Example 141 includes the method of example 139, further including generating an alert or notification indicating a potential brake failure.

Example 142 includes the method of example 139, wherein the activating of the motor includes activating the motor in a direction that drives the door panel towards the open position.

Example 143 includes the method of example 142, further including controlling the door panel to the open position before controlling the door panel to the closed position.

Example 144 includes the method of example 139, wherein the activating of the motor includes activating the motor in a direction that drives the door panel towards the closed position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:

sensor feedback analysis circuitry to analyze sensor feedback data from sensors associated with a door system; and operations adjustment analysis circuitry to determine an adjustment to be made to a first sensor of the sensors based on the analysis of the sensor feedback data.

2. The apparatus of claim 1, further including operations control circuitry to generate an alert or notification recommending a human implement the adjustment.

3. The apparatus of claim 1, further including operations control circuitry to automatically implement the adjustment to the first sensor.

4. The apparatus of claim 1, wherein the sensors include a door activation sensor and a breakaway sensor, the door activation sensor to trigger activation of a door of the door system, the breakaway sensor to detect a breakaway event indicative of when a panel of the door system breaks away from a track to guide a lateral edge of the panel.

5. The apparatus of claim 4, wherein the operations adjustment analysis circuitry is to determine whether the adjustment is to be made based on a number of breakaway events detected by the breakaway sensor over a given period of time.

6. The apparatus of claim 5, wherein the operations adjustment analysis circuitry is to compare the number of breakaway events to a threshold to determine whether the adjustment is to be made.

7. The apparatus of claim 5, wherein the operations adjustment analysis circuitry is to:

determine a ratio of the number of breakaway events to a total number of activation cycles of the door during the given period of time; and compare the ratio to a threshold to determine whether the adjustment is to be made.

8. The apparatus of claim 1, wherein the sensors include a door activation sensor and a photo-eye sensor, the door activation sensor to trigger activation of a door of the door system, the photo-eye sensor to detect traffic passing through a doorway associated with the door system.

9. The apparatus of claim 8, wherein the operations adjustment analysis circuitry is to determine whether the adjustment is to be made based on a time between the activation of the door and a tripping of the photo-eye sensor.

10. The apparatus of claim 8, wherein the operations adjustment analysis circuitry is to determine whether the adjustment is to be made based on a frequency that the photo-eye sensor does not detect traffic passing through the doorway while the door is open in response to being activated by the door activation sensor.

11. The apparatus of claim 8, wherein the operations adjustment analysis circuitry is to adjust a reclose timer for the door based on a duration between a first time when the sensor feedback data from the photo-eye sensor indicating the traffic has cleared the doorway and a second time when the door begins closing.

12. The apparatus of claim 8, wherein the photo-eye sensor is a first photo-eye sensor, the sensors including a second photo-eye sensor, the sensor feedback analysis circuitry to determine at least one of a direction of traffic or a speed of traffic based on a difference in timing of the first photo-eye sensor being tripped relative to the second photo-eye sensor being tripped.

13. The apparatus of claim 8, wherein the photo-eye sensor is a first photo-eye sensor, the sensors including a second photo-eye sensor, the first photo-eye sensor to be positioned proximate a base of the door system, the second photo-eye sensor to be positioned at an elevated position, the sensor feedback analysis circuitry to designate detected traffic as either pedestrian traffic or vehicular traffic based on the sensor feedback data from the first and second photo-eye sensors.

14. The apparatus of claim 1, wherein the sensors include a second sensor to emit a beam at an angle relative to a door panel in a closed position across a doorway of the door system, the sensor feedback analysis circuitry to determine at least one of a speed, a height, or a width of an object approaching the doorway based on a distance from the second sensor at which the object crosses the beam, the apparatus further including operations control circuitry to adjust a movement of the door panel based on the at least one of the speed, the height, or the width of the object.

15. The apparatus of claim 14, wherein the operations control circuitry is to adjust a position of the door panel in response to a change in at least one of the height or the width of the object.

16. The apparatus of claim 14, wherein the operations control circuitry is to adjust a speed of the door panel based on the speed of the object.

17. The apparatus of claim 1, wherein the sensors include a current sensor to measure a current used by a motor to move a door panel associated with the door system, the sensor feedback analysis circuitry to:

generate a profile of the current used by the motor at a first point in time; and compare the profile to the current used by the motor at a second point in time after the first point in time, the apparatus further including operations control circuitry to generate an alert or notification indicating potential wear to a seal associated with the door panel.

18. An apparatus comprising:

at least one memory;

instructions; and processor circuitry to execute the instructions to:

analyze sensor feedback data from sensors associated with a door system; and determine an adjustment to be made to a first sensor of the sensors based on the analysis of the sensor feedback data.

19. A non-transitory computer readable medium comprising instructions to cause a machine to at least:

analyze sensor feedback data from sensors associated with a door system; and determine an adjustment to be made to a first sensor of the sensors based on the analysis of the sensor feedback data.

20. A method comprising:

analyzing, by executing an instruction with at least one processor, sensor feedback data from sensors associated with a door system; and determining, by executing an instruction with the at least one processor, an adjustment to be made to a first sensor of the sensors based on the analysis of the sensor feedback data.

21. The method of claim 20, further including generating an alert or notification recommending a human implement the adjustment.

22. The method of claim 20, further including automatically implementing the adjustment to the first sensor.

23. The method of claim 20, wherein the sensors include a door activation sensor and a breakaway sensor, the door activation sensor to trigger activation of a door of the door system, the breakaway sensor to detect a breakaway event indicative of when a panel of the door system breaks away from a track to guide a lateral edge of the panel.

24. The method of claim 23, further including:

determining whether the adjustment is to be made based on a number of breakaway events detected by the breakaway sensor over a given period of time; and comparing the number of breakaway events to a threshold to determine whether the adjustment is to be made.

25. The method of claim 20, wherein the sensors include a door activation sensor and a photo-eye sensor, the door activation sensor to trigger activation of a door of the door system, the photo-eye sensor to detect traffic passing through a doorway associated with the door system.

26. The method of claim 25, further including determining whether the adjustment is to be made based on a time between the activation of the door and a tripping of the photo-eye sensor.

27. The method of claim 25, wherein the photo-eye sensor is a first photo-eye sensor, the sensors including a second photo-eye sensor, the method further including determining at least one of a direction of traffic or a speed of traffic based on a difference in timing of the first photo-eye sensor being tripped relative to the second photo-eye sensor being tripped.

28. The method of claim 20, wherein the sensors include a second sensor to emit a beam at an angle relative to a door panel in a closed position across a doorway of the door system, the method further including:

determining at least one of a speed, a height, or a width of an object approaching the doorway based on a distance from the second sensor at which the object crosses the beam; and adjusting a movement of the door panel based on the at least one of the speed, the height, or the width of the object.

29. The method of claim 20, wherein the sensors include a current sensor to measure a current used by a motor to move a door panel associated with the door system, the method further including:

generating a profile of the current used by the motor at a first point in time;

comparing the profile to the current used by the motor at a second point in time after the first point in time; and generating an alert or notification indicating potential wear to a seal associated with the door panel.

30. The non-transitory computer readable medium of claim 19, wherein the instructions cause the machine to generate an alert or notification recommending a human implement the adjustment.

31. The non-transitory computer readable medium of claim 19, wherein the instructions cause the machine to automatically implement the adjustment to the first sensor.

32. The non-transitory computer readable medium of claim 19, wherein the sensors include a door activation sensor and a breakaway sensor, the door activation sensor to trigger activation of a door of the door system, the breakaway sensor to detect a breakaway event indicative of when a panel of the door system breaks away from a track to guide a lateral edge of the panel.

33. The non-transitory computer readable medium of claim 32, wherein the instructions cause the machine to:

determine whether the adjustment is to be made based on a number of breakaway events detected by the breakaway sensor over a given period of time; and compare the number of breakaway events to a threshold to determine whether the adjustment is to be made.

34. The non-transitory computer readable medium of claim 19, wherein the sensors include a door activation sensor and a photo-eye sensor, the door activation sensor to trigger activation of a door of the door system, the photo-eye sensor to detect traffic passing through a doorway associated with the door system.

35. The non-transitory computer readable medium of claim 34, wherein the instructions cause the machine to determine whether the adjustment is to be made based on a time between the activation of the door and a tripping of the photo-eye sensor.

36. The non-transitory computer readable medium of claim 34, wherein the photo-eye sensor is a first photo-eye sensor, the sensors including a second photo-eye sensor, the instructions to cause the machine to determine at least one of a direction of traffic or a speed of traffic based on a difference in timing of the first photo-eye sensor being tripped relative to the second photo-eye sensor being tripped.

37. The non-transitory computer readable medium of claim 19, wherein the sensors include a second sensor to emit a beam at an angle relative to a door panel in a closed position across a doorway of the door system, the instructions to cause the machine to:

determine at least one of a speed, a height, or a width of an object approaching the doorway based on a distance from the second sensor at which the object crosses the beam; and adjust a movement of the door panel based on the at least one of the speed, the height, or the width of the object.

38. The non-transitory computer readable medium of claim 19, wherein the sensors include a current sensor to measure a current used by a motor to move a door panel associated with the door system, the instructions to cause the machine to:

generate a profile of the current used by the motor at a first point in time;

compare the profile to the current used by the motor at a second point in time after the first point in time; and generate an alert or notification indicating potential wear to a seal associated with the door panel.

39. The apparatus of claim 18, wherein the processor circuitry is to generate an alert or notification recommending a human implement the adjustment.

40. The apparatus of claim 18, wherein the processor circuitry is to automatically implement the adjustment to the first sensor.

41. The apparatus of claim 18, wherein the sensors include a door activation sensor and a breakaway sensor, the door activation sensor to trigger activation of a door of the door system, the breakaway sensor to detect a breakaway event indicative of when a panel of the door system breaks away from a track to guide a lateral edge of the panel.

42. The apparatus of claim 41, wherein the processor circuitry is to:

determine whether the adjustment is to be made based on a number of breakaway events detected by the breakaway sensor over a given period of time; and compare the number of breakaway events to a threshold to determine whether the adjustment is to be made.

43. The apparatus of claim 18, wherein the sensors include a door activation sensor and a photo-eye sensor, the door activation sensor to trigger activation of a door of the door system, the photo-eye sensor to detect traffic passing through a doorway associated with the door system.

44. The apparatus of claim 43, wherein the processor circuitry is to determine whether the adjustment is to be made based on a time between the activation of the door and a tripping of the photo-eye sensor.

45. The apparatus of claim 43, wherein the photo-eye sensor is a first photo-eye sensor, the sensors including a second photo-eye sensor, the processor circuitry to determine at least one of a direction of traffic or a speed of traffic based on a difference in timing of the first photo-eye sensor being tripped relative to the second photo-eye sensor being tripped.

46. The apparatus of claim 18, wherein the sensors include a second sensor to emit a beam at an angle relative to a door panel in a closed position across a doorway of the door system, the processor circuitry to:

determine at least one of a speed, a height, or a width of an object approaching the doorway based on a distance from the second sensor at which the object crosses the beam; and cause adjustment of a movement of the door panel based on the at least one of the speed, the height, or the width of the object.

47. The apparatus of claim 18, wherein the sensors include a current sensor to measure a current used by a motor to move a door panel associated with the door system, the processor circuitry to:

generate a profile of the current used by the motor at a first point in time;

compare the profile to the current used by the motor at a second point in time after the first point in time; and generate an alert or notification indicating potential wear to a seal associated with the door panel.

* * * * *